(12) United States Patent
Zhou et al.

(10) Patent No.: US 12,089,226 B2
(45) Date of Patent: Sep. 10, 2024

(54) HYBRID AUTOMATIC REPEAT REQUEST TRANSMISSION WITH MULTIPLE TRANSMISSION AND RECEPTION POINTS AND MULTIPLE PANELS

(71) Applicant: Ofinno, LLC, Reston, VA (US)

(72) Inventors: Hua Zhou, Vienna, VA (US); Esmael Hejazi Dinan, McLean, VA (US); Ali Cagatay Cirik, Chantilly, VA (US); Hyoungsuk Jeon, Centreville, VA (US); Yunjung Yi, Vienna, VA (US); Youngwoo Kwak, Vienna, VA (US); Kyungmin Park, Vienna, VA (US); Kai Xu, Herndon, VA (US)

(73) Assignee: Ofinno, LLC, Reston, VA (US)

(*) Notice: Subject to any disclaimer, the term of this patent is extended or adjusted under 35 U.S.C. 154(b) by 317 days.

(21) Appl. No.: 17/549,461

(22) Filed: Dec. 13, 2021

(65) Prior Publication Data
US 2022/0104187 A1  Mar. 31, 2022

Related U.S. Application Data

(63) Continuation of application No. PCT/US2020/037250, filed on Jun. 11, 2020.
(Continued)

(51) Int. Cl.
*H04W 72/04* (2023.01)
*H04L 1/1812* (2023.01)
(Continued)

(52) U.S. Cl.
CPC ........... *H04W 72/23* (2023.01); *H04L 1/1812* (2013.01); *H04L 5/0055* (2013.01); *H04W 72/0446* (2013.01)

(58) Field of Classification Search
CPC .............. H04W 72/23; H04W 72/0446; H04L 1/1812; H04L 5/0055; H04L 1/1822
See application file for complete search history.

(56) References Cited

U.S. PATENT DOCUMENTS

| | | | |
|---|---|---|---|
| 2019/0173620 A1* | 6/2019 | Oh | H04L 1/1822 |
| 2020/0015250 A1* | 1/2020 | Yang | H04L 5/001 |
| 2020/0154466 A1* | 5/2020 | John Wilson | H04L 5/0055 |

FOREIGN PATENT DOCUMENTS

EP    3484057 A1    5/2019

OTHER PUBLICATIONS

3GPP TS 36.321 V15.4.0 (Dec. 2018); Technical Specification; 3rd Generation Partnership Project; Technical Specification Group Radio Access Network; Evolved Universal Terrestrial Radio Access (E-UTRA); Medium Access Control (MAC) protocol specification; (Release 15).

(Continued)

*Primary Examiner* — Lakeram Jangbahadur
(74) *Attorney, Agent, or Firm* — Robert W. Houston; Kavon Nasabzadeh; Philip R. Smith

(57) ABSTRACT

A wireless device receives, via a control resource set (coreset), an indication of a resource assignment. Based on the resource assignment during a slot, a transport block associated with a hybrid automatic repeat request (HARQ) process identified by a HARQ process identifier is received. The HARQ process identifier is based on: a coreset group index of a coreset group to which the coreset belongs; and a slot index of the slot.

18 Claims, 42 Drawing Sheets

Related U.S. Application Data

(60) Provisional application No. 62/860,483, filed on Jun. 12, 2019.

(51) Int. Cl.
  *H04L 5/00* (2006.01)
  *H04W 72/0446* (2023.01)
  *H04W 72/23* (2023.01)

(56) References Cited

OTHER PUBLICATIONS

3GPP TS 38.212 V15.5.0 (Mar. 2019); Technical Specification; 3rd Generation Partnership Project; Technical Specification Group Radio Access Network; NR; Multiplexing and channel coding; (Release 15).
"3GPP TS 38.213 V15.5.0 (Mar. 2019); Technical Specification; 3rd Generation Partnership Project; Technical Specification Group Radio Access Network; NR; Physical layer procedures for control (Release 15);".
3GPP TS 38.214 V15.5.0 (Mar. 2019); Technical Specification; 3rd Generation Partnership Project; Technical Specification Group Radio Access Network; NR; Physical layer procedures for data; (Release 15).
3GPP TS 38.300 V15.5.0 (Mar. 2019); Technical Specification; 3rd Generation Partnership Project; Technical Specification Group Radio Access Network; NR; NR and NG-RAN Overall Description; Stage 2; (Release 15).
3GPP TS 38.321 V15.5.0 (Mar. 2019); Technical Specification; 3rd Generation Partnership Project; Technical Specification Group Radio Access Network; NR; Medium Access Control (MAC) protocol specification; (Release 15).
3GPP TS 38.331 V15.5.1 (Apr. 2019); Technical Specification; 3rd Generation Partnership Project; Technical Specification Group Radio Access Network; NR; Radio Resource Control (RRC) protocol specification; (Release 15).
"R1-1810104; 3GPP TSG RAN WG1 Meeting #94bis; Chengdu, China, Oct. 8-12, 2018; Agenda Item:7.2.8.2; Source: Huawei, HiSilicon; Title: Enhancements on multi-TRP/panel transmission;".
"R1-1811001_Discussion on multi-TRP transmission_final; 3GPP TSG RAN WG1 Meeting #94bis; Chengdu, China, Oct. 8-12, 2018;; Agenda Item:7.2.8.2; Source:Spreadtrum Communications; Title: Discussion on Multi-TRP transmission;".
"R1-1900017; 3GPP TSG RAN WG1 Ad-Hoc Meeting 1901; Taipei, Jan. 21-25, 2019; Agenda Item:7.2.8.2; Source:Huawei, HiSilicon; Title: Enhancements on multi-TRP/panel transmission;".
"R1-1900339; 3GPP TSG RAN WG1 Ad-Hoc Meeting 1901; Taipei, Jan. 21-25, 2019;; Source:CATT; Title: Consideration on multi-TRP/panel transmission; Agenda Item:7.2.8.2;".
"R1-1900978 Enhancements on multi TRP and panel transmission; 3GPP TSG RAN WG1 Ad-Hoc Meeting 1901R1-19000978; Taipei, Jan. 21-25, 2019; ; Source:NTT Docomo, Inc; Title:Enhancements on multi-TRP/panel transmission; Agenda Item:7.2.8.2;".
"R1-1901567; 3GPP TSG RAN WG1 Meeting #96; Athens, Greece, 25th Feb.-Mar. 1, 2019; Agenda Item:7.2.8.2; Source: Huawei, HiSilicon; Title:Enhancements on Multi-TRP/panel transmission;".
"R1-1903970; 3GPP TSG RAN WG1 Meeting #96bis; Xi'an, China, Apr. 8-12, 2019; Agenda Item:7.2.8.2; Source: Huawei, HiSilicon; Title:Enhancements on Multi-TRP/panel transmission;".
"R1-1904019 On multi-PDCCH design for multi-TRP; 3GPP TSG RAN WG1 #96bis; Xi'an, China, Apr. 8-12, 2019; ; Source: ZTE; Title:On multi-PDCCH design for multi-TRP; Agenda item:7.2.8.6;".
"R1-1905833 Summary_7.2.6.4_Summary of Enhancements to Scheduling_HARQ; 3GPP TSG-RAN WG1 Meeting #96b R1- 1905833; Apr. 8-12, 2019; Xi'an, China; ; Agenda item:7.2.6.4; Source: Qualcomm Incorporated;".
"R1-1906029; 3GPP TSG RAN WG1 #97; Reno, USA, May 13-17, 2019;; Agenda Item:7.2.8.2; Source:Huawei, HiSilicon; Title:Enhancements on Multi-TRP/panel transmission;".
"R1-1906236 Enhancements on Multi-TRP and Multi-panel Transmission; 3GPP TSG RAN WG1 #97 ; Reno, USA, May 13-17, 2019; ; Source: ZTE; Title: Enhancements on Multi-TRP and Multi-panel Transmission; Agenda item:7.2.8.2;".
"R1-1906327 PDCCH enhancements for URLLC-final; 3GPP TSG RAN WG1 Meeting #97 ; Reno, USA, May 13-17, 2019; ; Source:CATT; Title:PDCCH enhancements for URLLC; Agenda Item:7.2.6.1;".
"R2-1903149 MAC-specific aspects of SPS&CG configurations; 3GPP TSG-RAN WG2 Meeting #105bis ; Xi'an, China, Apr. 8-12, 2019 Revision of R2-1900152; Source:CATT ; Title:MAC-specific aspects of SPS&CG configurations; Agenda Item: 11.7.2.2;".
"R2-1903584; 3GPP TSG-RAN WG2 #105bis; Xi'an, China, Apr. 8-12, 2019; Source:NTT Docomo, Inc.; Title:SPS enhancements for TSC traffic; Document for:Discussion and decision;".
"R2-1903598 Discussion on the HARQ process calculation on mulitple active CGs; 3GPP TSG-RAN WG2 Meeting #105bis ; Xi'an, China, Apr. 8-12, 2019; ; Source:vivo; Title:Discussion on the HARQ process calculation on multiple active CGs; Agenda Item:11.7.2.2;".
"R2-1904149 Impact of WUS on cDRX; 3GPP TSG-RAN2 Meeting #105bis; Xi'an, China, Apr. 8-12, 2019; Agenda Item: 11.11.4.1 PDCCH-based power saving signals/channel; Source: Ericsson;".
"R2-1904355 Outstanding Issues for multiple SPSs-CGs Support; 3GPP TSG-RAN WG2 #105bis; Xi'an, China, Apr. 8-12, 2019; Agenda Item:11.7.2.2; Source: CMCC; Title:Outstanding Issues for multiple SPSs-CGs Support;".
"R2-1905743 Further Discussion on Multiple Active SPSCGs; 3GPP TSG-RAN WG2 Meeting #106; Reno, USA, May 13-17, 2019; Source:CATT ; Title: Further Discussion on Multiple Active SPS/CGs; Agenda Item: 11.7.2.2;".
"R2-1906838 On configuration aspects for multiple SPS and CG; 3GPP TSG-RAN WG2 #106Tdoc ; Reno, US, May 13-17, 2019; ; Agenda Item: 11.7.2.2; Source: Ericsson; Title:On configuration aspects for multiple SPS and CG;".
"R2-1906839 On MAC impacts for multiple SPS and CG; 3GPP TSG-RAN WG2 #106Tdoc; Reno, US, May 13-17, 2019; ; Agenda Item: 11.7.2.2; Source:Ericsson; Title:On MAC impacts for multiple SPS and CG ;".
"R2-1907258 Determination of HARQ process ID for a CG or SPS occasion; 3GPP TSG-RAN WG2 Meeting 106; Reno, USA, May 13-17, 2019 ; Agenda item: 11.7.2.2; Source: Huawei, HiSilicon; Title: Determination of HARQ process ID for a CG/SPS occasion;".
R1-1801080; 3GPP TSG RAN WG1 Nr Ad Hoc Meeting; Vancouver, Canada, Jan. 22-26, 2018; Source: NTT DOCOMO, Inc.; Title: Offline summary for AI 7.3.3.4 UL data transmission procedure; Agenda Item: 7.3.3.4 Document for. Discussion and Decision.
International Search Report and Written Opinion of the International Searching authority mailed Nov. 12, 2020, in International Application No. PCT/US2020/037250.
R1- 1905833; 3GPP TSG-RAN WG1 Meeting #96b; Apr. 8-12, 2019; Xi'an, China; Agenda item: 7.2.6.4 Source: Qualcomm Incorporated; Title: Summary of Enhancements to Scheduling/ HARQ; Document for: Discussion/Decision.

* cited by examiner

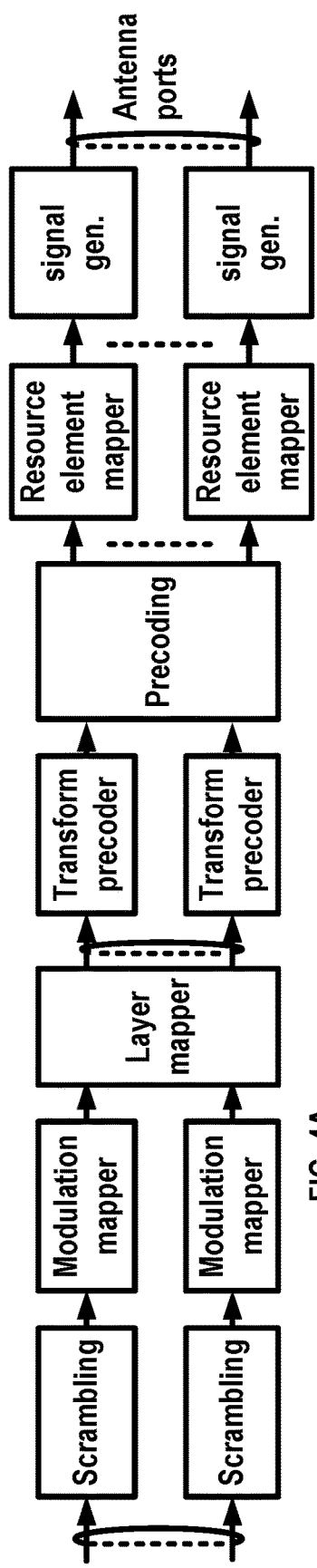
FIG. 4A
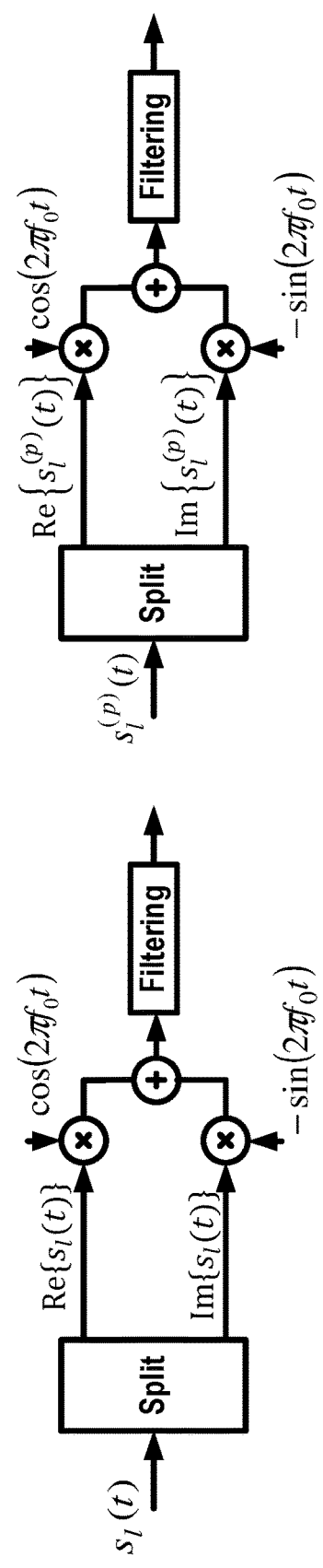
FIG. 4B
FIG. 4D
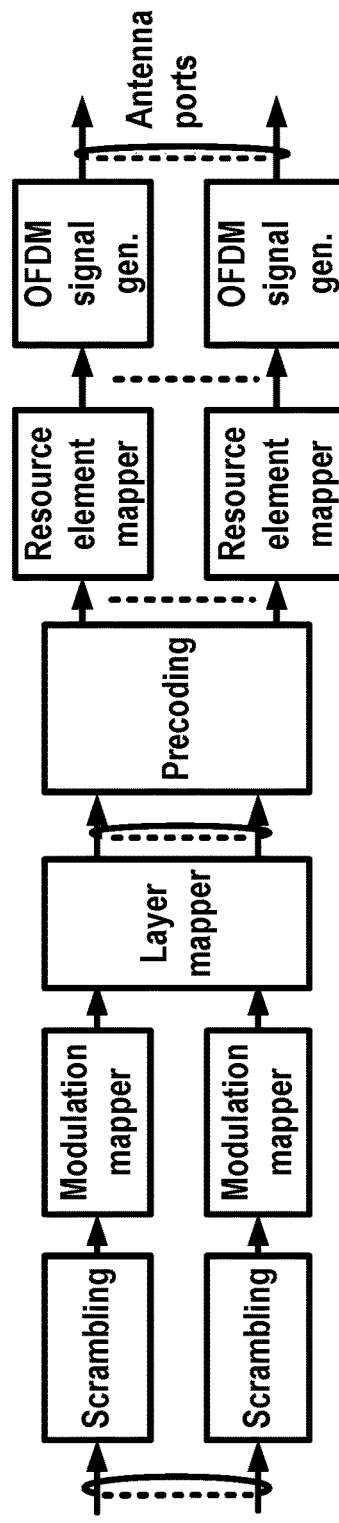
FIG. 4C

| Index | LCID values |
|---|---|
| 000000 | CCCH |
| 000001-100000 | Identity of a logical channel |
| 100001-101111 | Reserved |
| 110000 | SP ZP CSI-RS Resource Set Act./Deact. |
| 110001 | PUCCH spatial relation Act./Deact. |
| 110010 | SP SRS Act./Deact. |
| 110011 | SP CSI reporting on PUCCH Act./Deact. |
| 110100 | TCI State Indication for UE-specific PDCCH |
| 110101 | TCI State Indication for UE-specific PDSCH |
| 110110 | Aperiodic CSI Trigger State Subselection |
| 110111 | SP CSI-RS/CSI-IM Resource Set Act./Deact. |
| 111000 | Duplication Activation/deactivation |
| 111001 | SCell activation/deactivation (4 Octet) |
| 111010 | SCell activation/deactivation (1 Octet) |
| 111011 | Long DRX Command |
| 111100 | DRX Command |
| 111101 | Timing Advance Command |
| 111110 | UE Contention Resolution Identity |
| 111111 | Padding |

FIG. 18

| Index | LCID values |
|---|---|
| 000000 | CCCH |
| 000001-100000 | Identity of a logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

FIG. 19

|  | DCI format | Example size (Bits) | Usage |
|---|---|---|---|
| Uplink | 0 | 45 | Uplink scheduling grant |
|  | 4 | 53 | Uplink scheduling grant with spatial multiplexing |
|  | 6-0A, 6-0B | 46, 36 | Uplink scheduling grant for eMTC devices |
| Downlink | 1C | 31 | Special purpose compact assignment |
|  | 1A | 45 | Contiguous allocation only |
|  | 1B | 46 | Codebook-based beamforming using CRS |
|  | 1D | 46 | MU-MIMO using CRS |
|  | 1 | 55 | Flexible allocations |
|  | 2A | 64 | Open-loop spatial multiplexing using CRS |
|  | 2B | 64 | Dual-layer transmission using DM-RS (TM8) |
|  | 2C | 66 | Multi-layer transmission using DM-RS (TM9) |
|  | 2D | 68 | Multi-layer transmission using DM-RS (TM9) |
|  | 2 | 67 | Closed-loop spatial multiplexing using CRS |
|  | 6-1A, 6-1B | 46, 36 | Downlink scheduling grants for eMTC devices |
| Special | 3, 3A | 45 | Power control commands |
|  | 5 |  | Sidelink operation |
|  | 6-2 |  | Paging/direct indication for eMTC devices |

FIG. 22

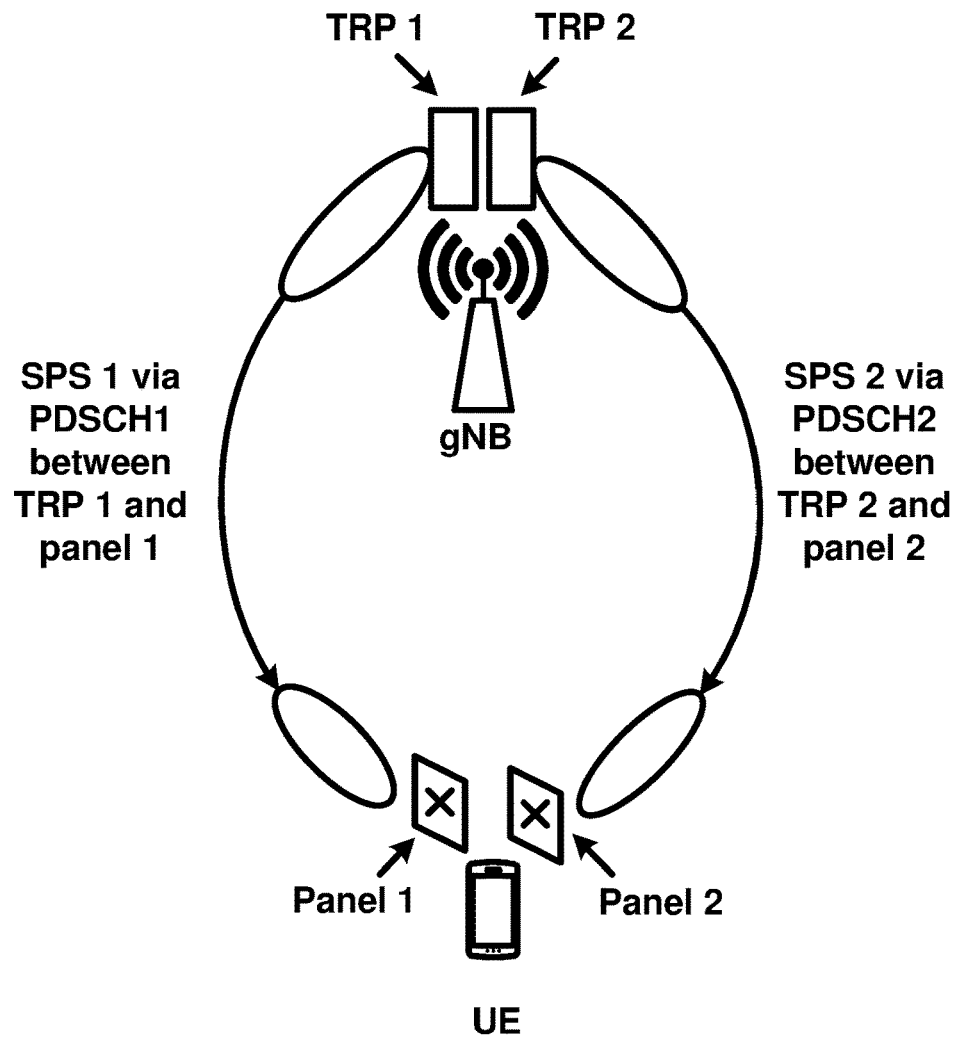
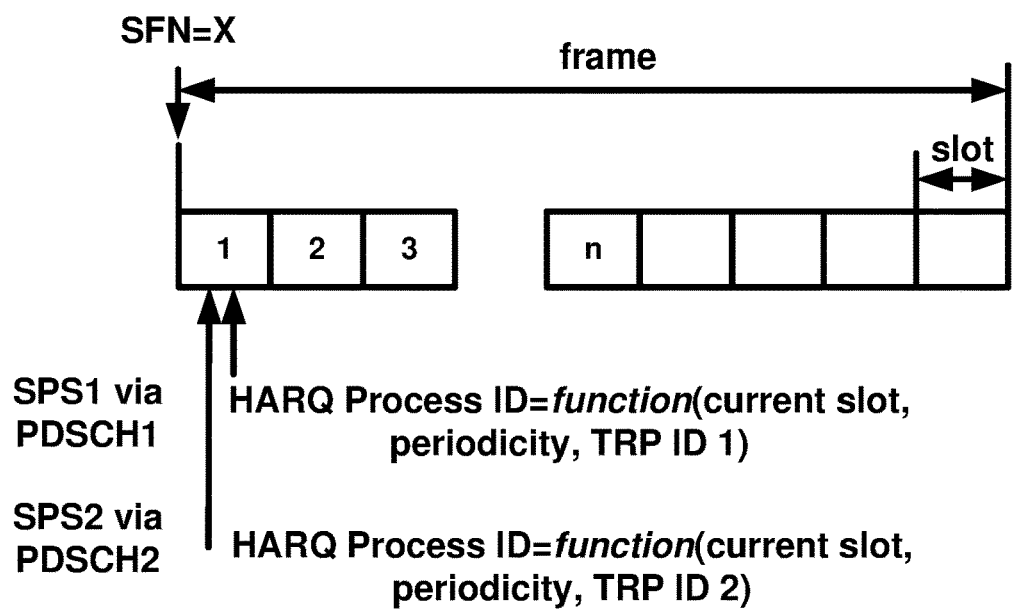
FIG. 32

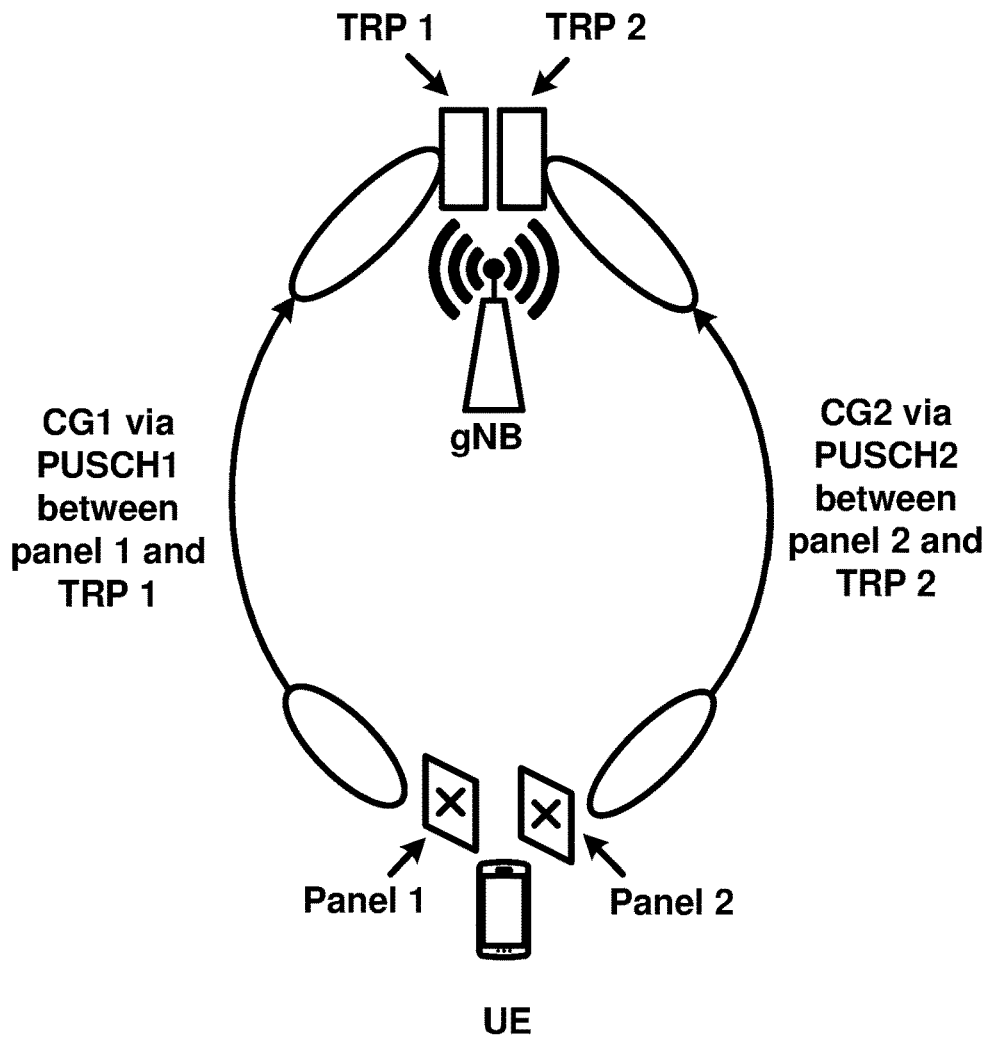
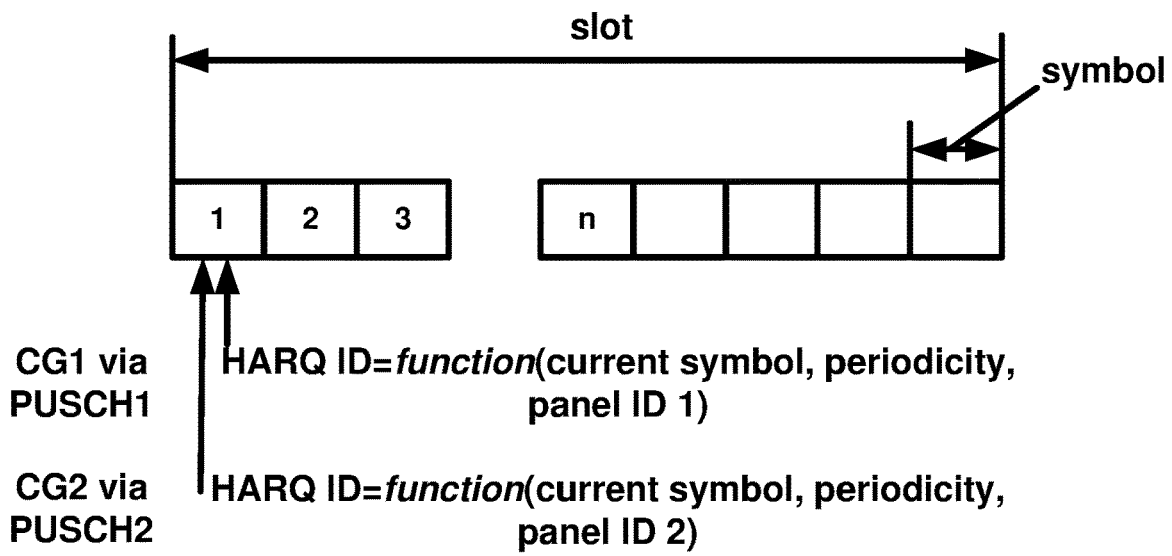
FIG. 37

HYBRID AUTOMATIC REPEAT REQUEST TRANSMISSION WITH MULTIPLE TRANSMISSION AND RECEPTION POINTS AND MULTIPLE PANELS

CROSS-REFERENCE TO RELATED APPLICATIONS

This application is a continuation of International Application No. PCT/US2020/037250, filed Jun. 11, 2020, which claims the benefit of U.S. Provisional Application No. 62/860,483, filed Jun. 12, 2019, the contents of each of which are hereby incorporated by reference in their entireties.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 18 is an example of LCIDs for DL-SCH as per an aspect of an embodiment of the present disclosure.

FIG. 19 is an example of LCIDs for UL-SCH as per an aspect of an embodiment of the present disclosure.

FIG. 22 is an example of DCI formats as per an aspect of an embodiment of the present disclosure.

FIG. 32 is an example of HARQ Process ID determination for configured downlink assignment with multiple TRPs and multiple panels as per an aspect of an embodiment of the present disclosure.

FIG. 37 is an example of HARQ Process ID determination for configured uplink grant with multiple TRPs and multiple panels as per an aspect of an embodiment of the present disclosure.

DETAILED DESCRIPTION OF EMBODIMENTS

Figure 1:
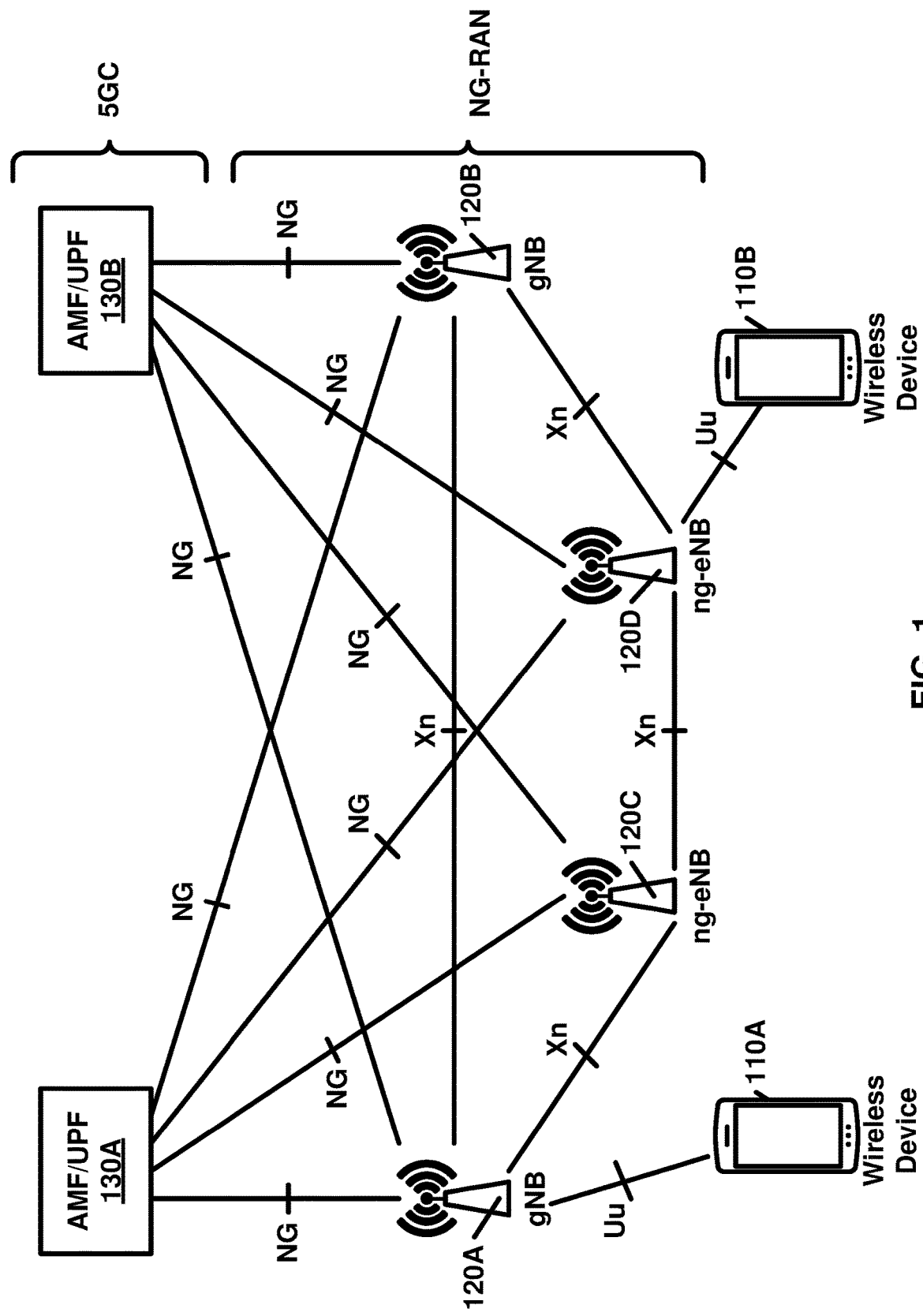
FIG. 1 is a diagram of an example RAN architecture as per an aspect of an embodiment of the present disclosure.

Example embodiments of the present disclosure enable operations on multiple TRPs and/or multiple panels of a wireless device and/or a base station. Embodiments of the technology disclosed herein may be employed in the technical field of multicarrier communication systems. More particularly, the embodiments of the technology disclosed herein may relate to a wireless device and/or a base station in a multicarrier communication system.

The following Acronyms are used throughout the present disclosure:

3GPP 3rd Generation Partnership Project
5GC 5G Core Network
ACK Acknowledgement
AMF Access and Mobility Management Function
ARQ Automatic Repeat Request
AS Access Stratum
ASIC Application-Specific Integrated Circuit
BA Bandwidth Adaptation
BCCH Broadcast Control Channel
BCH Broadcast Channel
BPSK Binary Phase Shift Keying
BWP Bandwidth Part
CA Carrier Aggregation
CC Component Carrier
CCCH Common Control CHannel
CDMA Code Division Multiple Access
CN Core Network
CP Cyclic Prefix
CP-OFDM Cyclic Prefix-Orthogonal Frequency Division Multiplex
C-RNTI Cell-Radio Network Temporary Identifier
CS Configured Scheduling
CSI Channel State Information
CSI-RS Channel State Information-Reference Signal
CQI Channel Quality Indicator
CRC Cyclic Redundancy Check
CSS Common Search Space
CU Central Unit
DAI Downlink Assignment Index
DC Dual Connectivity
DCCH Dedicated Control Channel
DCI Downlink Control Information
DL Downlink
DL-SCH Downlink Shared CHannel
DM-RS DeModulation Reference Signal
DRB Data Radio Bearer
DRX Discontinuous Reception
DTCH Dedicated Traffic Channel
DU Distributed Unit
EPC Evolved Packet Core
E-UTRA Evolved UMTS Terrestrial Radio Access
E-UTRAN Evolved-Universal Terrestrial Radio Access Network
FDD Frequency Division Duplex
FPGA Field Programmable Gate Arrays
F1-C F1-Control plane
F1-U F1-User plane
gNB next generation Node B
HARQ Hybrid Automatic Repeat reQuest
HDL Hardware Description Languages
IE Information Element
IP Internet Protocol
LCID Logical Channel Identifier
LTE Long Term Evolution
MAC Media Access Control
MCG Master Cell Group
MCS Modulation and Coding Scheme
MeNB Master evolved Node B
MIB Master Information Block
MME Mobility Management Entity
MN Master Node
NACK Negative Acknowledgement
NAS Non-Access Stratum
NG CP Next Generation Control Plane
NGC Next Generation Core
NG-C NG-Control plane
ng-eNB next generation evolved Node B
NG-U NG-User plane
NR New Radio
NR MAC New Radio MAC
NR PDCP New Radio PDCP
NR PHY New Radio PHYsical
NR RLC New Radio RLC
NR RRC New Radio RRC
NSSAI Network Slice Selection Assistance Information
O&M Operation and Maintenance
OFDM orthogonal Frequency Division Multiplexing
PBCH Physical Broadcast CHannel
PCC Primary Component Carrier
PCCH Paging Control CHannel
PCell Primary Cell
PCH Paging CHannel
PDCCH Physical Downlink Control CHannel
PDCP Packet Data Convergence Protocol
PDSCH Physical Downlink Shared CHannel
PDU Protocol Data Unit
PHICH Physical HARQ Indicator CHannel
PHY PHYsical
PLMN Public Land Mobile Network
PMI Precoding Matrix Indicator
PRACH Physical Random Access CHannel
PRB Physical Resource Block
PSCell Primary Secondary Cell
PSS Primary Synchronization Signal
pTAG primary Timing Advance Group
PT-RS Phase Tracking Reference Signal
PUCCH Physical Uplink Control CHannel
PUSCH Physical Uplink Shared CHannel
QAM Quadrature Amplitude Modulation
QFI Quality of Service Indicator QoS Quality of Service
QPSK Quadrature Phase Shift Keying
RA Random Access
RACH Random Access CHannel
RAN Radio Access Network
RAT Radio Access Technology
RA-RNTI Random Access-Radio Network Temporary Identifier
RB Resource Blocks
RBG Resource Block Groups
RI Rank indicator
RLC Radio Link Control
RLM Radio Link Monitoring
RNTI Radio Network Temporary Identifier
RRC Radio Resource Control
RRM Radio Resource Management
RS Reference Signal
RSRP Reference Signal Received Power
SCC Secondary Component Carrier
SCell Secondary Cell
SCG Secondary Cell Group
SC-FDMA Single Carrier-Frequency Division Multiple Access
SDAP Service Data Adaptation Protocol
SDU Service Data Unit
SeNB Secondary evolved Node B
SFN System Frame Number
S-GW Serving GateWay
SI System Information
SIB System Information Block
SMF Session Management Function
SN Secondary Node
SpCell Special Cell
SRB Signaling Radio Bearer
SRS Sounding Reference Signal
SS Synchronization Signal
SSS Secondary Synchronization Signal
sTAG secondary Timing Advance Group
TA Timing Advance
TAG Timing Advance Group
TAI Tracking Area Identifier
TAT Time Alignment Timer
TB Transport Block
TCI Transmission Configuration Indication
TC-RNTI Temporary Cell-Radio Network Temporary Identifier
TDD Time Division Duplex
TDMA Time Division Multiple Access
TRP Transmission Reception Point
TTI Transmission Time Interval
UCI Uplink Control Information
UE User Equipment
UL Uplink
UL-SCH Uplink Shared CHannel
UPF User Plane Function
UPGW User Plane Gateway
VHDL VHSIC Hardware Description Language
Xn-C Xn-Control plane
Xn-U Xn-User plane Example embodiments of the disclosure may be implemented using various physical layer modulation and transmission mechanisms. Example transmission mechanisms may include, but not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, 1024-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 120C, 120D), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface.

A gNB or an ng-eNB may host functions such as radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide functions such as NG interface management, UE context management, UE mobility management, transport of NAS messages, paging, PDU session management, configuration transfer or warning message transmission.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
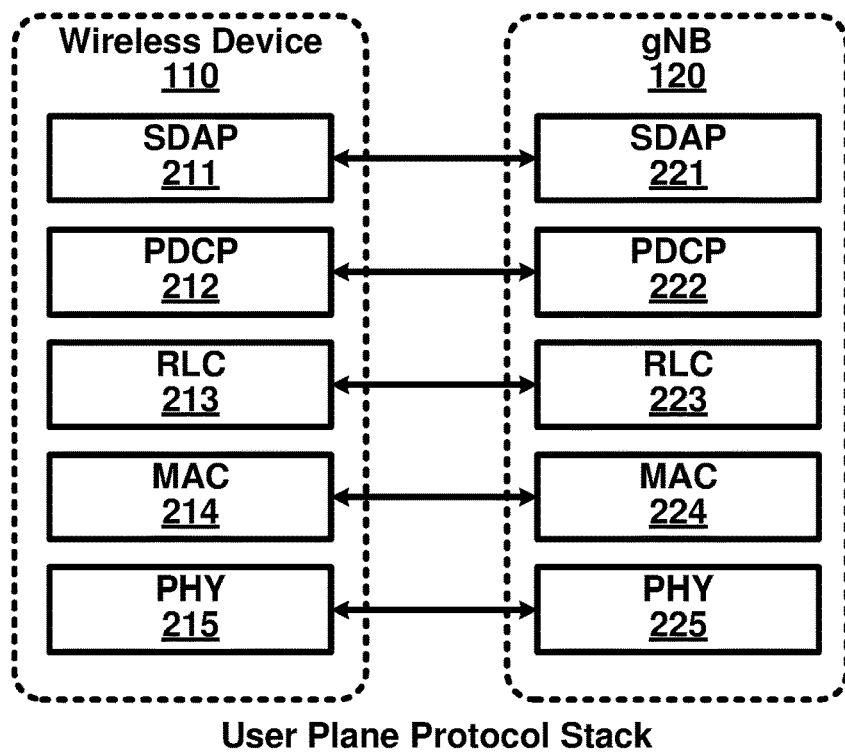
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
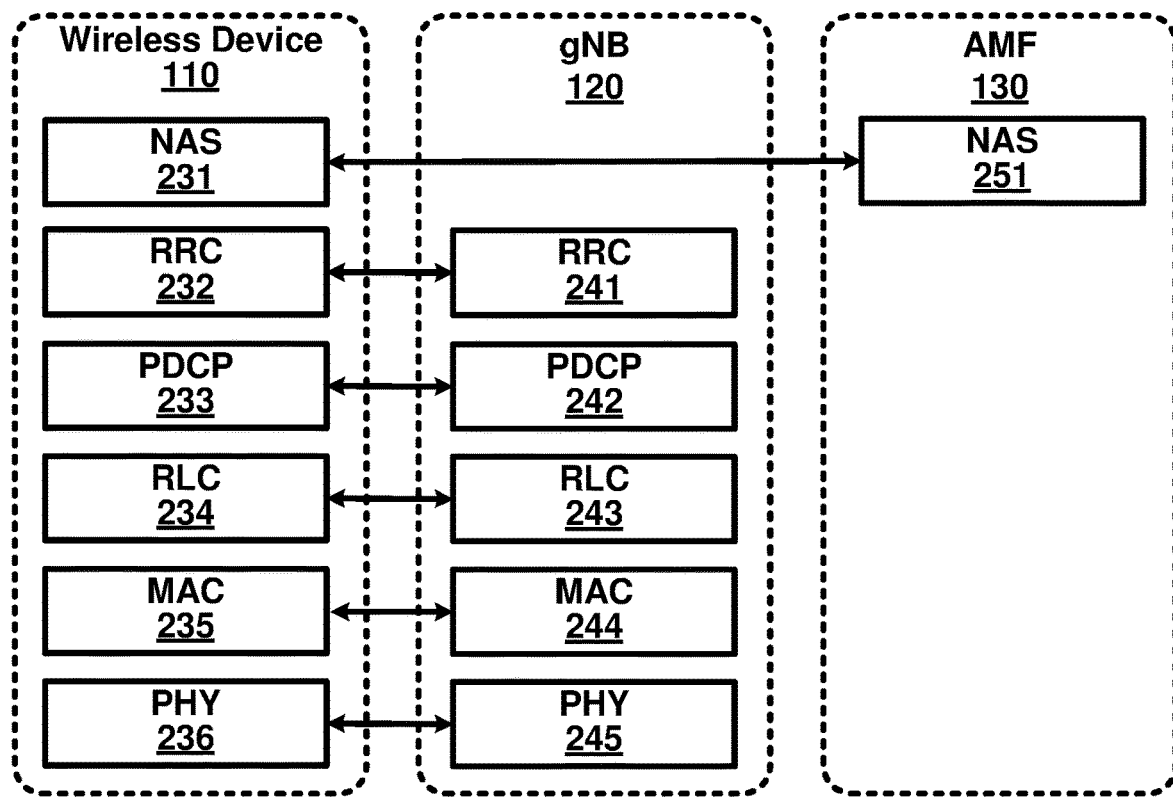
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and an AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
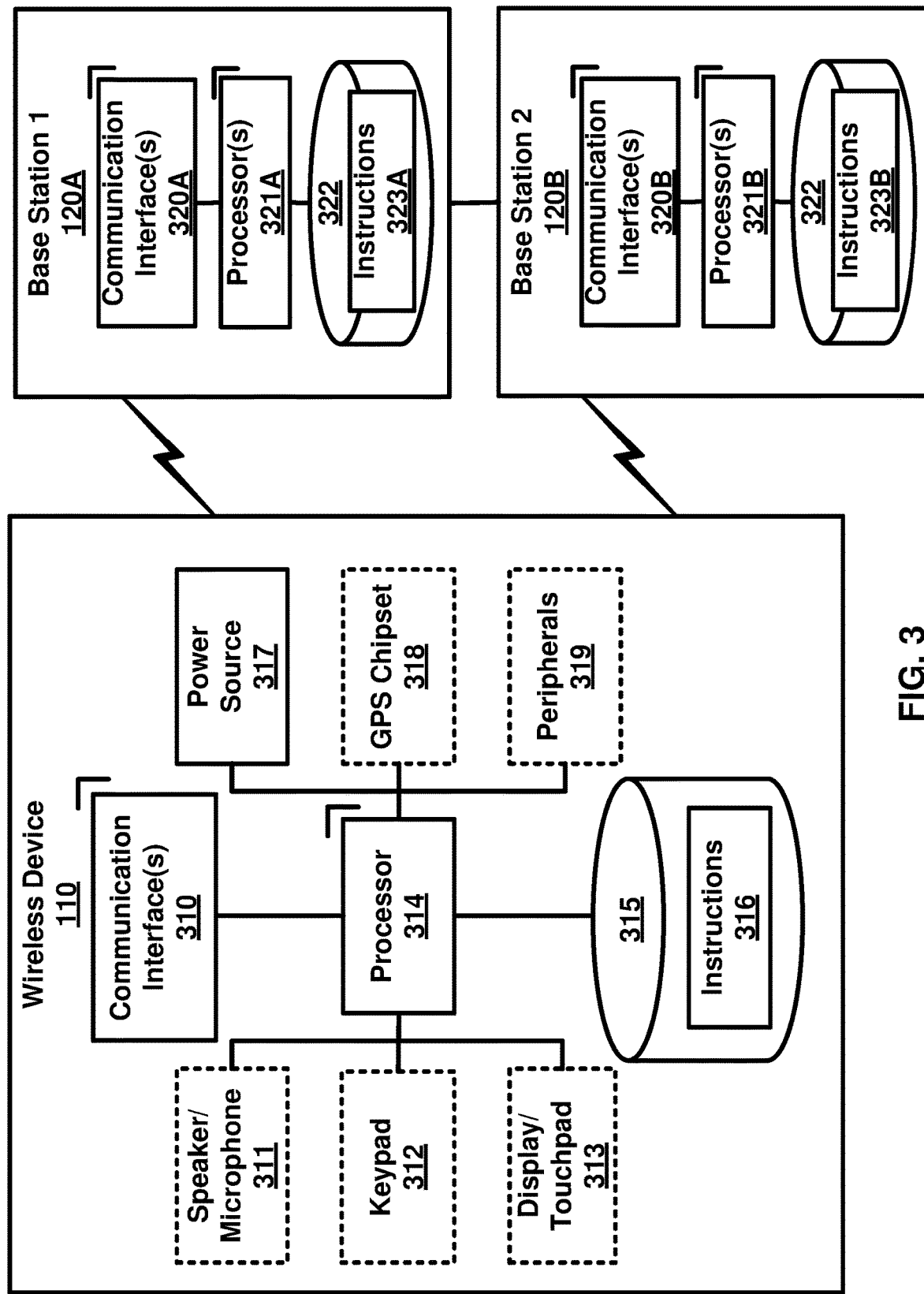
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called a UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_

Connected state of a wireless device, an NG-RAN may know a cell that the wireless device belongs to.

System information (SI) may be divided into minimum SI and other SIs. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signalling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signalling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection. an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
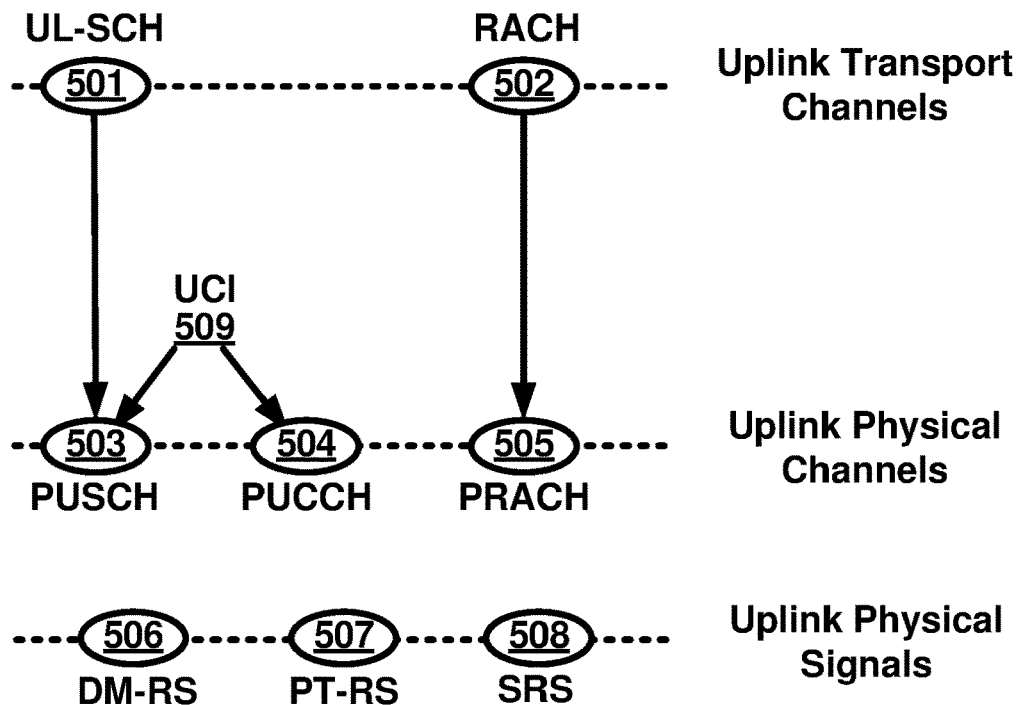
FIG. 5A is a diagram of an example uplink channel mapping and example uplink physical signals as per an aspect of an embodiment of the present disclosure.
Figure 5B:
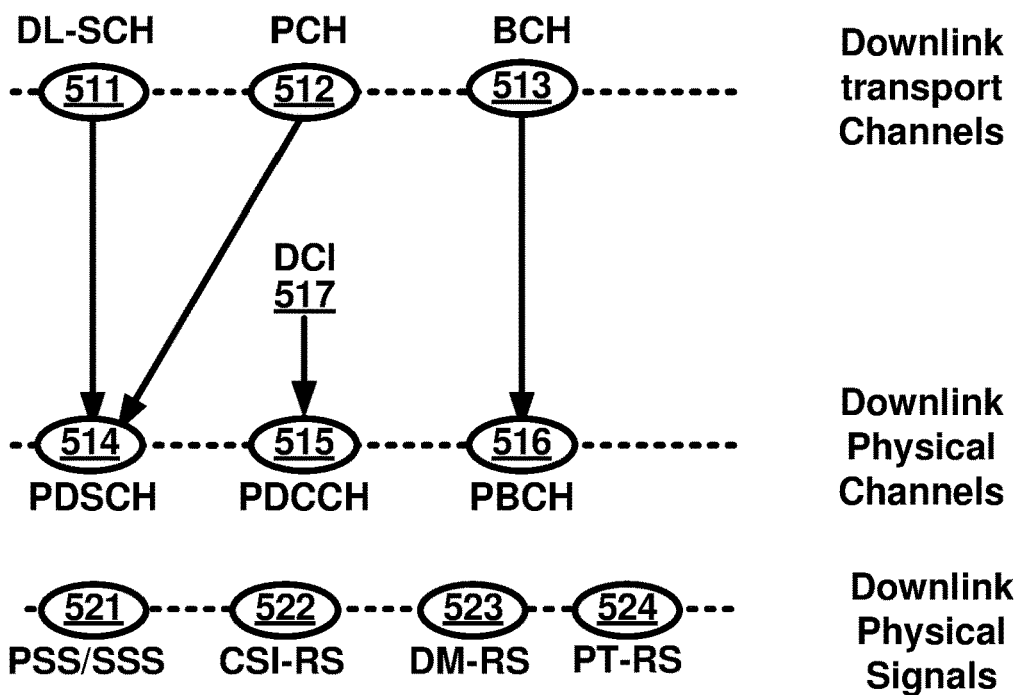
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on an RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, an SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SS/PBCH blocks when the downlink CSI-RS 522 and SS/PBCH blocks are spatially quasi co-located and resource elements associated with the downlink CSI-RS 522 are the outside of PRBs configured for SS/PBCH blocks.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statistically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on an RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
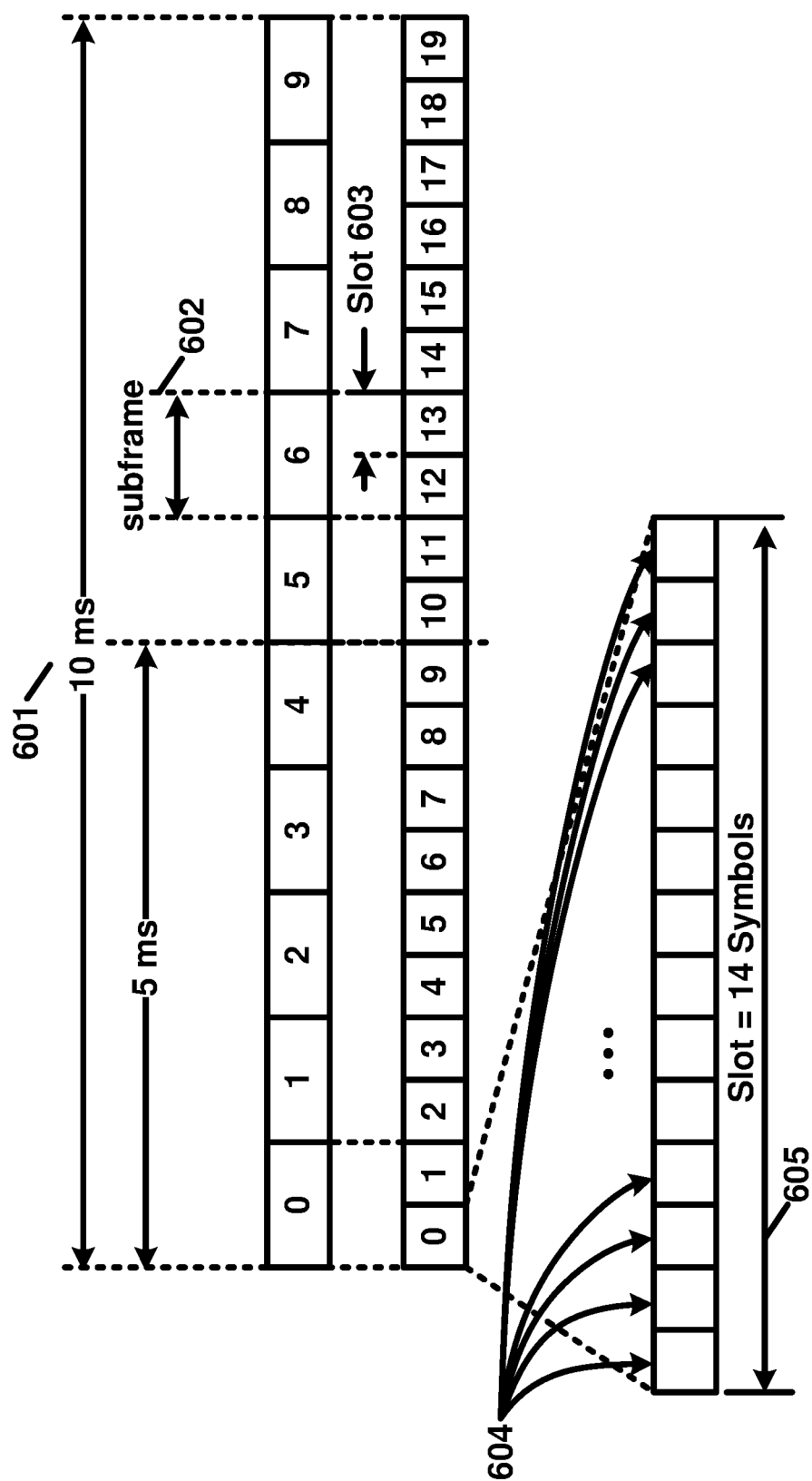
FIG. 6 is a diagram depicting an example transmission time or reception time for a carrier as per an aspect of an embodiment of the present disclosure.

FIG. 6 is a diagram depicting an example transmission time and reception time for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame timing. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

Figure 7A:
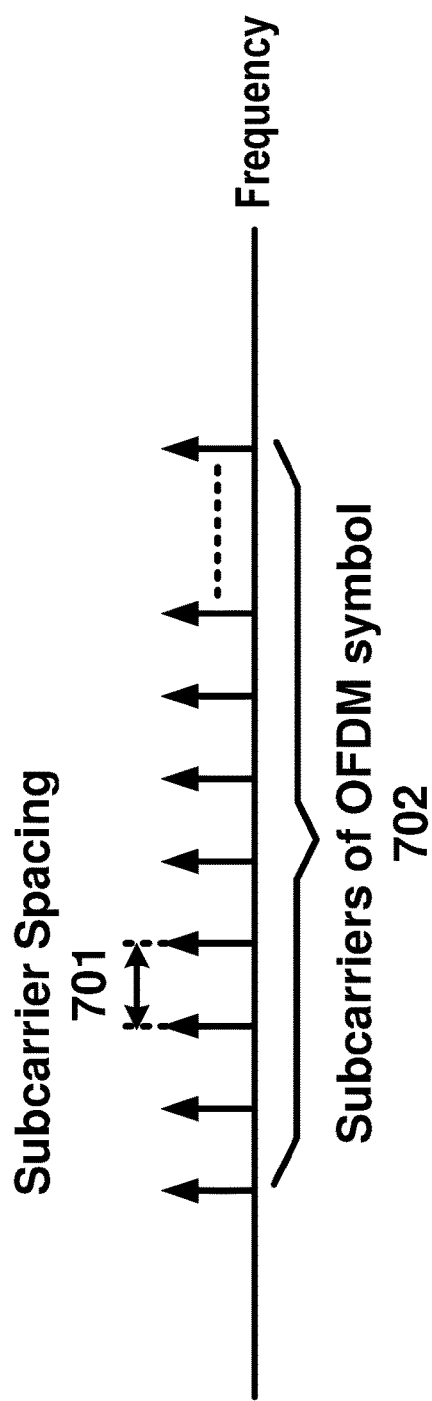
FIG. 7A and FIG. 7B are diagrams depicting example sets of OFDM subcarriers as per an aspect of an embodiment of the present disclosure.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

Figure 7B:
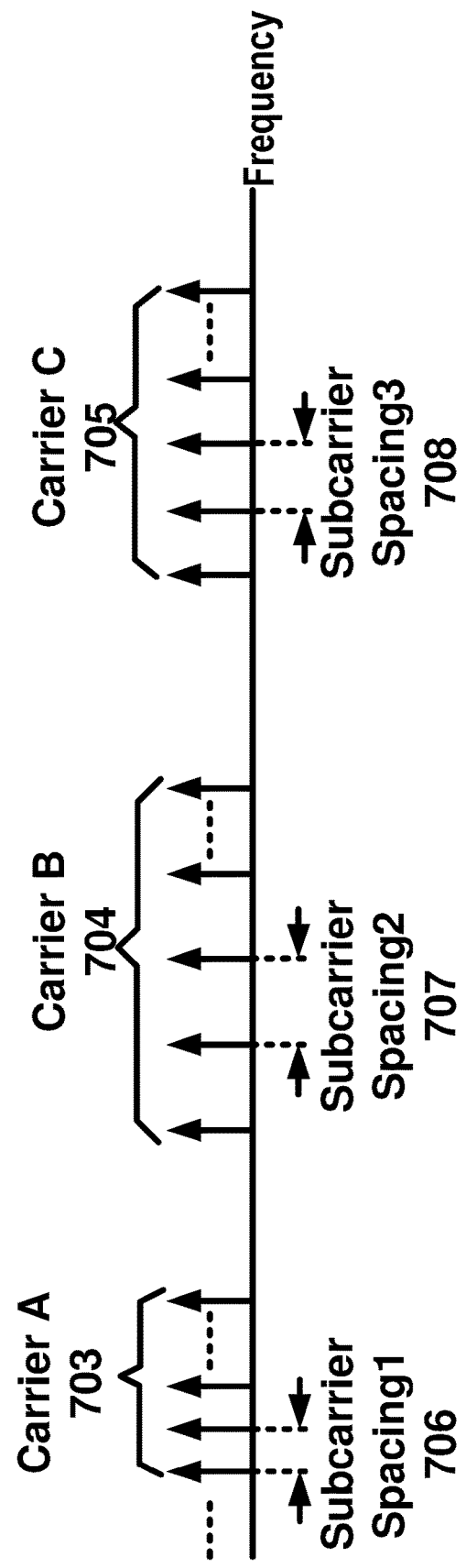

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
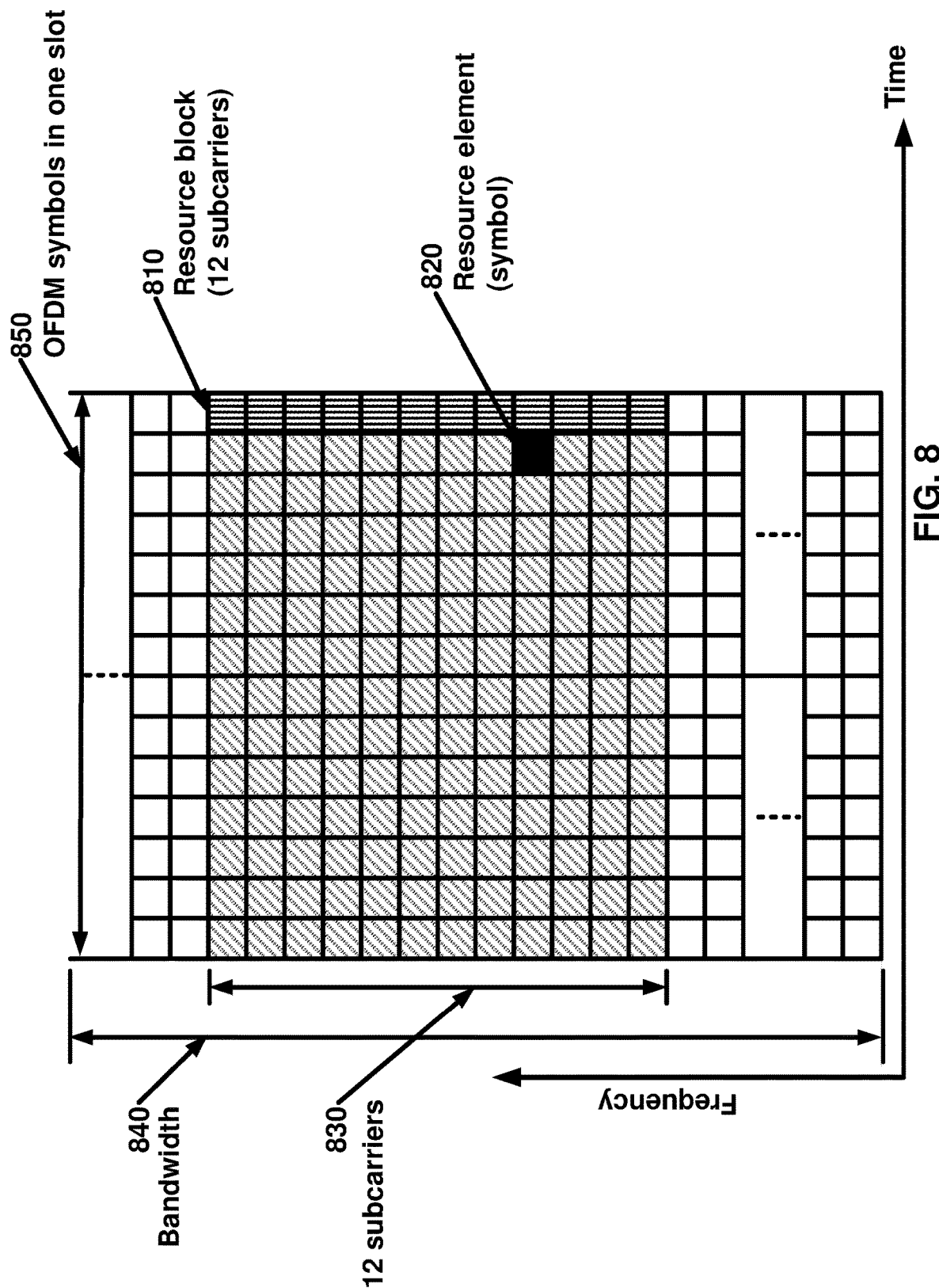
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of an RBG may depend on at least one of: an RRC message indicating an RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message(s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristic from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCLed with the DM-RS antenna port(s). Different set of DM-RS antenna port(s) for a DL data channel may be indicated as QCL with different set of the RS antenna port(s).

Figure 9A:
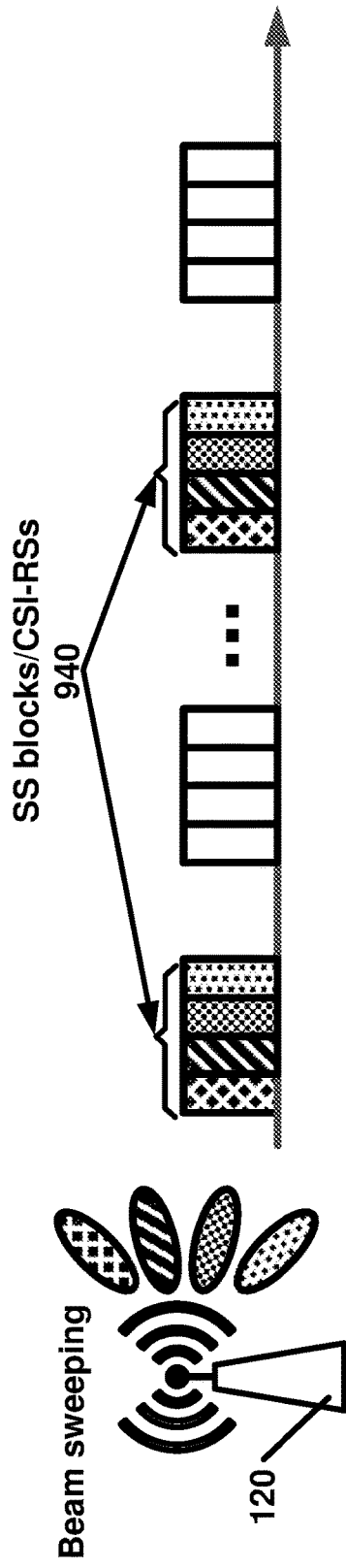
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
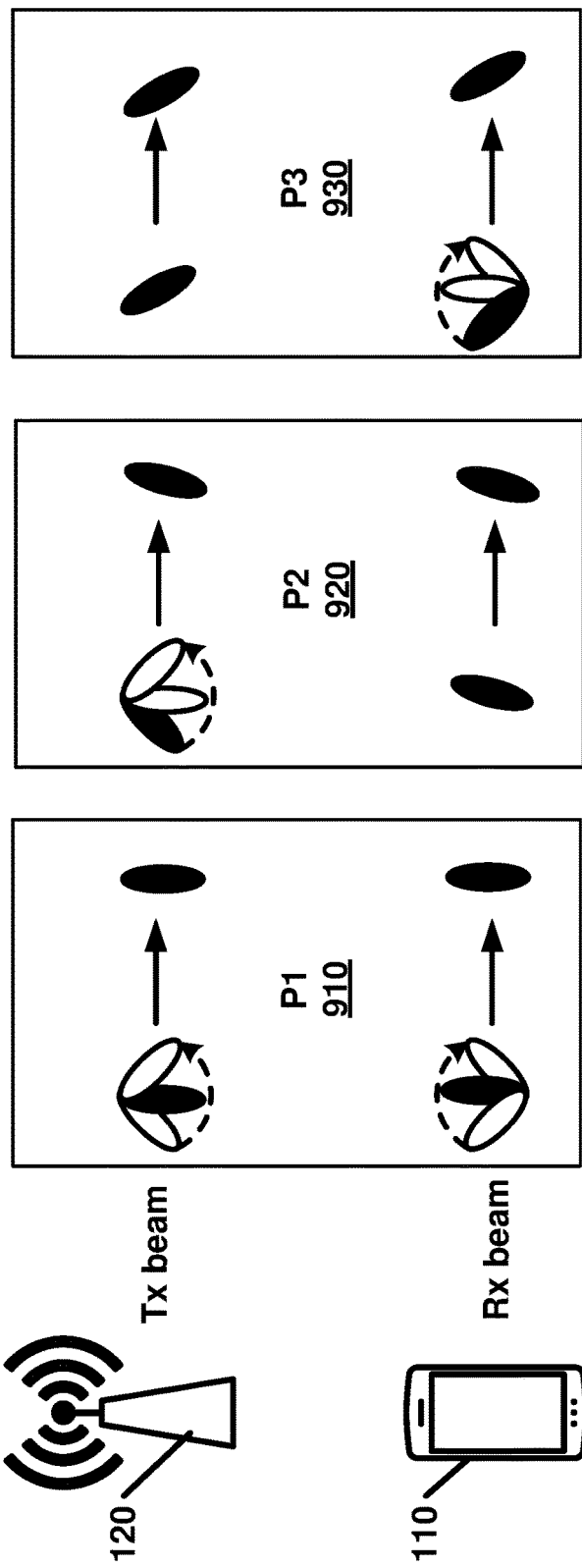
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by a UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

Figure 10:
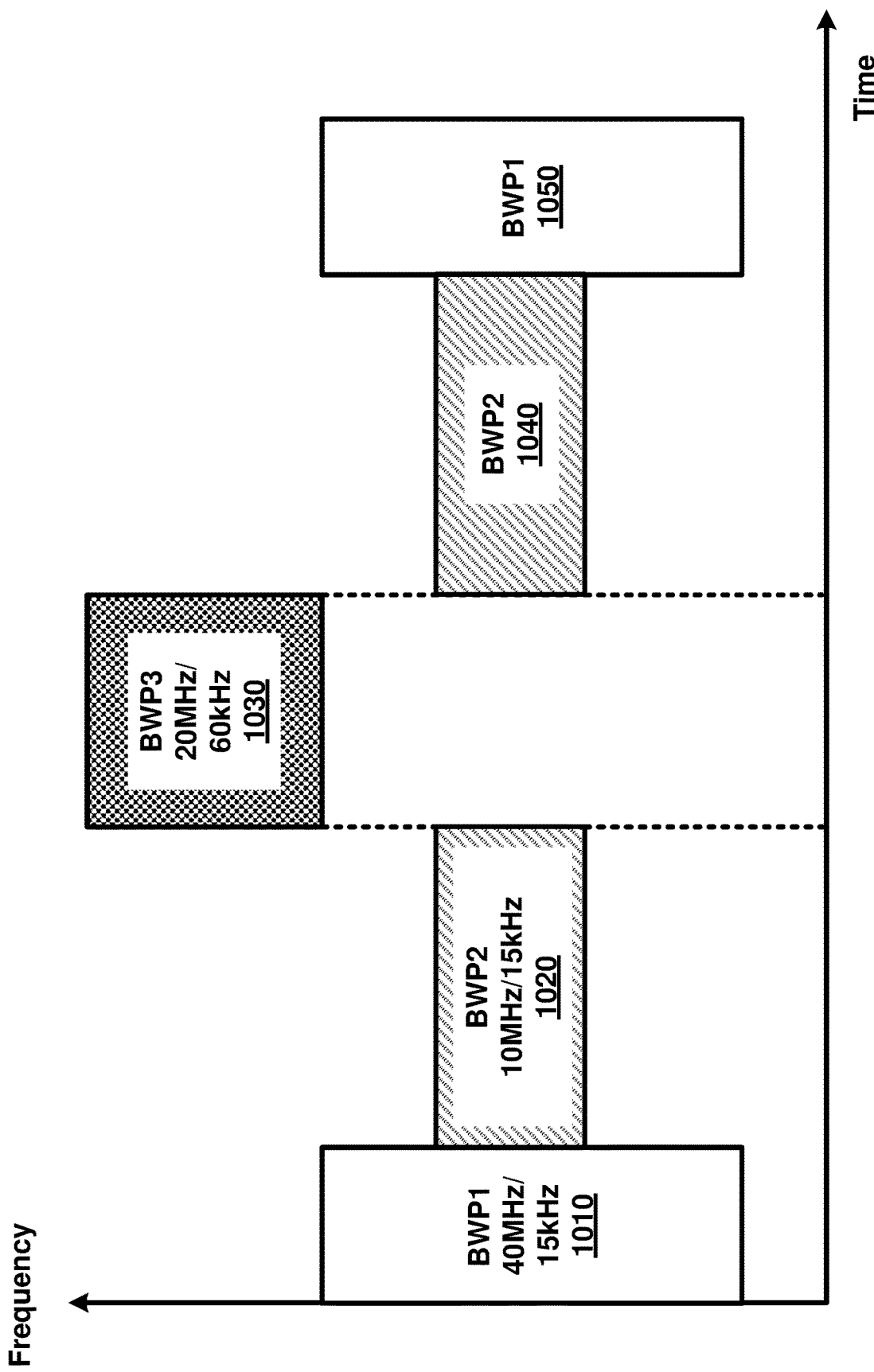
FIG. 10 is an example diagram of configured BWPs as per an aspect of an embodiment of the present disclosure.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base station may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
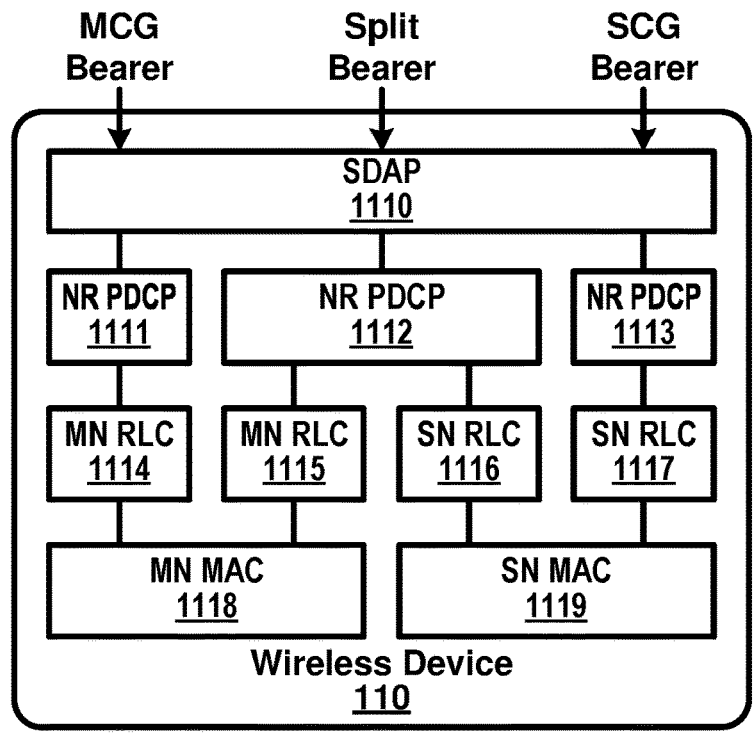
FIG. 11A, and FIG. 11B are diagrams of an example multi connectivity as per an aspect of an embodiment of the present disclosure.
Figure 11B:
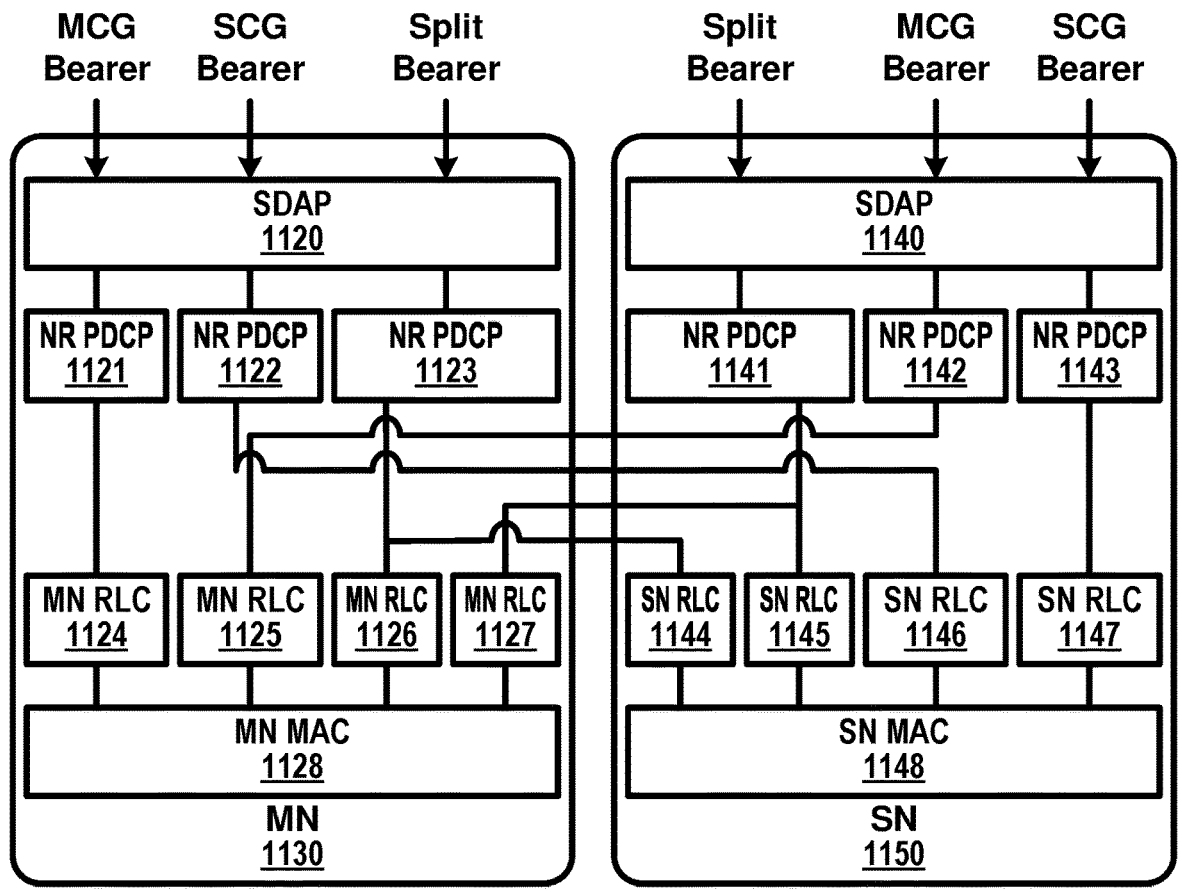

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations. Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain Radio Resource Management (RRM) measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for an SFN acquired from a MIB of a PSCell of a SCG.

Figure 12:
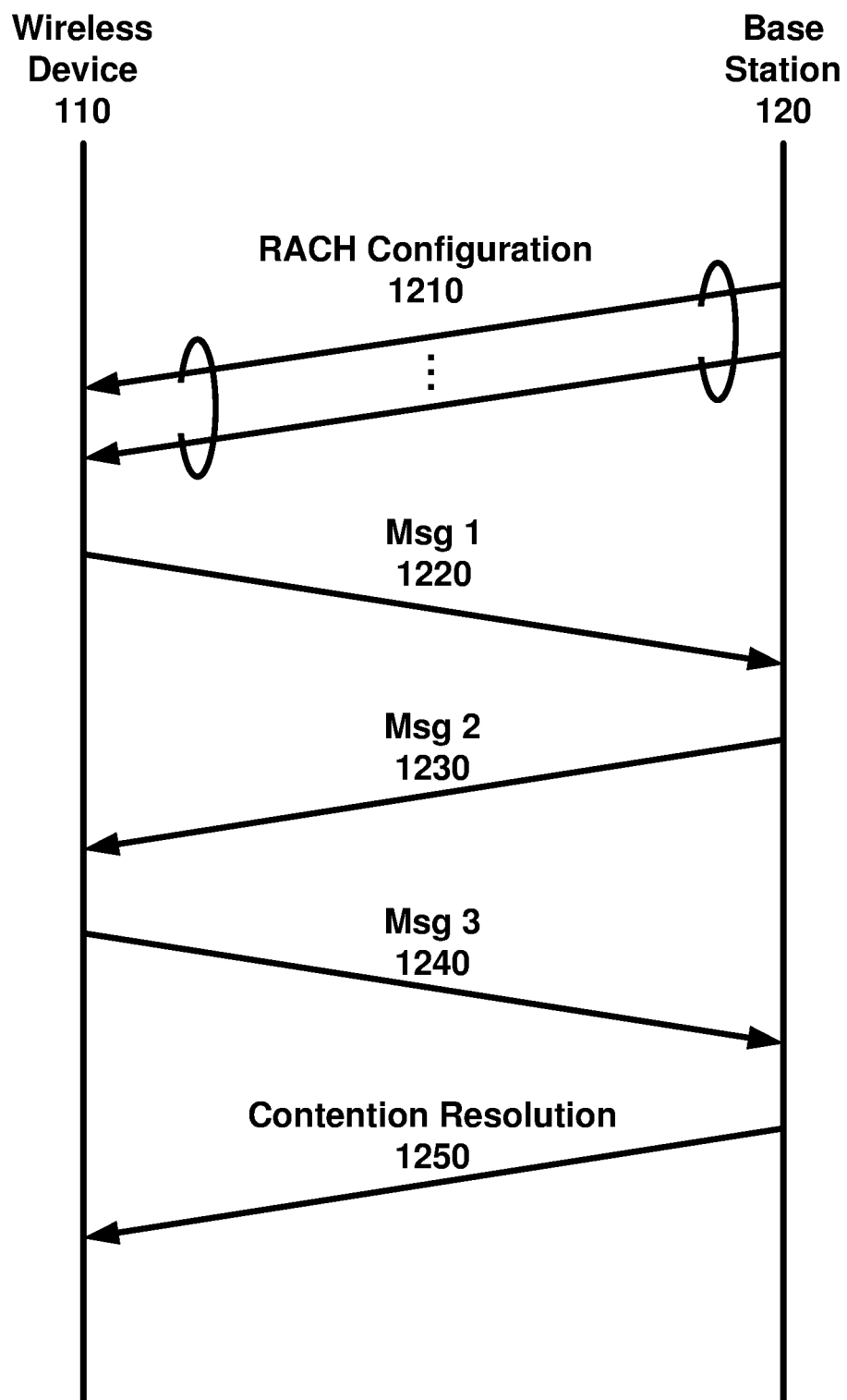
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-ResponseWindow or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may determine a reception of random access response successful if at least one random access response comprises a random access preamble identifier corresponding to a random access preamble transmitted by the UE. A UE may determine the contention free random access procedure successfully completed if a reception of random access response is successful. If a contention free random access procedure is triggered for a beam failure recovery request, a UE may determine a contention free random access procedure successfully complete if a PDCCH transmission is addressed to a C-RNTI. In an example, if at least one random access response comprises a random access preamble identifier, a UE may determine the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may determine contention resolution 1250 successful and may determine a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may determine the contention resolution 1250 successful and may determine the random access procedure successfully completed.

Figure 13:
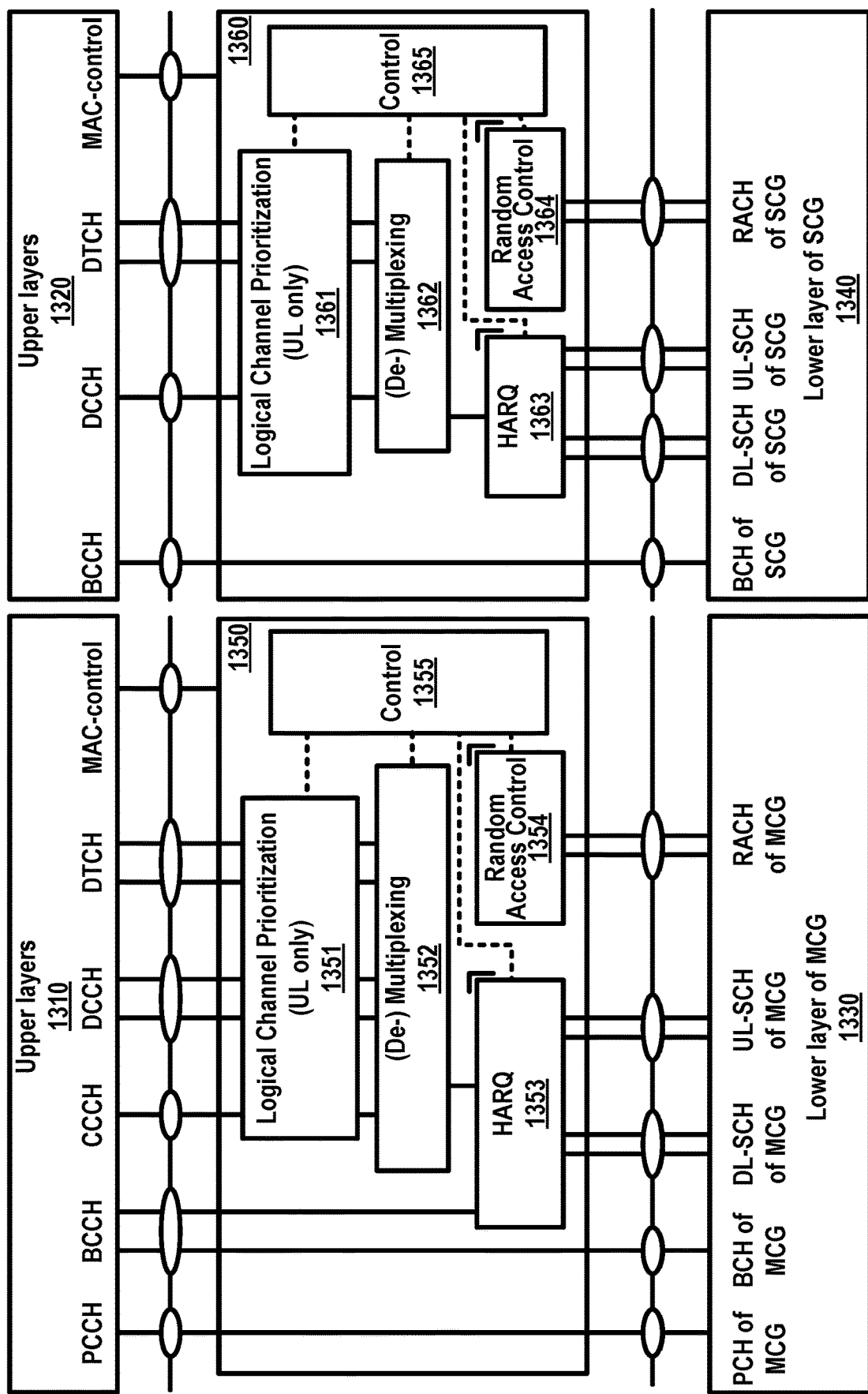
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
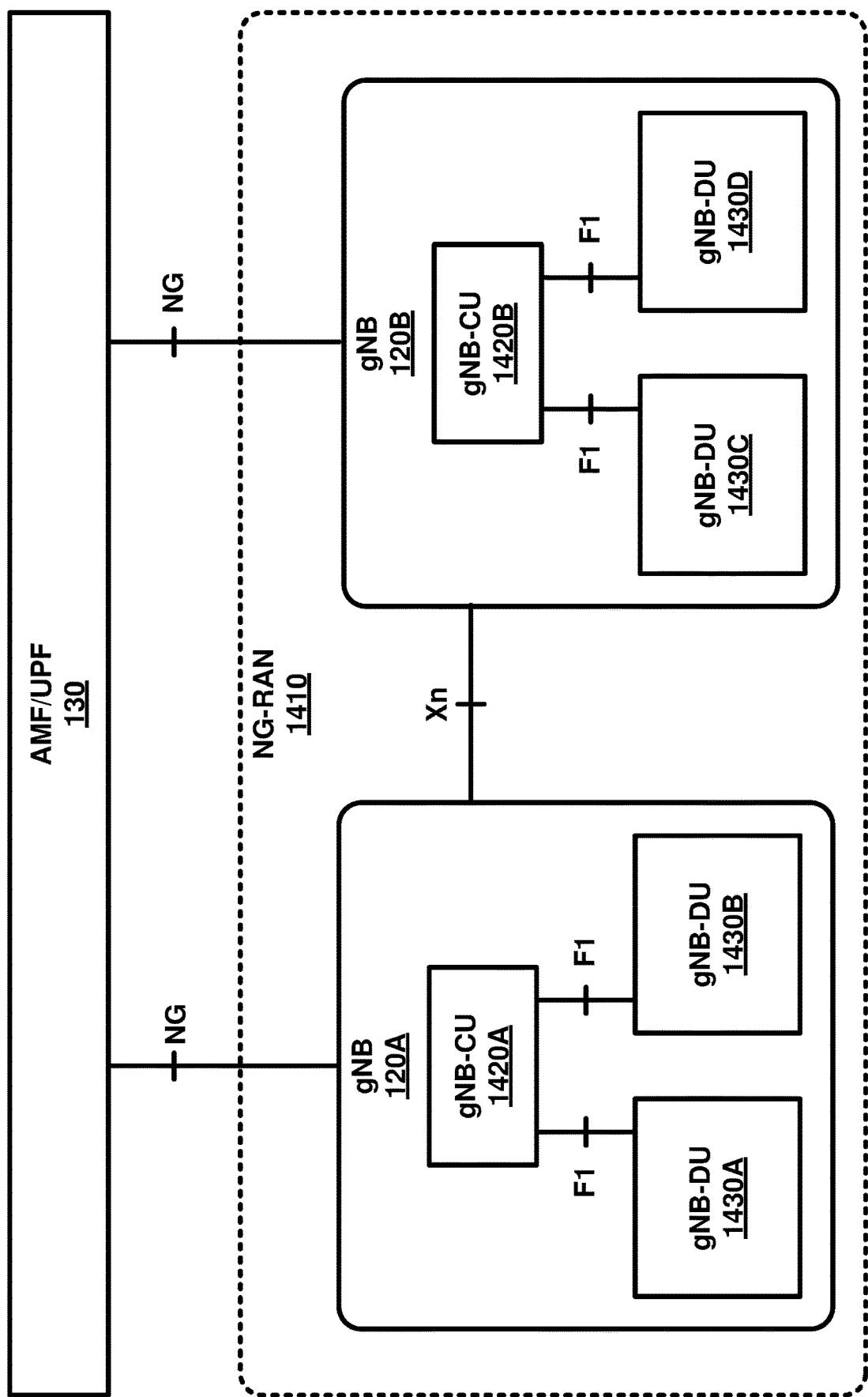
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. gNB 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
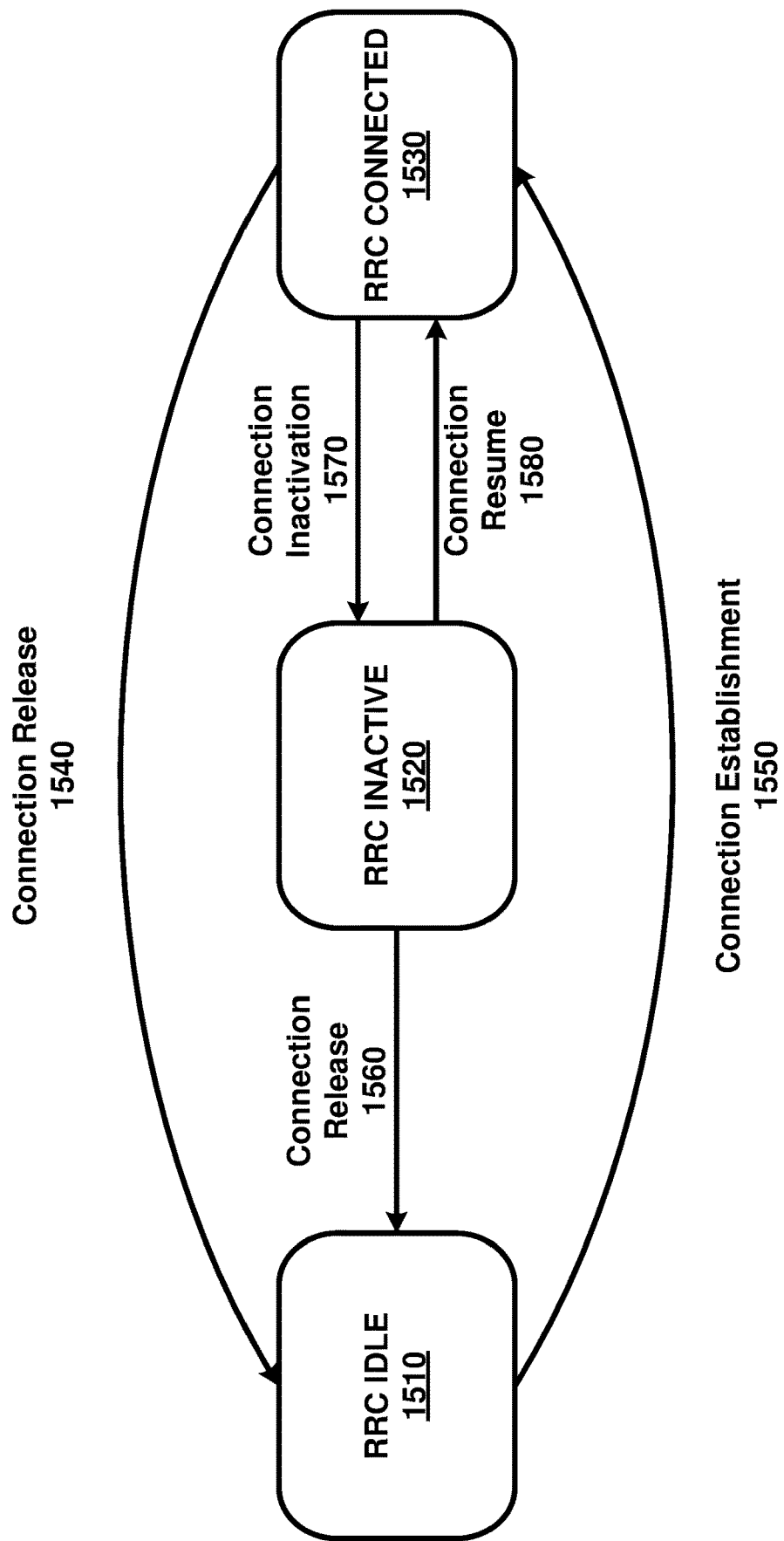
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

A gNB may transmit one or more MAC PDUs to a wireless device. In an example, a MAC PDU may be a bit string that is byte aligned (e.g., a multiple of eight bits) in length. In an example, bit strings may be represented by tables in which the most significant bit is the leftmost bit of the first line of the table, and the least significant bit is the rightmost bit on the last line of the table. More generally, the bit string may be read from left to right and then in the reading order of the lines. In an example, the bit order of a parameter field within a MAC PDU is represented with the first and most significant bit in the leftmost bit and the last and least significant bit in the rightmost bit.

In an example, a MAC SDU may be a bit string that is byte aligned (e.g., a multiple of eight bits) in length. In an example, a MAC SDU may be included in a MAC PDU from the first bit onward.

In an example, a MAC CE may be a bit string that is byte aligned (e.g., a multiple of eight bits) in length.

In an example, a MAC subheader may be a bit string that is byte aligned (e.g., a multiple of eight bits) in length. In an example, a MAC subheader may be placed immediately in front of a corresponding MAC SDU, MAC CE, or padding.

In an example, a MAC entity may ignore a value of reserved bits in a DL MAC PDU.

In an example, a MAC PDU may comprise one or more MAC subPDUs. A MAC subPDU of the one or more MAC subPDUs may comprise: a MAC subheader only (including padding); a MAC subheader and a MAC SDU; a MAC subheader and a MAC CE; and/or a MAC subheader and padding. In an example, the MAC SDU may be of variable size. In an example, a MAC subheader may correspond to a MAC SDU, a MAC CE, or padding.

In an example, when a MAC subheader corresponds to a MAC SDU, a variable-sized MAC CE, or padding, the MAC subheader may comprise: an R field with a one bit length; an F field with a one bit length; an LCID field with a multi-bit length; and/or an L field with a multi-bit length.

Figure 16A:
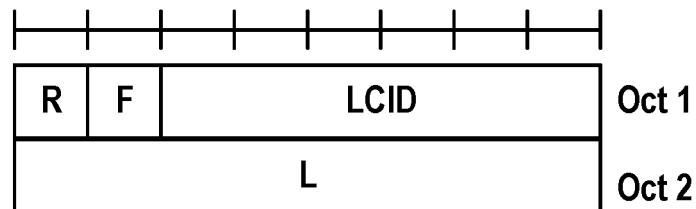
FIG. 16A, FIG. 16B and FIG. 16C are examples of MAC subheaders as per an aspect of an embodiment of the present disclosure.
Figure 16B:
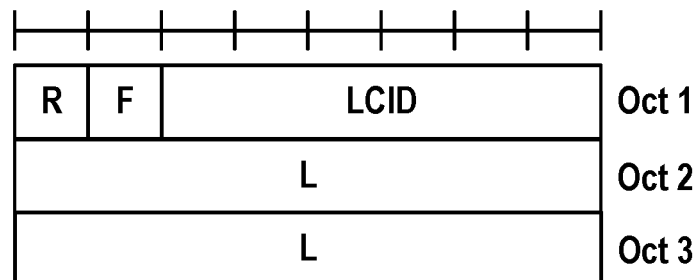

FIG. 16A shows an example of a MAC subheader with an R field, an F field, an LCID field, and an L field. In the example MAC subheader of FIG. 16A, the LCID field may be six bits in length, and the L field may be eight bits in length. FIG. 16B shows example of a MAC subheader with an R field, a F field, an LCID field, and an L field. In the example MAC subheader of FIG. 16B, the LCID field may be six bits in length, and the L field may be sixteen bits in length.

Figure 16C:
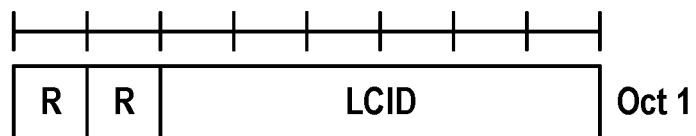

In an example, when a MAC subheader corresponds to a fixed sized MAC CE or padding, the MAC subheader may comprise: an R field with a two bit length and an LCID field with a multi-bit length. FIG. 16C shows an example of a MAC subheader with an R field and an LCID field. In the example MAC subheader of FIG. 16C, the LCID field may be six bits in length, and the R field may be two bits in length.

Figure 17A:
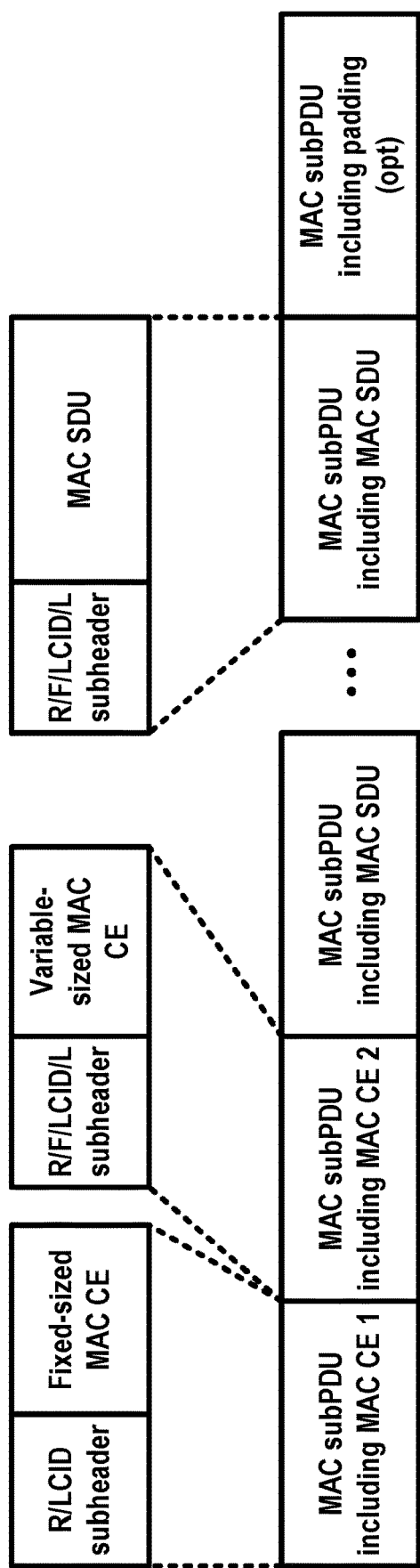
FIG. 17A and FIG. 17B are examples of MAC PDUs as per an aspect of an embodiment of the present disclosure.

FIG. 17A shows an example of a DL MAC PDU. In the example of FIG. 17A, multiple MAC CEs, such as MAC CE 1 and 2, may be placed together. A MAC subPDU comprising a MAC CE may be placed before any MAC subPDU comprising a MAC SDU or a MAC subPDU comprising padding.

Figure 17B:
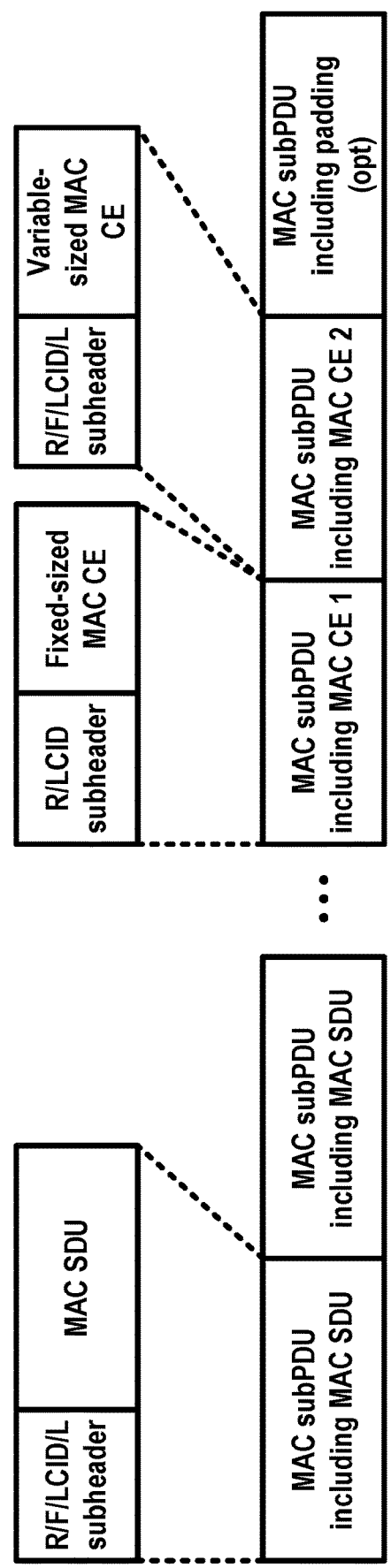

FIG. 17B shows an example of a UL MAC PDU. In the example of FIG. 17B, multiple MAC CEs, such as MAC CE 1 and 2, may be placed together. A MAC subPDU comprising a MAC CE may be placed after all MAC subPDUs comprising a MAC SDU. In addition, the MAC subPDU may be placed before a MAC subPDU comprising padding.

In an example, a MAC entity of a gNB may transmit one or more MAC CEs to a MAC entity of a wireless device. FIG. 18 shows an example of multiple LCIDs that may be associated with the one or more MAC CEs. In the example of FIG. 18, the one or more MAC CEs comprise at least one of: a SP ZP CSI-RS Resource Set Activation/Deactivation MAC CE; a PUCCH spatial relation Activation/Deactivation MAC CE; a SP SRS Activation/Deactivation MAC CE; a SP CSI reporting on PUCCH Activation/Deactivation MAC CE; a TCI State Indication for UE-specific PDCCH MAC CE; a TCI State Indication for UE-specific PDSCH MAC CE; an Aperiodic CSI Trigger State Subselection MAC CE; a SP CSI-RS/CSI-IM Resource Set Activation/Deactivation MAC CE; a UE contention resolution identity MAC CE; a timing advance command MAC CE; a DRX command MAC CE; a Long DRX command MAC CE; an SCell activation/deactivation MAC CE (1 Octet); an SCell activation/deactivation MAC CE (4 Octet); and/or a duplication activation/deactivation MAC CE. In an example, a MAC CE, such as a MAC CE transmitted by a MAC entity of a gNB to a MAC entity of a wireless device, may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a long DRX command MAC CE.

In an example, the MAC entity of the wireless device may transmit to the MAC entity of the gNB one or more MAC CEs. FIG. 19 shows an example of the one or more MAC CEs. The one or more MAC CEs may comprise at least one of: a short buffer status report (BSR) MAC CE; a long BSR MAC CE; a C-RNTI MAC CE; a configured grant confirmation MAC CE; a single entry PHR MAC CE; a multiple entry PHR MAC CE; a short truncated BSR; and/or a long truncated BSR. In an example, a MAC CE may have an LCID in the MAC subheader corresponding to the MAC CE. Different MAC CE may have different LCID in the MAC subheader corresponding to the MAC CE. For example, an LCID given by 111011 in a MAC subheader may indicate that a MAC CE associated with the MAC subheader is a short-truncated command MAC CE.

In carrier aggregation (CA), two or more component carriers (CCs) may be aggregated. A wireless device may simultaneously receive or transmit on one or more CCs, depending on capabilities of the wireless device, using the technique of CA. In an example, a wireless device may support CA for contiguous CCs and/or for non-contiguous CCs. CCs may be organized into cells. For example, CCs may be organized into one primary cell (PCell) and one or more secondary cells (SCells).

When configured with CA, a wireless device may have one RRC connection with a network. During an RRC connection establishment/re-establishment/handover, a cell providing NAS mobility information may be a serving cell. During an RRC connection re-establishment/handover procedure, a cell providing a security input may be a serving cell. In an example, the serving cell may denote a PCell. In an example, a gNB may transmit, to a wireless device, one or more messages comprising configuration parameters of a plurality of one or more SCells, depending on capabilities of the wireless device.

When configured with CA, a base station and/or a wireless device may employ an activation/deactivation mechanism of an SCell to improve battery or power consumption of the wireless device. When a wireless device is configured with one or more SCells, a gNB may activate or deactivate at least one of the one or more SCells. Upon configuration of an SCell, the SCell may be deactivated unless an SCell state associated with the SCell is set to "activated" or "dormant".

In an example, a wireless device may activate/deactivate an SCell in response to receiving an SCell Activation/Deactivation MAC CE.

In an example, a gNB may transmit, to a wireless device, one or more messages comprising an SCell timer (e.g., sCellDeactivationTimer). In an example, a wireless device may deactivate an SCell in response to an expiry of the SCell timer.

When a wireless device receives an SCell Activation/Deactivation MAC CE activating an SCell, the wireless device may activate the SCell. In response to the activating the SCell, the wireless device may perform operations comprising SRS transmissions on the SCell; CQI/PMI/RI/

CRI reporting for the SCell; PDCCH monitoring on the SCell; PDCCH monitoring for the SCell; and/or PUCCH transmissions on the SCell.

In an example, in response to the activating the SCell, the wireless device may start or restart a first SCell timer (e.g., sCellDeactivationTimer) associated with the SCell. The wireless device may start or restart the first SCell timer in the slot when the SCell Activation/Deactivation MAC CE activating the SCell has been received. In an example, in response to the activating the SCell, the wireless device may (re-)initialize one or more suspended configured uplink grants of a configured grant Type 1 associated with the SCell according to a stored configuration. In an example, in response to the activating the SCell, the wireless device may trigger PHR.

When a wireless device receives an SCell Activation/Deactivation MAC CE deactivating an activated SCell, the wireless device may deactivate the activated SCell. In an example, when a first SCell timer (e.g., sCellDeactivationTimer) associated with an activated SCell expires, the wireless device may deactivate the activated SCell. In response to the deactivating the activated SCell, the wireless device may stop the first SCell timer associated with the activated SCell. In an example, in response to the deactivating the activated SCell, the wireless device may clear one or more configured downlink assignments and/or one or more configured uplink grants of a configured uplink grant Type 2 associated with the activated SCell. In an example, in response to the deactivating the activated SCell, the wireless device may: suspend one or more configured uplink grants of a configured uplink grant Type 1 associated with the activated SCell; and/or flush HARQ buffers associated with the activated SCell.

In an example, when an SCell is deactivated, a wireless device may not perform operations comprising: transmitting SRS on the SCell; reporting CQI/PMI/RI/CRI for the SCell; transmitting on UL-SCH on the SCell; transmitting on RACH on the SCell; monitoring at least one first PDCCH on the SCell; monitoring at least one second PDCCH for the SCell; and/or transmitting a PUCCH on the SCell.

In an example, when at least one first PDCCH on an activated SCell indicates an uplink grant or a downlink assignment, a wireless device may restart a first SCell timer (e.g., sCellDeactivationTimer) associated with the activated SCell. In an example, when at least one second PDCCH on a serving cell (e.g. a PCell or an SCell configured with PUCCH, i.e. PUCCH SCell) scheduling the activated SCell indicates an uplink grant or a downlink assignment for the activated SCell, a wireless device may restart the first SCell timer (e.g., sCellDeactivationTimer) associated with the activated SCell.

In an example, when an SCell is deactivated, if there is an ongoing random access procedure on the SCell, a wireless device may abort the ongoing random access procedure on the SCell.

Figure 20A:
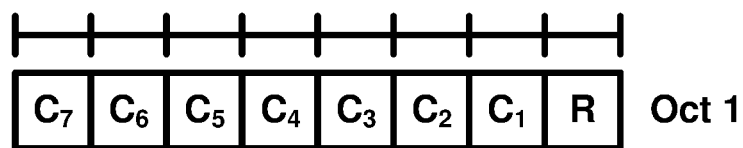
FIG. 20A is an example of an SCell Activation/Deactivation MAC CE of one octet as per an aspect of an embodiment of the present disclosure.

FIG. 20A shows an example of an SCell Activation/Deactivation MAC CE of one octet. A first MAC PDU subheader with a first LCID (e.g., '111010' as shown in FIG. 18) may identify the SCell Activation/Deactivation MAC CE of one octet. The SCell Activation/Deactivation MAC CE of one octet may have a fixed size. The SCell Activation/Deactivation MAC CE of one octet may comprise a single octet. The single octet may comprise a first number of C-fields (e.g. seven) and a second number of R-fields (e.g., one).

Figure 20B:
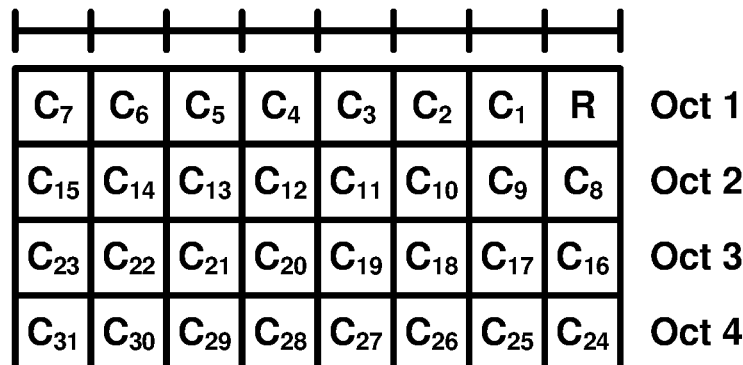
FIG. 20B is an example of an SCell Activation/Deactivation MAC CE of four octets as per an aspect of an embodiment of the present disclosure.

FIG. 20B shows an example of an SCell Activation/Deactivation MAC CE of four octets. A second MAC PDU subheader with a second LCID (e.g., '111001' as shown in FIG. 18) may identify the SCell Activation/Deactivation MAC CE of four octets. The SCell Activation/Deactivation MAC CE of four octets may have a fixed size. The SCell Activation/Deactivation MAC CE of four octets may comprise four octets. The four octets may comprise a third number of C-fields (e.g., 31) and a fourth number of R-fields (e.g., 1).

In FIG. 20A and/or FIG. 20B, a $C_i$ field may indicate an activation/deactivation status of an SCell with an SCell index i if an SCell with SCell index i is configured. In an example, when the $C_i$ field is set to one, an SCell with an SCell index i may be activated. In an example, when the $C_i$ field is set to zero, an SCell with an SCell index i may be deactivated. In an example, if there is no SCell configured with SCell index i, the wireless device may ignore the $C_i$ field. In FIG. 20A and FIG. 20B, an R field may indicate a reserved bit. The R field may be set to zero.

A UE may receive control signaling from a base station. The UE may transmit control signaling to a base station. The control signaling (also referred as L1/L2 control signaling) may originate from the PHY layer (layer 1) and/or the MAC layer (layer 2). The control signaling may comprise downlink control signaling and/or uplink control signaling.

A UE may receive downlink control signaling via a physical downlink control channel (PDCCH). The downlink control signaling may comprise at least one of: downlink scheduling assignments; uplink scheduling grants indicating uplink radio resources and transport format; slot format information; preemption indication; and/or power control command. A UE may receive downlink control signaling contained in a payload transmitted on a PDCCH. The payload transmitted on the PDCCH may be referred to as downlink control information (DCI). In an example, the PDCCH may be a group common PDCCH (GC-PDCCH).

A base station may attach cyclic redundancy check (CRC) parity bits to a DCI, aiming to aid a UE's decoder to detect transmission errors. When the DCI is intended to a UE or a group of UEs, the base station may scramble the CRC parity bits with an identifier of the UE (or an identifier of the group of UEs). The CRC parity bits may comprise one or more bits. Scrambling the CRC parity bits with the identifier may comprise Modulo-2 addition (or an exclusive OR (XOR) operation) of the identifier value and the one or more bits of the CRC parity bits. The identifier of the UE (or the identifier of the group of UEs) may comprise a 16-bit value of a radio network temporary identifier (RNTI).

Based on purposes of DCIs, a number of RNTIs may be defined or configured in a system. A DCI with CRC parity bits scrambled with a paging RNTI (P-RNTI) may indicate paging and/or system information change notification. The P-RNTI may be predefined as "FFFE" in hexa-decimal. A DCI with CRC parity bits scrambled with a system information RNTI (SI-RNTI) may indicate a broadcast transmission of the system information. The SI-RNTI may be predefined as "FFFF" in hexa-decimal. A DCI with CRC parity bits scrambled with a random access RNTI (RA-RNTI) may indicate a random access response. A DCI with CRC parity bits scrambled with a temporary cell RNTI (Temporary C-RNTI) may indicate a contention resolution or a message 3 transmission. A DCI with CRC parity bits scrambled with a cell RNTI (C-RNTI) may indicate a dynamically scheduled unicast transmission. A DCI with CRC parity bits scrambled with a C-RNTI may indicate triggering of PDCCH ordered random access. Other RNTIs, configured to a UE by a base station, may comprise:

CS-RNTI; TPC-PUCCH-RNTI; TPC-PUSCH-RNTI; TPC-SRS-RNTI; INT-RNTI; SFI-RNTI; SP-CSI-RNTI; MCS-RNTI; etc.

Based on purposes of DCIs and/or contents of the DCIs, a base station may transmit to a UE the DCIs with different DCI formats on a PDCCH. Different DCI formats may have different DCI sizes, or share the same DCI size. In an example of a NR system, a DCI format may be one of DCI format 00, 01, 10, 11, 20, 21, 2_2 and 2_3. DCI format 0_0 may be used for scheduling of PUSCH in a cell. DCI format 00 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 10 may be a fallback DCI format (e.g., with compact DCI payloads). DCI format 1_1 may be used for scheduling of PDSCH in a cell (e.g., with more DCI payloads than DCI format 1_0). DCI format 2_0 may be used for notifying a group of UEs of slot format indication. DCI format 2_1 may be used for notifying a group of UEs of PRB(s) and OFDM symbol(s) where UE may assume no transmission is intended to the UE. DCI format 22 may be used for transmission of transmission power control (TPC) command for PUCCH or PUSCH. DCI format 2_3 may be used for transmission of a group of TPC commands for SRS transmissions by one or more UEs. Additional DCI format(s) for new functions may be defined in future releases.

In an example, a base station, after scrambling a DCI with a RNTI, may further process the DCI with channel coding (e.g., Polar coding), rate matching, scrambling and QPSK modulation. A base station may map the coded and modulated DCI on resource elements used and/or configured for a PDCCH. Based on payload size of the DCI and/or coverage of a base station, the base station may transmit the DCI via the PDCCH occupying a number of contiguous control channel elements (CCEs). The number (also referred to as aggregation level) of the contiguous CCEs may be one of 1, 2, 4, 8, 16 and other configured numbers. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping). A CCE-to-REG mapping may be an interleaved mapping (e.g., for purpose of providing frequency diversity), or a non-interleaved mapping (e.g., for purpose of facilitating interference coordination and/or frequency-selective transmission of control channels).

Figure 21A:
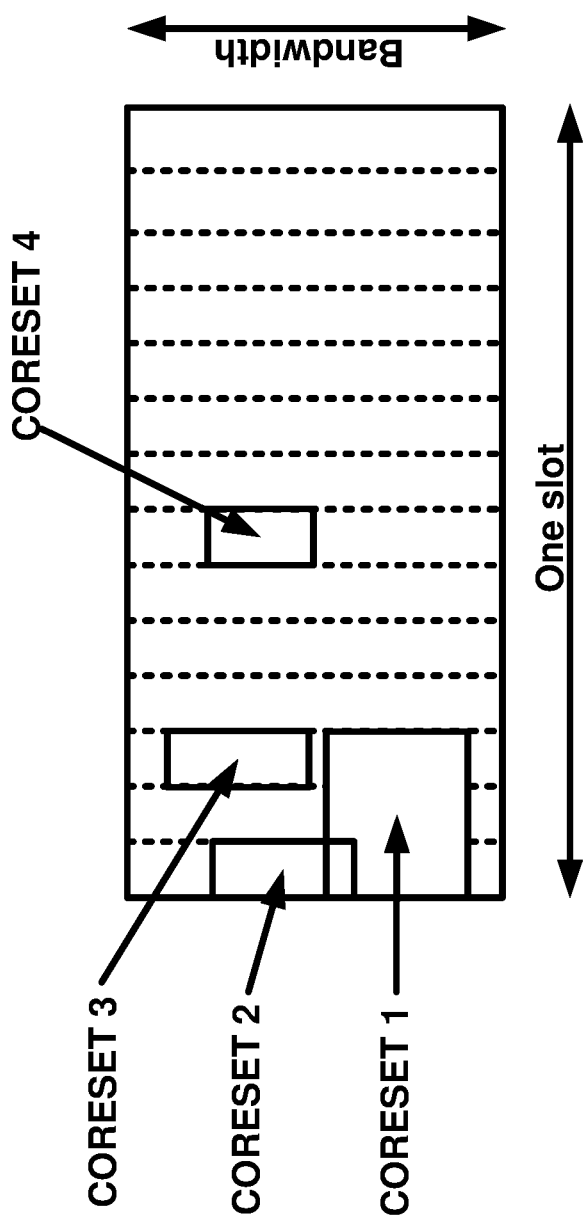
FIG. 21A is an example of control resource set configuration as per an aspect of an embodiment of the present disclosure.

In an example, a base station may transmit one or more DCIs, via PDCCH(s) on one or more control resource sets (referred to as CORESETs), to a UE. A CORESET may comprise a time-frequency resource, in which the UE tries to decode the DCI using one or more search spaces. The base station may configure a size and a location of the CORESET in a time-frequency domain. FIG. 21A shows an example of CORESET configurations for a bandwidth part. As shown in FIG. 21A, a first CORESET (e.g., CORESET 1) and a second COREST (e.g., CORESET 2) may occur at the first symbol in a slot. The first CORESET may overlap with the second CORESET in frequency domain. A third COREST (e.g., CORESET 3) may occur at the third symbol in a slot. A fourth COREST (e.g., CORESET 4) may occur at the seventh symbol in a slot. Different CORESETs may have different number of resource blocks in frequency domain.

In an example, a base station may perform CCE-to-REG mapping (either interleaved or non-interleaved) for DCI transmission on a CORESET. The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DM-RS) for PDCCH reception in the CORESET.

In an example, a base station may transmit RRC messages, comprising configuration parameters of one or more CORESETs and one or more search space sets, to a UE. The configuration parameters may indicate association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and be known to all UEs. A set of CCEs in the UE-specific search space set may be configured based on the UE's identity (e.g., C-RNTI).

Figure 21B:
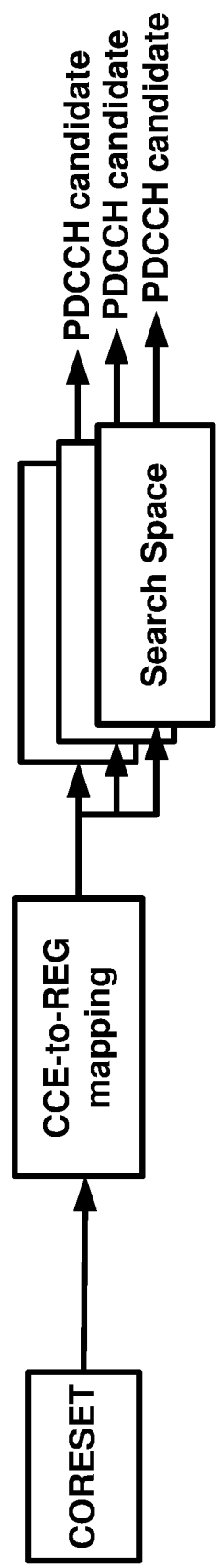
FIG. 21B is an example of mapping of control resource set and search space set as per an aspect of an embodiment of the present disclosure.

FIG. 21B shows an example of PDCCH processing. As shown in FIG. 21B, a UE may determine a time-frequency resource for a CORESET based on RRC messages (e.g., the RRC messages on above). The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of each search space set.

In an example, based on configuration (e.g., the RRC messages on above), a UE may monitor a set of PDCCH candidates in one or more CORESETs for detecting one or more DCIs. Monitoring may comprise decoding each PDCCH candidate of the set of the PDCCH candidates according to the monitored DCI formats. A UE may conduct decoding a DCI content of each PDCCH candidate with all possible (or configured) PDCCH locations, all possible (or configured) PDCCH formats (e.g., number of CCEs, number of PDCCH candidates in common search spaces, and/or number of PDCCH candidates in UE-specific search spaces) and all possible (or configured) DCI formats. The decoding may be referred to as blind decoding. A UE may determine a DCI as valid for the UE, in response to CRC checking (e.g., scrambled bits for CRC parity bits of the DCI matching a RNTI value). The UE may process information (e.g., scheduling assignment, uplink grant, power control, slot format indication, or downlink preemption, etc.) contained in the DCI accordingly.

FIG. 22 shows DCI formats for an example of 20 MHz FDD operation with 2 Tx antennas at the base station and no carrier aggregation in an LTE system. In a NR system, the DCI formats may comprise at least one of: DCI format 0_0/0_1 indicating scheduling of PUSCH in a cell; DCI format 1_0/1_1 indicating scheduling of PDSCH in a cell; DCI format 2_0 notifying a group of UEs of slot format; DCI format 2_1 notifying a group of UEs of PRB(s) and OFDM symbol(s) where a UE may assume no transmission is intended for the UE; DCI format 2_2 indicating transmission of TPC commands for PUCCH and PUSCH; and/or DCI format 2_3 indicating transmission of a group of TPC commands for SRS transmission by one or more UEs. In an example, a gNB may transmit a DCI via a PDCCH for scheduling decision and power-control commends. More specifically, the DCI may comprise at least one of: downlink scheduling assignments, uplink scheduling grants, power-control commands. The downlink scheduling assignments may comprise at least one of: PDSCH resource indication, transport format, HARQ information, and control information related to multiple antenna schemes, a command for power control of the PUCCH used for transmission of ACK/NACK in response to downlink scheduling assignments. The uplink scheduling grants may comprise at least one of: PUSCH resource indication, transport format, and HARQ related information, a power control command of the PUSCH.

In an example, the different types of control information correspond to different DCI message sizes. For example, supporting spatial multiplexing with noncontiguous allocation of RBs in the frequency domain may require a larger scheduling message in comparison with an uplink grant allowing for frequency-contiguous allocation only. The DCI may be categorized into different DCI formats, where a format corresponds to a certain message size and usage.

In an example, a UE may monitor one or more PDCCH candidates to detect one or more DCI with one or more DCI format. The one or more PDCCH may be transmitted in common search space or UE-specific search space. A UE may monitor PDCCH with only a limited set of DCI format, to save power consumption. For example, a normal UE may not be required to detect a DCI with DCI format 6 which is used for an eMTC UE. The more DCI format to be detected, the more power be consumed at the UE.

In an example, the one or more PDCCH candidates that a UE monitors may be defined in terms of PDCCH UE-specific search spaces. A PDCCH UE-specific search space at CCE aggregation level L∈{1, 2, 4, 8} may be defined by a set of PDCCH candidates for CCE aggregation level L. In an example, for a DCI format, a UE may be configured per serving cell by one or more higher layer parameters a number of PDCCH candidates per CCE aggregation level L.

In an example, in non-DRX mode operation, a UE may monitor one or more PDCCH candidate in control resource set q according to a periodicity of $W_{PDCCH,q}$ symbols that may be configured by one or more higher layer parameters for control resource set q.

In an example, the information in the DCI formats used for downlink scheduling may be organized into different groups, with the field present varying between the DCI formats, including at least one of: resource information, consisting of: carrier indicator (0 or 3 bits), RB allocation; HARQ process number; MCS, NDI, and RV (for the first TB); MCS, NDI and RV (for the second TB); MIMO related information; PDSCH resource-element mapping and QCI; Downlink assignment index (DAI); TPC for PUCCH; SRS request (1 bit), triggering one-shot SRS transmission; ACK/NACK offset; DCI format 0/1A indication, used to differentiate between DCI format 1A and 0; and padding if necessary. The MIMO related information may comprise at least one of: PMI, precoding information, transport block swap flag, power offset between PDSCH and reference signal, reference-signal scrambling sequence, number of layers, and/or antenna ports for the transmission.

In an example, the information in the DCI formats used for uplink scheduling may be organized into different groups, with the field present varying between the DCI formats, including at least one of: resource information, consisting of: carrier indicator, resource allocation type, RB allocation; MCS, NDI (for the first TB); MCS, NDI (for the second TB); phase rotation of the uplink DMRS; precoding information; CSI request, requesting an aperiodic CSI report; SRS request (2 bit), used to trigger aperiodic SRS transmission using one of up to three preconfigured settings; uplink index/DAI; TPC for PUSCH; DCI format 0/1A indication; and padding if necessary.

In an example, a gNB may perform cyclic redundancy check (CRC) scrambling for a DCI, before transmitting the DCI via a PDCCH. The gNB may perform CRC scrambling by bit-wise addition (or Modulo-2 addition or exclusive OR (XOR) operation) of multiple bits of at least one wireless device identifier (e.g., C-RNTI, CS-RNTI, TPC-CS-RNTI, TPC-PUCCH-RNTI, TPC-PUSCH-RNTI, SP CSI C-RNTI, SRS-TPC-RNTI, INT-RNTI, SFI-RNTI, P-RNTI, SI-RNTI, RA-RNTI, and/or MCS-C-RNTI) with the CRC bits of the DCI. The wireless device may check the CRC bits of the DCI, when detecting the DCI. The wireless device may receive the DCI when the CRC is scrambled by a sequence of bits that is the same as the at least one wireless device identifier.

In a NR system, in order to support wide bandwidth operation, a gNB may transmit one or more PDCCH in different control resource sets. A gNB may transmit one or more RRC message comprising configuration parameters of one or more control resource sets. At least one of the one or more control resource sets may comprise at least one of: a first OFDM symbol; a number of consecutive OFDM symbols; a set of resource blocks; a CCE-to-REG mapping; and a REG bundle size, in case of interleaved CCE-to-REG mapping.

A base station (gNB) may configure a wireless device (UE) with uplink (UL) bandwidth parts (BWPs) and downlink (DL) BWPs to enable bandwidth adaptation (BA) on a PCell. If carrier aggregation is configured, the gNB may further configure the UE with at least DL BWP(s) (i.e., there may be no UL BWPs in the UL) to enable BA on an SCell. For the PCell, an initial active BWP may be a first BWP used for initial access. For the SCell, a first active BWP may be a second BWP configured for the UE to operate on the SCell upon the SCell being activated.

In paired spectrum (e.g. FDD), a gNB and/or a UE may independently switch a DL BWP and an UL BWP. In unpaired spectrum (e.g. TDD), a gNB and/or a UE may simultaneously switch a DL BWP and an UL BWP.

In an example, a gNB and/or a UE may switch a BWP between configured BWPs by means of a DCI or a BWP inactivity timer. When the BWP inactivity timer is configured for a serving cell, the gNB and/or the UE may switch an active BWP to a default BWP in response to an expiry of the BWP inactivity timer associated with the serving cell. The default BWP may be configured by the network.

In an example, for FDD systems, when configured with BA, one UL BWP for each uplink carrier and one DL BWP may be active at a time in an active serving cell. In an example, for TDD systems, one DL/UL BWP pair may be active at a time in an active serving cell. Operating on the one UL BWP and the one DL BWP (or the one DL/UL pair) may improve UE battery consumption. BWPs other than the one active UL BWP and the one active DL BWP that the UE may work on may be deactivated. On deactivated BWPs, the UE may: not monitor PDCCH; and/or not transmit on PUCCH, PRACH, and UL-SCH.

In an example, a serving cell may be configured with at most a first number (e.g., four) of BWPs. In an example, for an activated serving cell, there may be one active BWP at any point in time.

In an example, a BWP switching for a serving cell may be used to activate an inactive BWP and deactivate an active BWP at a time. In an example, the BWP switching may be controlled by a PDCCH indicating a downlink assignment or an uplink grant. In an example, the BWP switching may be controlled by a BWP inactivity timer (e.g., bwp-Inactivity-Timer). In an example, the BWP switching may be controlled by a MAC entity in response to initiating a Random Access procedure. Upon addition of an SpCell or activation of an SCell, one BWP may be initially active without receiving a PDCCH indicating a downlink assignment or an uplink grant. The active BWP for a serving cell may be indicated by RRC and/or PDCCH. In an example, for unpaired spectrum, a DL BWP may be paired with a UL BWP, and BWP switching may be common for both UL and DL.

Figure 23:
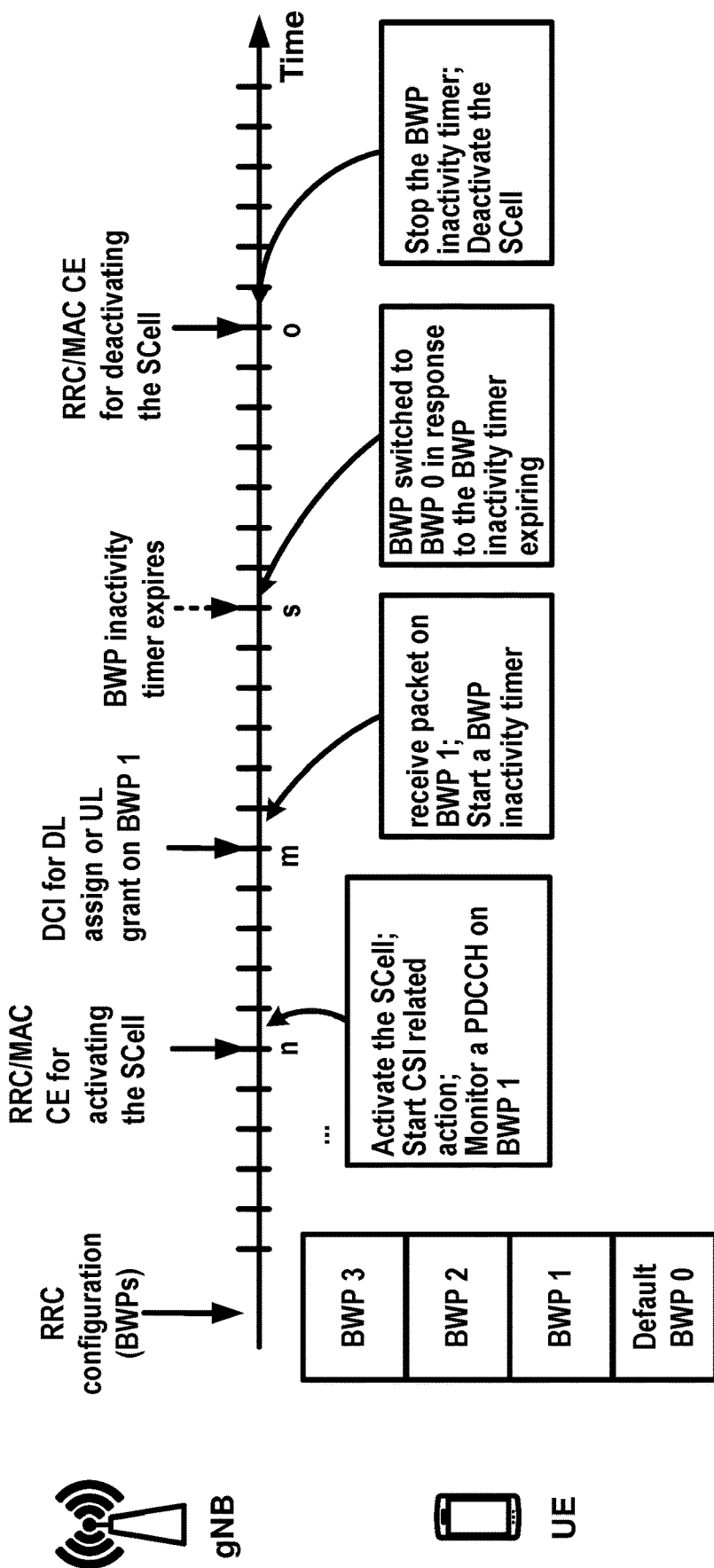
FIG. 23 is an example of BWP management on an SCell as per an aspect of an embodiment of the present disclosure.

FIG. 23 shows an example of BWP switching on an SCell. In an example, a UE may receive RRC message comprising parameters of a SCell and one or more BWP configuration associated with the SCell. The RRC message may comprise: RRC connection reconfiguration message (e.g., RRCReconfiguration); RRC connection reestablishment message (e.g., RRCRestablishment); and/or RRC connection setup message (e.g., RRCSetup). Among the one or more BWPs, at least one BWP may be configured as the first active BWP (e.g., BWP 1 in FIG. 23), one BWP as the default BWP (e.g., BWP 0 in FIG. 23). The UE may receive a MAC CE to activate the SCell at $n^{th}$ slot. The UE may start a SCell deactivation timer (e.g., sCellDeactivationTimer), and start CSI related actions for the SCell, and/or start CSI related actions for the first active BWP of the SCell. The UE may start monitoring a PDCCH on BWP 1 in response to activating the SCell.

In an example, the UE may start restart a BWP inactivity timer (e.g., bwp-InactivityTimer) at $m^{th}$ slot in response to receiving a DCI indicating DL assignment on BWP 1. The UE may switch back to the default BWP (e.g., BWP 0) as an active BWP when the BWP inactivity timer expires, at $s^{th}$ slot. The UE may deactivate the SCell and/or stop the BWP inactivity timer when the sCellDeactivationTimer expires.

Employing the BWP inactivity timer may further reduce UE's power consumption when the UE is configured with multiple cells with each cell having wide bandwidth (e.g., 1 GHz). The UE may only transmit on or receive from a narrow-bandwidth BWP (e.g., 5 MHz) on the PCell or SCell when there is no activity on an active BWP.

In an example, a MAC entity may apply normal operations on an active BWP for an activated serving cell configured with a BWP comprising: transmitting on UL-SCH; transmitting on RACH; monitoring a PDCCH; transmitting PUCCH; receiving DL-SCH; and/or (re-) initializing any suspended configured uplink grants of configured grant Type 1 according to a stored configuration, if any.

In an example, on an inactive BWP for each activated serving cell configured with a BWP, a MAC entity may: not transmit on UL-SCH; not transmit on RACH; not monitor a PDCCH; not transmit PUCCH; not transmit SRS, not receive DL-SCH; clear any configured downlink assignment and configured uplink grant of configured grant Type 2; and/or suspend any configured uplink grant of configured Type 1.

In an example, if a MAC entity receives a PDCCH for a BWP switching of a serving cell while a Random Access procedure associated with this serving cell is not ongoing, a UE may perform the BWP switching to a BWP indicated by the PDCCH.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 01, the bandwidth part indicator field value may indicate the active UL BWP, from the configured UL BWP set, for UL transmissions.

In an example, for a primary cell, a UE may be provided by a higher layer parameter Default-DL-BWP a default DL BWP among the configured DL BWPs. If a UE is not provided a default DL BWP by the higher layer parameter Default-DL-BWP, the default DL BWP is the initial active DL BWP.

In an example, a UE may be provided by higher layer parameter bwp-InactivityTimer, a timer value for the primary cell. If configured, the UE may increment the timer, if running, every interval of 1 millisecond for frequency range 1 or every 0.5 milliseconds for frequency range 2 if the UE may not detect a DCI format 1_1 for paired spectrum operation or if the UE may not detect a DCI format 1_1 or DCI format 0_1 for unpaired spectrum operation during the interval.

In an example, if a UE is configured for a secondary cell with higher layer parameter Default-DL-BWP indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter Active-BWP-DL-SCell a first active DL BWP and by higher layer parameter Active-BWP-UL-SCell a first active UL BWP on a secondary cell or carrier, the UE may use the indicated DL BWP and the indicated UL BWP on the secondary cell as the respective first active DL BWP and first active UL BWP on the secondary cell or carrier.

In an example, a wireless device may transmit one or more uplink control information (UCI) via one or more PUCCH resources to a base station. The one or more UCI may comprise at least one of: HARQ-ACK information; scheduling request (SR); and/or CSI report. In an example, a PUCCH resource may be identified by at least: frequency location (e.g., starting PRB); and/or a PUCCH format associated with initial cyclic shift of a base sequence and time domain location (e.g., starting symbol index). In an example, a PUCCH format may be PUCCH format 0, PUCCH format 1, PUCCH format 2, PUCCH format 3, or PUCCH format 4. A PUCCH format 0 may have a length of 1 or 2 OFDM symbols and be less than or equal to 2 bits. A PUCCH format 1 may occupy a number between 4 and 14 of OFDM symbols and be less than or equal to 2 bits. A PUCCH format 2 may occupy 1 or 2 OFDM symbols and be greater than 2 bits. A PUCCH format 3 may occupy a number between 4 and 14 of OFDM symbols and be greater than 2 bits. A PUCCH format 4 may occupy a number between 4 and 14 of OFDM symbols and be greater than 2 bits. The PUCCH resource may be configured on a PCell, or a PUCCH secondary cell.

In an example, when configured with multiple uplink BWPs, a base station may transmit to a wireless device, one or more RRC messages comprising configuration parameters of one or more PUCCH resource sets (e.g., at most 4 sets) on an uplink BWP of the multiple uplink BWPs. Each PUCCH resource set may be configured with a PUCCH resource set index, a list of PUCCH resources with each PUCCH resource being identified by a PUCCH resource identifier (e.g., pucch-Resourceid), and/or a maximum number of UCI information bits a wireless device may transmit using one of the plurality of PUCCH resources in the PUCCH resource set.

In an example, when configured with one or more PUCCH resource sets, a wireless device may select one of the one or more PUCCH resource sets based on a total bit length of UCI information bits (e.g., HARQ-ARQ bits, SR, and/or CSI) the wireless device will transmit. In an example, when the total bit length of UCI information bits is less than or equal to 2, the wireless device may select a first PUCCH resource set with the PUCCH resource set index equal to "0". In an example, when the total bit length of UCI information bits is greater than 2 and less than or equal to a first configured value, the wireless device may select a second PUCCH resource set with the PUCCH resource set index equal to "1". In an example, when the total bit length of UCI information bits is greater than the first configured value and less than or equal to a second configured value, the wireless device may select a third PUCCH resource set with the PUCCH resource set index equal to "2". In an example, when the total bit length of UCI information bits is greater than the second configured value and less than or equal to a third value (e.g., 1706), the wireless device may select a fourth PUCCH resource set with the PUCCH resource set index equal to "3".

In an example, a wireless device may determine, based on a number of uplink symbols of UCI transmission and a number of UCI bits, a PUCCH format from a plurality of PUCCH formats comprising PUCCH format 0, PUCCH format 1, PUCCH format 2, PUCCH format 3 and/or PUCCH format 4. In an example, the wireless device may transmit UCI in a PUCCH using PUCCH format 0 if the transmission is over 1 symbol or 2 symbols and the number of HARQ-ACK information bits with positive or negative SR (HARQ-ACK/SR bits) is 1 or 2. In an example, the wireless device may transmit UCI in a PUCCH using PUCCH format 1 if the transmission is over 4 or more symbols and the number of HARQ-ACK/SR bits is 1 or 2. In an example, the wireless device may transmit UCI in a PUCCH using PUCCH format 2 if the transmission is over 1 symbol or 2 symbols and the number of UCI bits is more than 2. In an example, the wireless device may transmit UCI in a PUCCH using PUCCH format 3 if the transmission is over 4 or more symbols, the number of UCI bits is more than 2 and PUCCH resource does not include an orthogonal cover code. In an example, the wireless device may transmit UCI in a PUCCH using PUCCH format 4 if the transmission is over 4 or more symbols, the number of UCI bits is more than 2 and the PUCCH resource includes an orthogonal cover code.

In an example, in order to transmit HARQ-ACK information on a PUCCH resource, a wireless device may determine the PUCCH resource from a PUCCH resource set. The PUCCH resource set may be determined as mentioned above. The wireless device may determine the PUCCH resource based on a PUCCH resource indicator field in a DCI (e.g., with a DCI format 1_0 or DCI for 1_1) received on a PDCCH. A 3-bit PUCCH resource indicator field in the DCI may indicate one of eight PUCCH resources in the PUCCH resource set. The wireless device may transmit the HARQ-ACK information in a PUCCH resource indicated by the 3-bit PUCCH resource indicator field in the DCI.

In an example, the wireless device may transmit one or more UCI bits via a PUCCH resource of an active uplink BWP of a PCell or a PUCCH secondary cell. Since at most one active uplink BWP in a cell is supported for a wireless device, the PUCCH resource indicated in the DCI is naturally a PUCCH resource on the active uplink BWP of the cell.

In an example, a wireless device may receive an uplink grant dynamically on a PDCCH or in a random access response (RAR). The wireless device may receive an uplink grant configured semi-persistently by a radio resource control (RRC) message. The wireless device may transmit, via the uplink grant, an uplink transport block (TB) on an uplink shared channel (UL-SCH). To transmit the uplink transport block, a medium access control (MAC) layer of the wireless device may receive one or more HARQ information from lower layers (e.g., physical layer) of the wireless device. The one or more HARQ information may comprise at least one of: HARQ process identifier (ID); new data indicator (NDI); redundancy version (RV); and/or transport block size (TBS).

In an example, if a MAC entity of a wireless device has a C-RNTI, a Temporary C-RNTI (TC-RNTI), or a configured scheduling RNTI (CS-RNTI), for each PDCCH occasion and for each serving cell belonging to a time alignment group (TAG) that has a running timeAlignmentTimer and for each uplink grant received for the PDCCH occasion, if the uplink grant for the serving Cell has been received on the PDCCH for the MAC entity's C-RNTI or TC-RNTI, the MAC entity may deliver the uplink grant and one or more associated HARQ information to the HARQ entity.

In an example, for each Serving Cell and each configured uplink grant, if configured and activated, the MAC entity may set the HARQ Process ID to the HARQ Process ID associated with a PUSCH duration, if the PUSCH duration of the configured uplink grant does not overlap with a second PUSCH duration of an uplink grant received on the PDCCH or in a Random Access Response for the Serving Cell. The MAC entity may determine the NDI bit for the corresponding HARQ process to have been toggled and deliver the configured uplink grant and the associated HARQ information to the HARQ entity, if configuredGrantTimer for the corresponding HARQ process is not running. In an example, for a configured uplink grant, a wireless device and/or a base station may determine a HARQ Process ID associated with a first symbol of a UL transmission as: HARQ Process ID=[floor(CURRENT_symbol/periodicity)] modulo nrofHARQ-Processes, where CURRENT_symbol= (SFN×numberOfSlotsPerFrame×numberOfSymbolsPerSlot+slot number in the frame× numberOfSymbolsPerSlot+symbol number in the slot), SFN is a system frame number of a frame of the current symbol, numberOfSlotsPerFrame and numberOfSymbolsPerSlot refer to the number of consecutive slots per frame and the number of consecutive symbols per slot respectively. nrofHARQ-Processes is a maximum number of parallel HARQ processes configured by RRC message. In an example, CURRENT_symbol may refer to a symbol index of the first transmission occasion of a repetition bundle that takes place.

In an example, a MAC entity of a wireless device may comprise a HARQ entity for each serving cell with configured uplink (e.g., comprising a case when the wireless device is configured with a supplementary uplink). The HARQ entity may maintain a number of parallel HARQ processes. Each HARQ process of the number of parallel HARQ processes may support one TB, and the HARQ process may be associated with a HARQ process identifier (ID). For UL transmission with UL grant in RA Response, HARQ process identifier 0 may be used.

Figure 24:
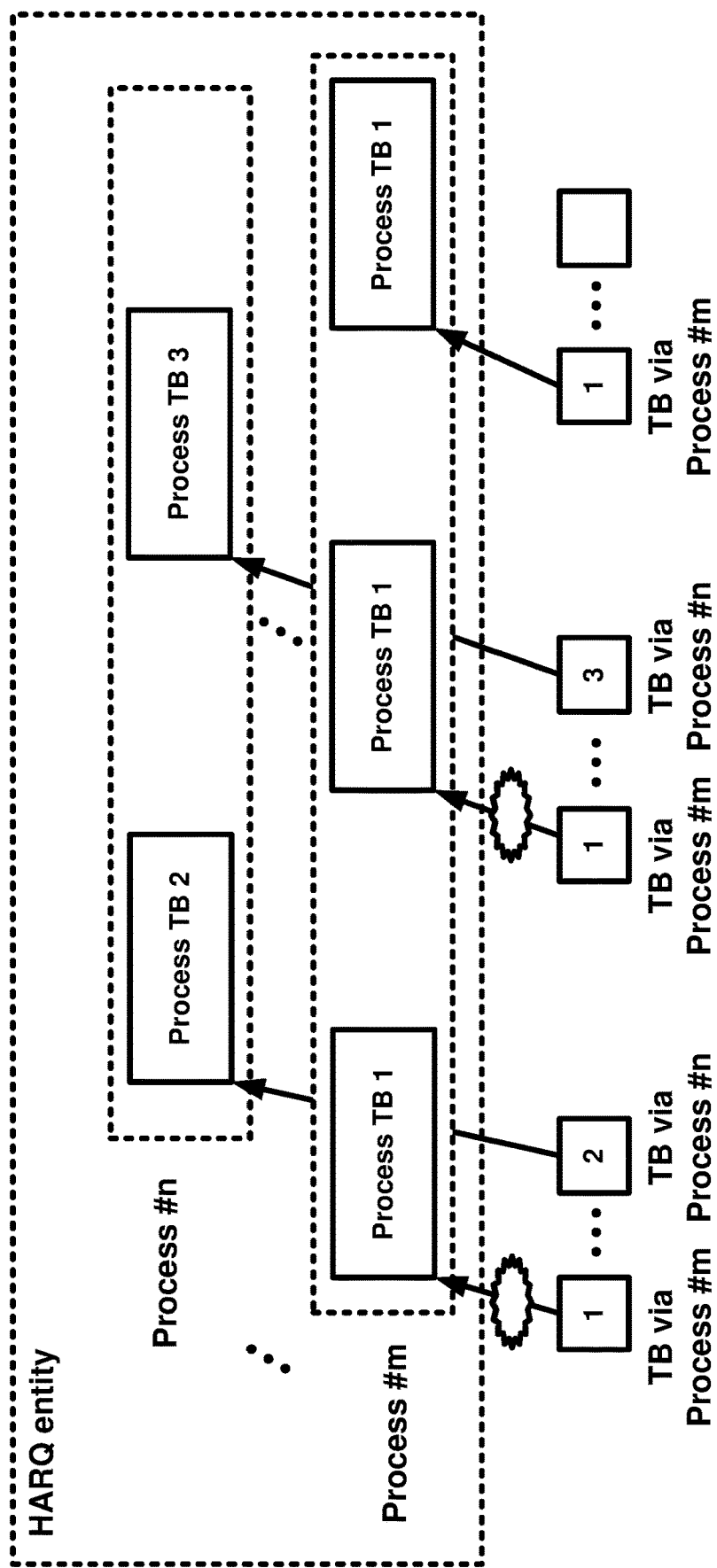
FIG. 24 is an example of HARQ process management as per an aspect of an embodiment of the present disclosure.

FIG. 24 shows an example of a HARQ entity configured with multiple HARQ processes. As shown in FIG. 24, a HARQ entity may comprise a number of parallel HARQ processes (e.g., Process #m, Process #n, etc.). Process #m may be identified with a first HARQ process identifier (e.g., m). Process #n may be identified with a second HARQ process identifier (e.g., n). In an example, when transmitting uplink data to a base station, a wireless device may process TB 1 in Process #m. The wireless device may process TB 2 in Process #n. In response to TB 1 being not successfully decoded by a base station, the base station may require a retransmission of TB 1 from the wireless device. The wireless device may retransmit TB 1 based on HARQ buffer of Process #m. Similarly, in response to TB 2 being successfully decoded, the base station may indicated to the wireless device a new data transport block (e.g., TB 3) for Process #n.

As shown in FIG. 24, a HARQ entity may comprise a number of parallel HARQ processes (e.g., Process #m, Process #n, etc.). Process #m may be identified with a first HARQ process identifier (e.g., m). Process #n may be identified with a second HARQ process identifier (e.g., n). In an example, when receiving downlink data from the base station, a wireless device may process TB 1 in Process #m. The wireless device may process TB 2 in Process #n. In response to TB 1 being not successfully decoded by a wireless device, the wireless device may store received data of TB1 in a soft buffer of Process #m. The wireless device may transmit a negative acknowledgement (NACK) for TB 1 to the base station. In response to the NACK, the base station may retransmit TB 1. The wireless device may attempt to decode TB 1 based on the stored data of TB 1 in the soft buffer and received data of retransmission of TB 1. Similarly, in response to TB 2 being successfully decoded, the wireless device may transmit a positive acknowledgement (ACK) for TB 2 to the base station. In response to TB 2 being successfully decoded, the wireless device may deliver decoded data (e.g., MAC PDU) to a disassembly and demultiplexing entity of the wireless device. In response to the positive acknowledgement, the base station may transmit a new transport block (e.g., TB 3) by using Process #n.

In an example, when a MAC entity of a wireless device is configured with PUSCH repetition (e.g., pusch-AggregationFactor>1), the parameter pusch-AggregationFactor may indicate a number of transmissions of a TB within a bundle of a dynamic grant. After the initial transmission, the wireless device may perform pusch-AggregationFactor-1 HARQ retransmissions within a bundle. When the MAC entity is configured with repK>1, the parameter repK may indicate a number of transmissions of a TB within a bundle of a configured uplink grant. After the initial transmission, HARQ retransmissions may follow within a bundle. For both dynamic grant and configured uplink grant, bundling operation may rely on the HARQ entity for invoking the same HARQ process for each transmission that is part of the same bundle. Within a bundle, the wireless device may trigger HARQ retransmissions without waiting for feedback from previous transmission according to pusch-AggregationFactor for the dynamic grant and/or according to repK for the configured uplink grant, respectively. Each transmission within a bundle may be a separate uplink grant after the initial uplink grant within a bundle is delivered to the HARQ entity.

In an example, for each transmission within a bundle of a dynamic grant, the wireless device may determine a sequence of redundancy versions based on one or more fields of a DCI carrying the dynamic grant. For each transmission within a bundle of a configured uplink grant, the wireless device may determine a sequence of redundancy versions based on one or more configuration parameters in a RRC message.

In an example, for an uplink grant, a HARQ entity of a wireless device may identify a HARQ process associated with the uplink grant. For the identified HARQ process, if the received uplink grant is not addressed to a TC-RNTI on PDCCH, and an NDI provided in the associated HARQ information has been toggled compared to an NDI value in the previous transmission of the TB of the HARQ process, the HARQ entity may obtain a MAC PDU to transmit from a multiplexing and assembly entity of the wireless device. In response to obtaining the MAC PDU, the HARQ entity may deliver the MAC PDU, the uplink grant, and the HARQ information of the TB to the identified HARQ process and instruct the identified HARQ process to trigger a new transmission. In an example, for the identified HARQ process, if the received uplink grant is addressed to a TC-RNTI on PDCCH, or the NDI provided in the associated HARQ information has not been toggled compared to the NDI value in the previous transmission of the TB of the HARQ process, the HARQ entity may deliver the uplink grant and the HARQ information (e.g., redundancy version) of the TB to the identified HARQ process, and instruct the identified HARQ process to trigger a retransmission.

In an example, a HARQ process may be associated with a HARQ buffer. A wireless device may perform a new transmission on a resource and with a modulation coding scheme (MCS) indicated on either a PDCCH, a RAR, or a RRC message. In an example, the wireless device may perform a retransmission on a resource and (if provided) with a MCS indicated on PDCCH, or on a same resource and with a same MCS as was used for last transmission attempt within a bundle.

In an example, if a HARQ entity requests a new transmission of a TB, a HARQ process may store the MAC PDU in an associated HARQ buffer, store the uplink grant received from the HARQ entity, and generate a transmission for the TB. If the HARQ entity requests a retransmission for a TB, the HARQ process may store the uplink grant received from the HARQ entity and generate a transmission for the TB. In an example, to generate a transmission for a TB, the HARQ process may instruct the physical layer to generate a transmission according to the stored uplink grant if the MAC PDU was obtained from a Msg3 buffer or if there is no measurement gap at the time of the transmission and, in case of retransmission, if the retransmission does not collide with a transmission for the MAC PDU obtained from the Msg3 buffer.

Figure 25:
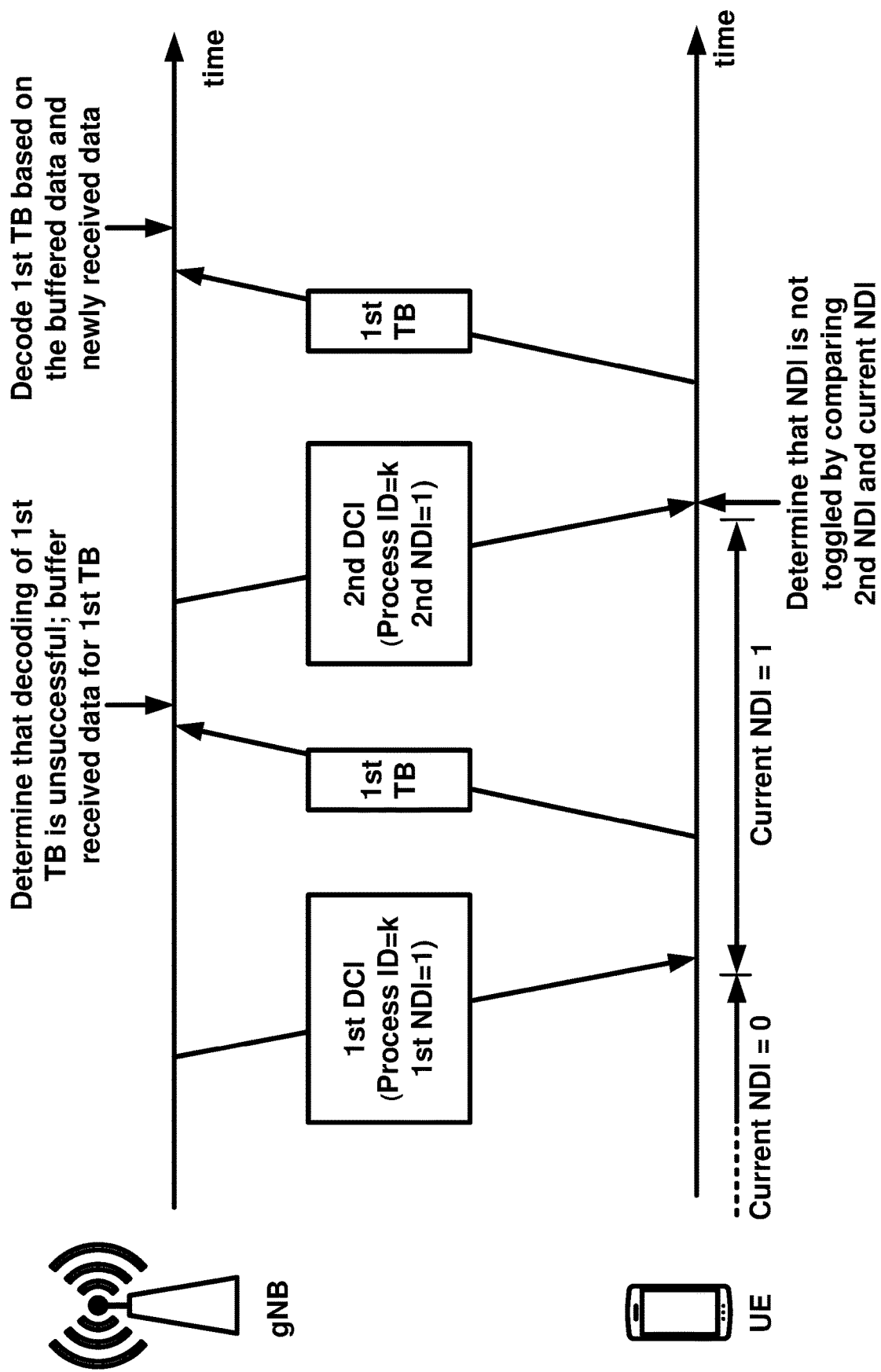
FIG. 25 is an example of uplink (re)transmission based on HARQ process as per an aspect of an embodiment of the present disclosure.

FIG. 25 shows an example of uplink TB (re)transmission mechanism based on HARQ procedure. In an example, a base station (e.g., gNB) may transmit to a wireless device (e.g., UE), a first downlink control information (DCI) comprising an uplink grant and one or more HARQ information. The one or more HARQ information may comprise a HARQ Process ID (e.g., Process ID=k as shown in FIG. 25), a first NDI value (e.g., $1^{st}$ NDI=1). The UE, before receiving the first DCI, may have a current NDI value (e.g., Current NDI=0 as shown in FIG. 25). In response to receiving the first DCI, the UE may determine that the first NDI has been toggled in response to the first NDI value (1) being different from the current NDI value (0). In response to the first NDI being toggled, a HARQ entity of the wireless device may obtain a MAC PDU from a multiplexing and assembly entity of the wireless device. The HARQ entity may deliver the MAC PDU, the uplink grant, and the one or more HARQ information to a HARQ process, where the HARQ process is identified by the HARQ process ID (e.g., Process ID=k as shown in FIG. 25). The HARQ entity may instruct the HARQ process to trigger a new transmission for a TB comprising the MAC PDU. The HARQ process may store the MAC PDU in an associated HARQ buffer and store the uplink grant. The HARQ process may instruct a physical layer of the wireless device to generate a new transmission for the TB according to the stored uplink grant. As shown in FIG. 25, the physical layer may transmit the TB according to the stored uplink grant. The gNB may attempt to decode the TB based on received data of the TB. In an example, the gNB may provide a subsequent uplink grant to the UE for a retransmission of the TB when the gNB does not successfully decode the TB transmitted by the UE. The gNB may store the received data of the TB in the soft buffer of the HARQ process, when the gNB does not successfully decode the TB transmitted by the UE. The gNB may transmit a second DCI indicating the retransmission, where the second DCI comprises a same HARQ Process ID as the first HARQ Process ID, a second uplink grant, a RV value, and a second NDI value (e.g., $2^{nd}$ NDI=1). The UE may determine the second NDI is not toggled in response to the second NDI value (1) being equal to the first NDI value (1), which is now the new Current NDI value. In response to the second NDI not being toggled, the HARQ entity may deliver, to a HARQ process identified by the HARQ process ID=k, the second uplink grant and the RV value, and the HARQ entity may instruct the HARQ process to trigger a retransmission of the TB. The HARQ process may store the second uplink grant. The HARQ process may instruct the physical layer of the wireless device to generate a retransmission for the TB according to the second uplink grant. As shown in FIG. 25, the physical layer may retransmit the TB according to the second uplink grant. In an example, the base station may attempt to decode the TB based on the buffered data and a received data of the retransmitted TB.

In an example, when the gNB successfully decodes the TB, the gNB may transmit a second DCI indicating a transmission of a new TB (e.g., a second TB), where the second DCI comprises a same HARQ Process ID as the first HARQ Process ID, a second uplink grant, a RV value, and a second NDI value. The UE may determine the second NDI is toggled in response to the second NDI value (0) being different from the first NDI value (1), which is now the new Current NDI value. In response to the second NDI being toggled, a HARQ entity of the wireless device may obtain a second MAC PDU from the multiplexing and assembly entity. The HARQ entity may deliver the second MAC PDU, the second uplink grant, and one or more second HARQ information to the HARQ process (e.g., identified by Process ID=k). The HARQ entity may instruct the HARQ process to trigger a new transmission for the second TB comprising the second MAC PDU. The HARQ process may store the second MAC PDU in HARQ buffer of the HARQ process and store the second uplink grant. The HARQ process may instruct the physical layer to generate a new transmission for the second TB according to the second uplink grant. Based on the instruction, the physical layer may transmit the second TB according to the second uplink grant.

In an example, a wireless device may receive on a PDCCH one or more downlink assignments indicating that there is a transmission on a downlink shared channel (DL-SCH) for a MAC entity of the wireless device. The one or more downlink assignment may indicate HARQ information. The HARQ information may comprise at least one of: HARQ process identifier (ID); NDI; RV; and/or transport block size (TBS). When the MAC entity has a C-RNTI, TC-RNTI or CS-RNTI, for each PDCCH occasion during which it monitors PDCCH and for each Serving Cell, the MAC entity may indicate a presence of a downlink assignment and deliver associated HARQ information to the HARQ entity, if the downlink assignment for the PDCCH occasion and the serving cell is received on the PDCCH for the MAC entity's C-RNTI or TC-RNTI. In an example, if the downlink assignment for the PDCCH occasion is received on the PDCCH for the MAC entity's CS-RNTI, the MAC entity may determine NDI for corresponding HARQ process not to have been toggled and indicate the presence of a downlink assignment and deliver the associated HARQ information to the HARQ entity, if the NDI in the received HARQ information is 1. If the downlink assignment for the PDCCH occasion is received on the PDCCH for the MAC entity's CS-RNTI, the MAC entity may store the downlink assignment and the associated HARQ information as configured downlink assignment and initialize the configured downlink assignment to start in the associated PDSCH duration and recur, if the NDI in the received HARQ information is 0 and PDCCH content indicates a SPS activation.

In an example, for a serving cell and a configured downlink assignment, if configured and activated, if a PDSCH duration of the configured downlink assignment does not overlap with a second PDSCH duration of a downlink assignment received on PDCCH, the MAC entity may instruct physical layer of the wireless device to receive, in the PDSCH duration, TB on the DL-SCH according to the configured downlink assignment. The MAC physical layer may deliver the TB to the HARQ entity. The MAC entity may set a HARQ Process ID to the HARQ Process ID associated with the PDSCH duration. The MAC entity may determine the NDI bit for the corresponding HARQ process to have been toggled. The MAC entity may indicate the presence of the configured downlink assignment and deliver the stored HARQ information to the HARQ entity.

In an example, for a configured downlink assignment, a wireless device and/or a base station may determine a HARQ Process ID associated with a slot where the downlink transmission starts as: HARQ Process ID=[floor (CURRENT_slot×10/(numberOfSlotsPerFrame× periodicity))] modulo nrofHARQ-Processes, where CURRENT_slot= [(SFN× numberOfSlotsPerFrame)+slot number in the frame], SFN is a system frame number of the slot, and numberOfSlotsPerFrame refers to the number of consecutive slots per frame. nrofHARQ-Processes is a maximum number of parallel HARQ processes configured by RRC message. In an example, for a downlink assignment (dynamic) received in a DCI via a PDCCH, the wireless device may obtain the HARQ Process ID associated with a TB from a HARQ Process ID field of the DCI. A base station may set a value of the HARQ Process ID field of the DCI indicating a HARQ Process ID for the associated TB.

In an example, the MAC entity of a wireless device may comprise a HARQ entity for each serving cell, which maintains a number of parallel HARQ processes (e.g., as shown in FIG. 24). Each HARQ process may be associated with a HARQ process identifier (ID). The HARQ entity may direct HARQ information and associated TBs received on the DL-SCH to corresponding HARQ processes. In an example, a HARQ process may support one TB when a physical layer of the wireless device is not configured for downlink spatial multiplexing. The HARQ process may support one or two TBs when the physical layer is configured for downlink spatial multiplexing.

In an example, when the MAC entity is configured with pdsch-AggregationFactor >1, the parameter pdsch-AggregationFactor may indicate a number of transmissions of a TB within a bundle of the downlink assignment. Bundling operation relies on the HARQ entity for invoking the same HARQ process for each transmission that is part of the same bundle. After the initial transmission, the base station may perform pdsch-AggregationFactor-1 HARQ retransmissions within a bundle.

In an example, if a downlink assignment has been indicated, the MAC entity may allocate TB(s) received from the physical layer and the associated HARQ information to the HARQ process indicated by the associated HARQ information.

In an example, when a transmission takes place for a HARQ process, the HARQ process may receive one or two (in case of downlink spatial multiplexing) TBs and the associated HARQ information from the HARQ entity. For each received TB and the associated HARQ information, the HARQ process may determine a transmission to be a new transmission, if a NDI has been toggled compared to a value of a previous received transmission corresponding to the TB, or if the transmission is a very first received transmission for the TB (e.g., when there is no previous NDI for the TB), otherwise the HARQ process may determine the transmission to be a retransmission. In response to the transmission being a new transmission, the MAC entity may attempt to decode received data of the TB. In response to the transmission being a retransmission, the MAC entity may instruct the physical layer to combine the received data with the data currently in the soft buffer for the TB and attempt to decode the combined data, if the data for the TB has not been successfully decoded. The wireless device may not successfully decode the TB when checking cyclic redundancy check (CRC) bits of the received data fails. In an example, if the data which the MAC entity attempted to decode is successfully decoded for the TB, or if the data for the TB was successfully decoded before, the MAC entity may deliver the decoded MAC PDU to a disassembly and demultiplexing entity of the wireless device, otherwise the MAC entity may instruct the physical layer to replace the data in the soft buffer for the TB with the data which the MAC entity attempted to decode. The MAC entity may instruct the physical layer to generate acknowledgement(s) of the data in the TB.

Figure 26:
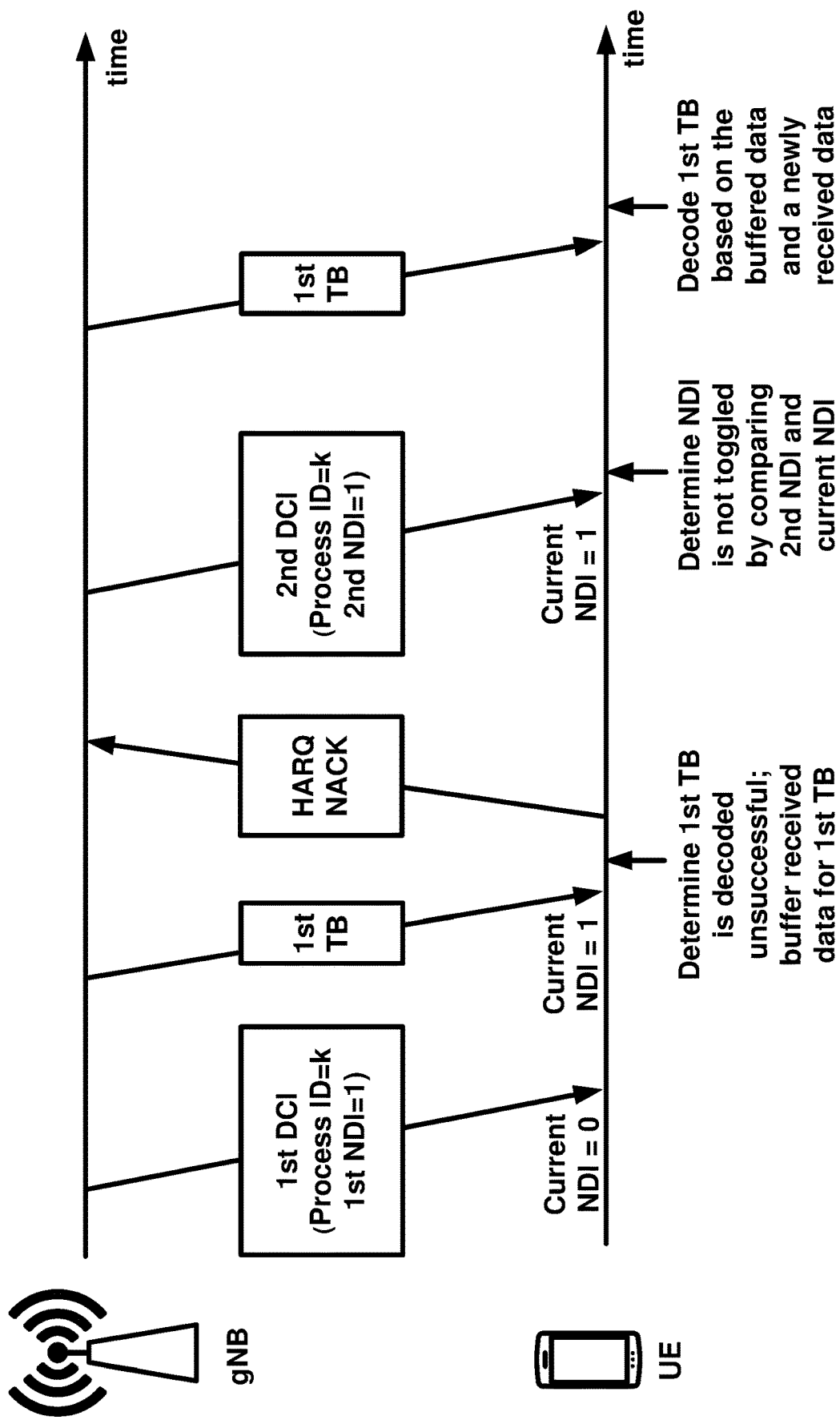
FIG. 26 is an example of downlink (re)transmission based on HARQ process as per an aspect of an embodiment of the present disclosure.

FIG. 26 shows an example of downlink TB (re)transmission mechanism based on HARQ procedure. In an example, a base station (e.g., gNB) may transmit to a wireless device (e.g., UE), a first downlink control information (DCI) comprising a downlink assignment and one or more HARQ information. The one or more HARQ information may comprise a HARQ Process ID (e.g., Process ID=k as shown in FIG. 26), a first NDI value (e.g., $1^{st}$ NDI=1), and the like. The physical layer of the wireless device may receive the data of a first TB based on the downlink assignment. The wireless device, before receiving the first DCI, may have a current NDI value (e.g., Current NDI=0 as shown in FIG. 26). In response to receiving the first DCI, the wireless device may determine that the first NDI has been toggled in response to the first NDI value (1) being different from the current NDI value (0). In response to the first NDI being toggled, the MAC entity of the wireless device may determine a transmission of the first TB to be a new transmission, and attempt to decode the received data of the first TB. The MAC entity may not successfully decode the received data.

In response to not successfully decoding the received data, the MAC entity may instruct the physical layer to replace a soft buffer for the first TB with the data which the MAC entity attempted to decode. The MAC entity may instruct the physical layer to generate a NACK of the data in the first TB. In an example, in response to not successfully decoding the received data, the wireless device may transmit the NACK to the base station. In response to receiving the NACK, the base station may transmit a second DCI indicating a retransmission of the first TB, wherein the second DCI comprise a same HARQ Process ID as the first HARQ Process ID, a second downlink assignment, a RV value, and a second NDI value (e.g., $2^{nd}$ NDI=1). The UE may determine the second NDI is not toggled in response to the second NDI value (1) being equal to the first NDI value (1), which is now the new Current NDI value. The physical layer may receive the data of the retransmitted first TB via the second downlink assignment. In response to the second NDI not being toggled, the MAC entity of the wireless device may determine the transmission via the second downlink assignment to be a retransmission of the first TB. In an example, the wireless device may attempt to decode the first TB based on the newly received data of the first TB and the current data in the soft buffer associated with the HARQ process identified by HARQ Process ID k.

In an example, the MAC entity may successfully decode the received data of the first TB. In response to successfully decoding the received data, the MAC entity may deliver a decoded data (e.g., MAC PDU) to a disassembly and demultiplexing entity of the wireless device. The MAC entity may instruct the physical layer to generate an ACK of the data in the first TB. The wireless device may transmit the ACK for the first TB to the base station.

Figure 27:
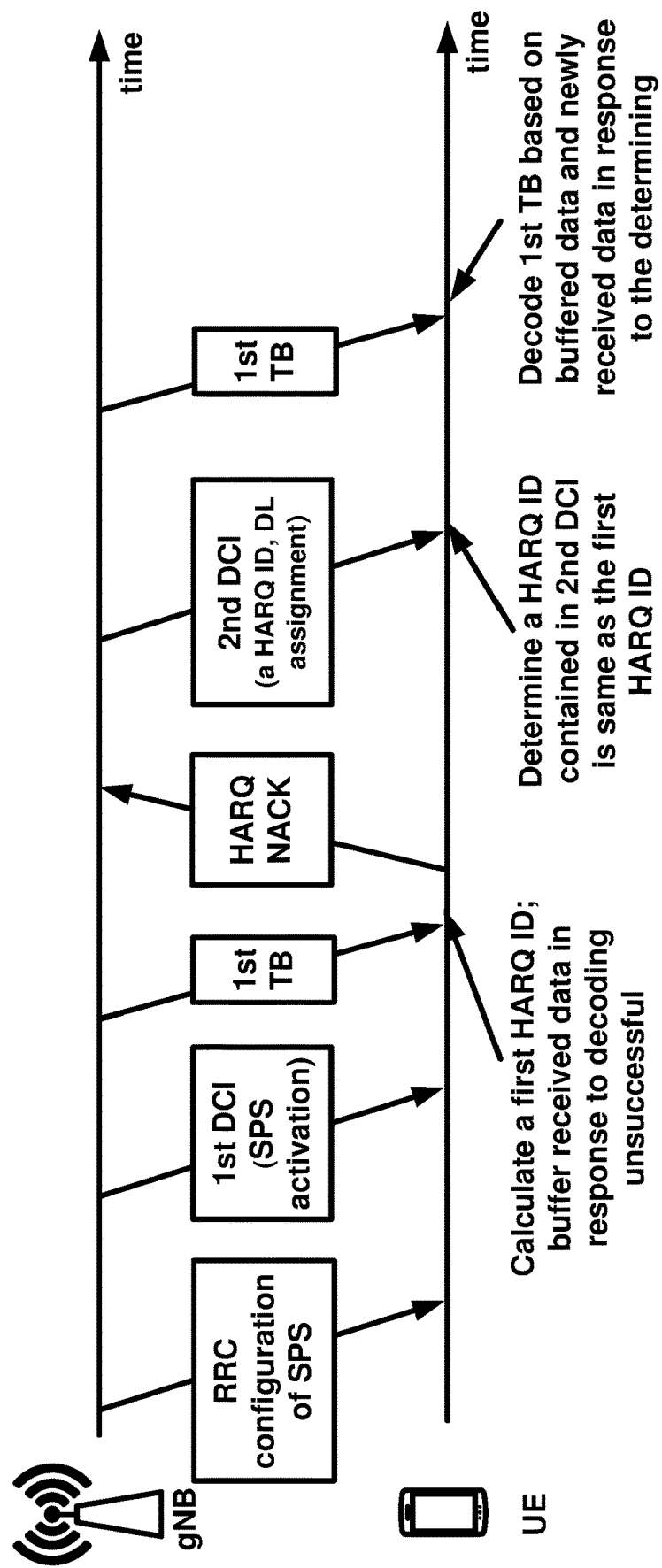
FIG. 27 is an example of configured downlink (re)transmission based on HARQ process as per an aspect of an embodiment of the present disclosure.

FIG. 27 shows an example of (re) transmission of configured downlink assignment (or SPS) based on HARQ process. A base station may transmit to a wireless device one or more RRC messages comprising one or more configuration parameters of a plurality of semi-persistent schedulings (SPSs) or configured downlink assignments on an active BWP of a serving cell (e.g., PCell or SCell). The one or more RRC messages may comprise at least one of: ServingCellConfig IE; CellGroupConfig IE; RRCSetup message; and/or RRCReconfiguration message. The one or more RRC messages may indicate a RNTI value (e.g., CS-RNTI) dedicated for configured downlink assignments or configured uplink grants. The CS-RNTI may be different from a C-RNTI used for dynamic downlink assignment or dynamic uplink grant. The one or more configuration parameters of each of the plurality of SPSs may comprise at least one of: a value of periodicity (e.g., 0.5 millisecond, 1 millisecond, 10 milliseconds, 20 milliseconds, 32 milliseconds, 40 milliseconds and the like); a maximum number of parallel HARQ processes (e.g., a positive number between 1 and 8, a positive number between 1 and 16, or a positive number between 1 and 32); a HARQ resource indication for HARQ resource for PUCCH; and/or a MCS table indication. In an example, each of the plurality of SPSs may be identified with a SPS configuration index or SPS ID.

In an example, the base station may transmit a first DCI (e.g., with DCI format 0_0, 0_1, 1_0, 1_1, or a new DCI format designed for future release) indicating an activation of a SPS of the plurality of SPSs to the wireless device, wherein the first DCI is CRC-scrambled with the CS-RNTI. The base station may set one or more fields (e.g., HARQ Process ID, RV, MCS, and/or frequency domain resource assignment) of the first DCI to predefined values indicating the activation of the SPS. The first DCI may comprise a field indicating the SPS. In an example, based on the first DCI, the wireless device may attempt to validate a downlink SPS assignment PDCCH or configured UL grant type 2 PDCCH if CRC bits of the first DCI is scrambled with the CS-RNTI and the NDI of the first DCI is set to "0". The wireless device may determine the validation of the first DCI for the activation of the SPS is achieved in response to the HARQ process number of the first DCI being set to all "0"s and/or the RV of the first DCI being set to "00". In response to the validation being achieved, the wireless device may determine information in the first DCI as a valid activation of the SPS. In response to the validation not being achieved, the wireless device may discard the information in the first DCI.

In response to the validation of activation of the SPS being achieved, the wireless device may store the downlink assignment and the associated HARQ information as configured downlink assignment. The downlink assignment may be identified with a time domain resource assignment, a frequency domain resource assignment, and/or other downlink radio resource assignment, which may be indicated by one or more contents of the first DCI. The wireless device may initialize or re-initialize the configured downlink assignment to start in a PDSCH duration and to recur based on the periodicity of the SPS. The PDSCH duration may be a time period indicated by the time domain resource assignment of the first DCI. The PDSCH duration may recur with the periodicity. The physical layer of the wireless device may receive a first TB in the PDSCH duration and deliver the received data to the HARQ entity of the wireless device. The MAC entity of the wireless device may determine a first HARQ process ID associated with the PDSCH duration in a slot where the DL transmission starts as: HARQ Process ID=[floor (CURRENT_slot×10/(numberOfSlotsPerFrame× periodicity))] modulo nrofHARQ-Processes, where CURRENT_slot=[(SFN×numberOfSlotsPerFrame)+slot number in the frame], periodicity is the periodicity of the SPS, nrofHARQ-Processes is a maximum number of parallel HARQ processes configured by RRC message, SFN is a system frame number of the slot, and numberOfSlotsPerFrame refers to the number of consecutive slots per frame.

In an example, the MAC entity of the wireless device may determine NDI bit for a HARQ process identified by the determined first HARQ Process ID to have been toggled. The MAC entity of the wireless device may indicate the presence of the configured downlink assignment and/or deliver the HARQ information (e.g., NDI, MCS, RV, and/or the first HARQ Process ID) to the HARQ entity. The HARQ entity may allocate the data received from the physical layer and the HARQ information to the HARQ process identified by the first HARQ Process ID. Based on the received data for the first TB and the HARQ information, the HARQ process may determine the transmission is a new transmission or a retransmission. The MAC entity may attempt to decode the received data if the transmission is a new transmission. The MAC entity may attempt to decode a combined data where the combined data comprises the received data and data currently in the soft buffer for the first TB, if the transmission is a retransmission. In response to the decoding being unsuccessful, the wireless device may transmit a HARQ NACK to the base station. In response to the decoding being unsuccessful, the wireless device may replace the data in the soft buffer for the first TB with the data (e.g., the combined data) which the MAC entity attempted to decode.

As shown in FIG. 27, based on the HARQ NACK received by the base station, the base station may transmit a second DCI comprising a second HARQ Process ID and a second downlink assignment. In an example, the base station may indicate a retransmission of the first TB via the second downlink assignment by setting the second HARQ Process ID same as the first HARQ Process ID. In response to the second HARQ Process ID of the second DCI being same as the first HARQ Process ID, the wireless device may determine a retransmission of the first TB is scheduled via the second downlink assignment indicated by the second DCI. The wireless device may attempt to decode the first TB based on the data stored in the soft buffer and a second data received on the second downlink assignment. The wireless device may successfully decode the first TB when checking CRC bits of the first TB is correct.

Figure 28:
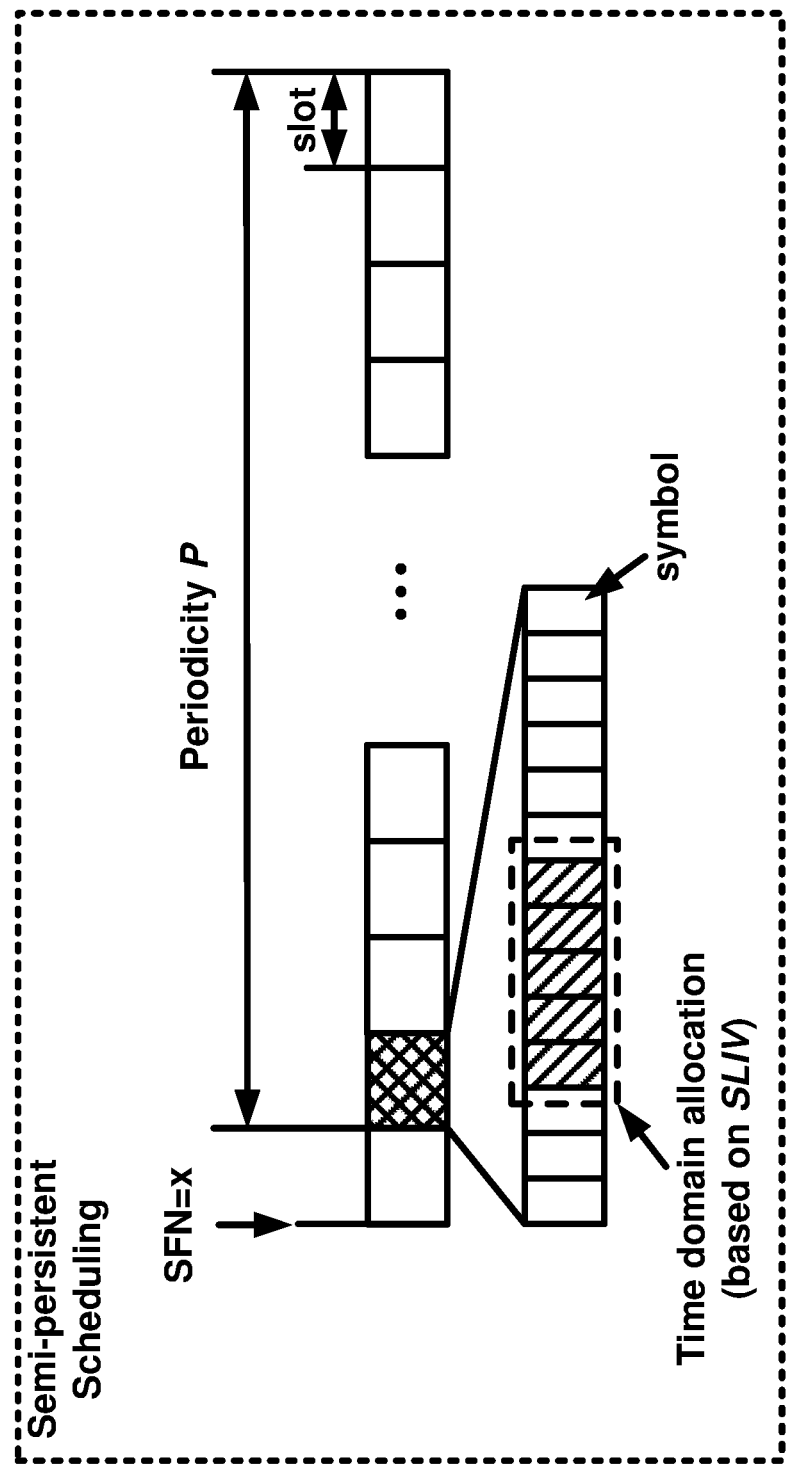
FIG. 28 is an example of configured downlink assignment as per an aspect of an embodiment of the present disclosure.

FIG. 28 shows an example of configuration of a SPS. In an example, when a downlink data is suitable for a periodic transmission (e.g., a VoIP service, URLLC service, or periodic IoT service), a base station and/or a wireless device may perform a semi-persistent downlink transmission, in which frequent DCI transmission per scheduling interval may be avoided or reduced. In an example, the base station may activate the SPS by a command (e.g., the first DCI as shown in FIG. 27). After the activation, the downlink transmission may recur according to a configured periodicity, without DCI being transmitted to indicate a downlink assignment for each downlink transmission. In an example, the MAC entity of the wireless device may determine sequentially that a $N^{th}$ downlink assignment occurs in a slot for which (numberOfSlotsPerFrame×SFN+slot number in the frame)=[(numberOfSlotsPerFrame×$SFN_{start\ time}$+$slot_{start\ time}$)+N× periodicity× numberOfSlotsPerFrame/10] modulo (1024× numberOfSlotsPerFrame), where $SFN_{start\ time}$ and $slot_{start\ time}$ are the SFN and slot, respectively, of the first transmission of PDSCH where the configured downlink assignment is (re-)initialized. numberOfSlotsPerFrame refers to a number of slots per frame based on a numerology of a slot.

In an example, a base station may transmit a command (e.g., DCI, or RRC message) indicating the downlink assignment for each recurring downlink transmission for configured downlink assignment. The base station may reuse the downlink assignment in each downlink transmission. As shown in FIG. 28, a periodicity of the SPS may be a number of milliseconds, which may be interpreted as a number of slots based on a numerology of a slot. The command activating the SPS may comprises a time domain allocation field indicating a starting symbol of a slot and a number of consecutive symbols for the downlink assignment. Based on the command, the wireless device may receive configured downlink transmission via the time resource with the starting symbol and in the number of consecutive symbols of the slot, wherein the slot is determined based on the periodicity.

Figure 29A:
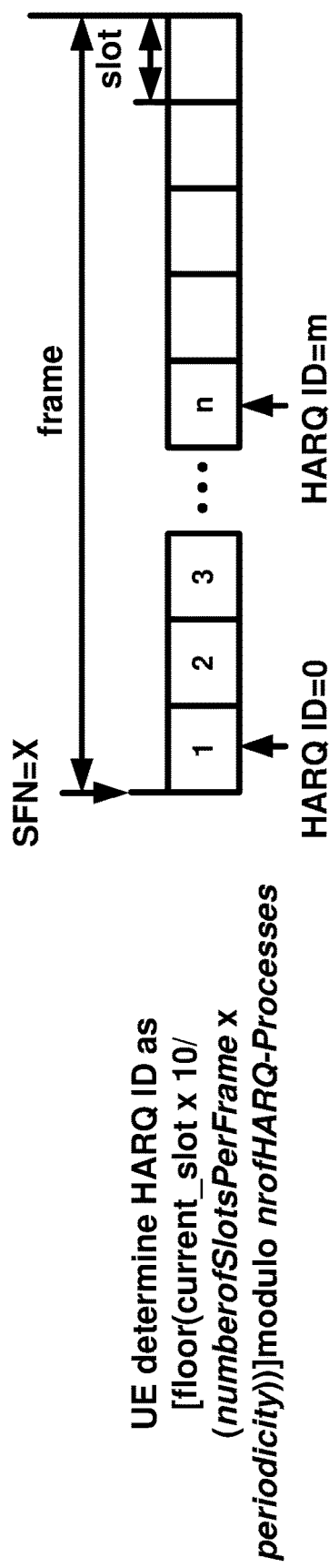
FIG. 29A is an example of HARQ Process ID determination for configured downlink assignment as per an aspect of an embodiment of the present disclosure.

FIG. 29A shows an example of HARQ Process ID determination for a configured downlink assignment. In an example, when a configured downlink assignment (or SPS which is referred to as in this specification) is configured and active, a wireless device and/or a base station may determine a HARQ Process ID associated with a slot where a DL transmission starts as: HARQ Process ID=[floor (CURRENT_slot×10/(numberOfSlotsPerFrame×periodicity))] modulo nrofHARQ-Processes, where CURRENT_slot= [(SFN×numberOfSlotsPerFrame)+slot number in the frame], periodicity is the periodicity of the SPS, nrofHARQ-Processes is a maximum number of parallel HARQ processes configured by RRC message, and numberOfSlotsPerFrame refers to the number of consecutive slots per frame. As shown in FIG. 29A, based on the equation, the wireless device and/or the base station may determine a first HARQ Process ID as 0 when a first DL transmission occurs in a first slot. The wireless device and/or the base station may determine a second HARQ Process ID as m when a second DL transmission occurs in a $n^{th}$ slot.

Figure 29B:
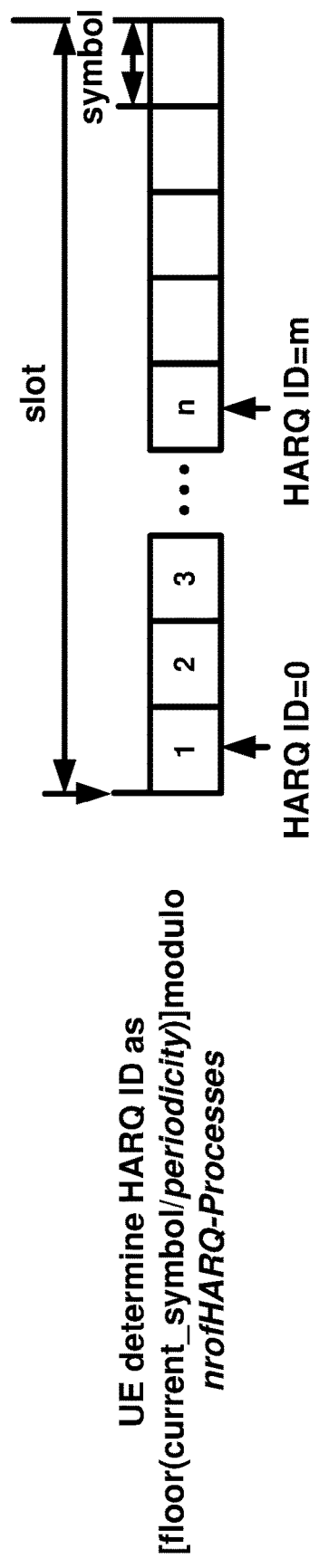
FIG. 29B is an example of HARQ Process ID determination for configured uplink grant as per an aspect of an embodiment of the present disclosure.

In an example, FIG. 28B shows an example of HARQ Process ID determination for a configured uplink grant. In an example, when a configured uplink grant is configured and active, a wireless device and/or a base station may determine a HARQ Process ID associated with a first symbol where an UL transmission starts as: HARQ Process ID=[floor (CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot. As shown in FIG. 29B, based on the equation, the wireless device and/or the base station may determine a first HARQ Process ID as 0 when a first UL transmission occurs in a first symbol of a slot. The wireless device and/or the base station may determine a second HARQ Process ID as m when a second UL transmission occurs in a $n^{th}$ symbol of the slot.

By examples of FIG. 29A, the base station and the wireless device may align HARQ Process ID of a configured downlink assignment, e.g., regarding which TB and/or which soft buffer is used for decoding, when there are multiple parallel HARQ processes. By examples of FIG. 29B, the base station and the wireless device may align HARQ Process ID of a configured uplink grant, e.g., regarding which TB and/or which HARQ buffer is used for transmission or retransmission, when there are multiple parallel HARQ processes.

In an example, when multiple SPSs are active in a slot, a base station may transmit one or more RRC messages comprising configuration parameters of the multiple SPSs, each of the multiple SPSs being associated with a HARQ Process ID offset value. Each of the multiple SPSs may have a different starting symbol in the slot. When the multiple SPSs are active in the slot, for each of the multiple SPSs, the wireless device may determine a HARQ Process ID associated with the slot where a downlink transmission of the each of the multiple SPSs starts as: HARQ Process ID= [floor (CURRENT_slot×10/(numberOfSlotsPerFrame×periodicity))+HARQ Process ID offset] modulo nrofHARQ-Processes, or HARQ Process ID=[floor (CURRENT_slot× 10/(numberOfSlotsPerFrame×periodicity))] modulo nrofHARQ-Processes+HARQ Process ID offset, where CURRENT_slot=[(SFN×numberOfSlotsPerFrame)+slot number in the frame], periodicity is the periodicity of the one of the plurality of SPSs. HARQ Process ID offset may be the HARQ Process offset value associated with the SPS indicated by the RRC message. HARQ Process ID offset may be a SPS configuration index of the SPS indicated by the RRC message. nrofHARQ-Processes is a maximum number of parallel HARQ processes configured by RRC message, and numberOfSlotsPerFrame refers to the number of consecutive slots per frame.

In an example, when multiple active SPSs in a cell are supported in a slot, a base station may transmit one or more RRC messages comprising configuration parameters of the multiple SPSs. Each of the multiple SPSs may have a different starting symbol in the slot. When the multiple SPSs are active in the slot, for each of the multiple SPSs, the wireless device may determine a HARQ Process ID associated with a first symbol in a slot where a downlink transmission of the each of the multiple SPSs starts as: HARQ Process ID=[floor (CURRENT_symbol/periodicity)] modulo nrofHARQ-Processes, where CURRENT_symbol=(SFN×numberOfSlotsPerFrame×numberOfSymbolsPerSlot+slot number in the frame× numberOfSymbolsPerSlot+symbol number in the slot), and numberOfSlotsPerFrame and numberOfSymbolsPerSlot may refer to the number of consecutive slots per frame and the number of consecutive symbols per slot, respectively.

Figure 30:
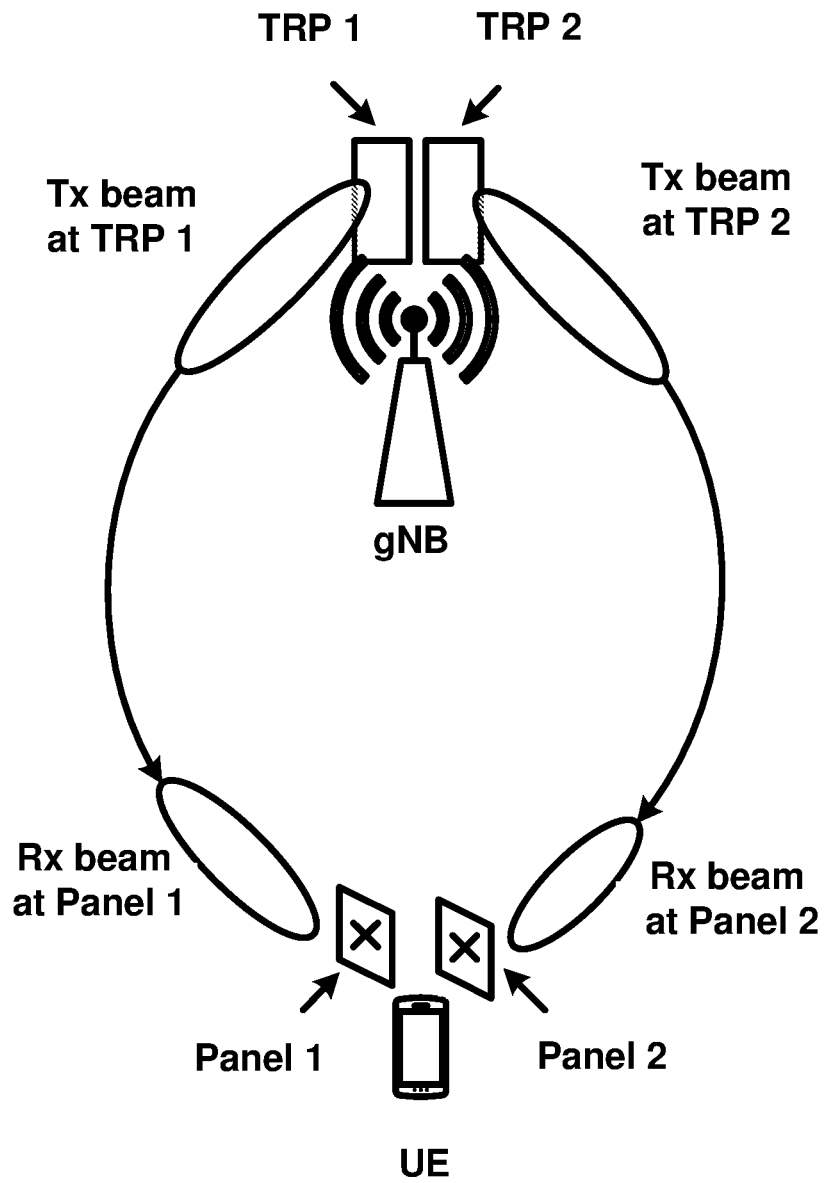
FIG. 30 is an example of transmission and reception with multiple TRPs and multiple panels as per an aspect of an embodiment of the present disclosure.

FIG. 30 shows an example of transmission and reception with multiple transmission reception points (TRPs) and multiple panels. In an example, a base station may be equipped with more than one TRP (e.g., TRP 1 and TRP 2 in FIG. 30). A wireless device may be equipped with more than one panel (e.g., Panel 1 and Panel 2 in FIG. 30). Transmission and reception with multiple TRPs and multiple panels may improve system throughput, transmission latency, and/or transmission robustness for a wireless communication in a high frequency (e.g., above 6 GHz). When equipped with multiple panels and/or multiple TRPs, a base station may transmit a first downlink signal (e.g., PDCCH, PDSCH, CSI-RS, SSB, and/or DMRS) with a first transmission beam (e.g., Tx beam at TRP 1 in FIG. 30) to a wireless device using a first Rx beam with a first panel (e.g., Panel 1 in FIG. 30). The base station may transmit a second downlink signal (e.g., PDCCH, PDSCH, CSI-RS, SSB, and/or DMRS) with a second transmission beam (e.g., Tx beam at TRP 2 in FIG. 30) to the wireless device using a second Rx beam with a second panel (e.g., Panel 2 in FIG. 30). The base station and the wireless device may determine the first Tx beam and the first Rx beam based one or more beam management procedures. Similarly, the base station and the wireless device may determine the second Tx beam and the second Rx beam based one or more beam management procedures. Different from single TRP and/or single panel case, the base station may be allowed to simultaneously or parallelly transmit the first downlink signal via the first TRP and the second downlink signal via the second TRP with a shared time and/or frequency resource, and different transmission beam. In an example, the first downlink signal may be a first PDSCH transmission of a first configured downlink assignment. The second downlink signal may a second PDSCH transmission of a second configured downlink assignment. Compared with single TRP/panel case, the base station may improve system throughput or transmission robustness when equipped with multiple TRPs and/or panels.

In an example, when multiple configured downlink assignments are active in a cell, a base station, if equipped with a plurality of TRPs (e.g., two), may simultaneously or parallelly transmit a first TB via a first TRP and a second TB via a second TRP. The first TB may be associated with a first configured downlink assignment of the multiple configured downlink assignments. The second TB may be associated with a second configured downlink assignment of the multiple configured downlink assignments. The simultaneous or parallel transmission of the first TB and the second TB may comprise transmitting the first TB and the second TB via a same time/frequency resource. In an example, a starting symbol or slot of transmission of the first TB may be same as a starting symbol or slot of transmission of the second TB.

In an example, a wireless device may determine a HARQ process number, of a HARQ process, based on receiving a DCI (e.g., indicating dynamic downlink assignment or uplink grant) comprising a HARQ process number field indicating a value of the HARQ Process number. Different from dynamic downlink scheduling or dynamic uplink grant, for a semi-persistent downlink scheduling (SPS) or a configured uplink grant (CG), The wireless device may determine a HARQ process number based on a predefined equation based on a time resource index and a periodicity of a CG or a SPS.

In an example, the predefined equation of a HARQ process number of a configured uplink grant (CG) or a SPS may be as follows: HARQ Process ID=[floor (CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot.

In an example, the predefined equation of a HARQ process number of a configured uplink grant (CG) or a SPS may be as follows: HARQ Process ID=[floor (CURRENT_slot×10/(numberOfSlotsPerFrame×periodicity))+HARQ Process ID offset] modulo nrofHARQ-Processes, or HARQ Process ID=[floor (CURRENT_slot×10/(numberOfSlotsPerFrame×periodicity))] modulo nrofHARQ-Processes+HARQ Process ID offset, where CURRENT_slot=[(SFN×numberOfSlotsPerFrame)+slot number in the frame], periodicity is the periodicity of the one of the plurality of SPSs or CGs. HARQ Process ID offset may be the HARQ Process offset value associated with the SPS (or the CG) indicated by the RRC message. HARQ Process ID offset may be a SPS (or the CG) configuration index of the SPS (or the CG) indicated by the RRC message. nrofHARQ-Processes is a maximum number of parallel HARQ processes configured by RRC message, and numberOfSlotsPerFrame refers to the number of consecutive slots per frame.

In an example, the predefined equation of a HARQ process number of a CG or a SPS may be as follows: HARQ Process ID=[floor (CURRENT_slot×10/(numberOfSlotsPerFrame×periodicity))] modulo nrofHARQ-Processes, where CURRENT_slot=[(SFN×numberOfSlotsPerFrame)+slot number in the frame], periodicity is the periodicity of the SPS/CG, nrofHARQ-Processes is a maximum number of parallel HARQ processes configured by RRC message, and numberOfSlotsPerFrame refers to the number of consecutive slots per frame.

In an example, a base station may transmit to a wireless device, a HARQ process ID of a HARQ process associated with a transport block of a dynamic scheduling. A wireless device may automatically determine a HARQ process ID of a HARQ process associated with a transport block of a SPS, e.g., when the base station does not indicate the HARQ process ID in a command (e.g., a DCI, MAC CE, or a RRC message), based on a predefined equation. When the wireless device is equipped with multiple panels and/or is communicating with a base station equipped with multiple TRPs, the wireless device may receive multiple SPSs from multiple TRPs of the base station or may transmit multiple CGs from multiple panels of the wireless device. A transport block associated with multiple SPSs or multiple CGs may belong to different HARQ processes. Different TRPs of a base station (or different panels of a wireless device) may share a plurality of HARQ processes. The wireless device or the base station, by using existing HARQ process ID determination method for SPS/CG (e.g., the predefined HARQ process ID equation), may not determine a HARQ process identifier of a HARQ process associated with a TB transmitted from a TRP/panel of a plurality of TRPs/panels. The wireless device or the base station, by using existing HARQ process ID determination method for SPS/CG, may not differentiate a first HARQ process for a first TB transmitted from a first TRP/panel and a second HARQ process for a second TB transmitted from a second TRP/panel. For example, the wireless device may determine the same HARQ process ID for two different transport blocks received from two different TRPs or transmitted via two different panels. The wireless device, due to failing in differentiating HARQ processes for the first TB and the second TB, may store two different transport blocks in the same HARQ buffer. This may result in PDSCH decoding error, HARQ process buffer management error, HARQ ACK/NACK feedback overhead increasing, and/or reduction of downlink throughput. Implementation of existing technologies may result in PUSCH decoding error, HARQ process buffer management error, retransmission request signaling overhead increasing, and/or reduction of uplink throughput at the base station.

There is a need to improve HARQ process determination for SPS/CG when multiple TRPs and/or panels are supported. Example embodiments implement enhanced processes for determining HARQ processes for SPSs transmitted on multiple TRPs of a base station. Example embodiments may comprise a wireless device determining a HARQ process ID for a SPS based on a TRP ID of the TRP on which transmission of downlink TBs for the SPS take places. The wireless device may determine the TRP ID based on a DCI. Example embodiments may comprise a wireless device determining a HARQ process ID for a SPS based on a coreset group index of a coreset group to which a coreset, for receiving a DCI activating the SPS, belongs. In an example, the TRP ID of the TRP may comprise a control resource set group index of a control resource set group from which a DCI activating the SPS is transmitted on a control resource set. In an example, the TRP ID of the TRP may comprise a TRP index indicated in the DCI activating the SPS. In an example, the TRP ID of the TRP may comprise a TCI state group index of a TCI state group. The TCI state group may comprise a TCI state with which the wireless device receives the downlink TBs for the SPS, or with which the base station transmits the downlink TBs for the SPS. Example embodiments may improve downlink throughput, PDSCH decoding probability, HARQ ACK/NACK overhead, and/or power consumption of a wireless device.

In an example, example embodiments implement enhanced processes for determining of HARQ processes for CGs transmitted on multiple panels of a wireless device. One of example embodiments may comprise a wireless device determining a HARQ Process ID for a CG based on a panel ID of the panel on which transmission of uplink TBs for the CG take places. In an example, the panel ID of the panel may comprise an SRI group index of an SRI group associated with the panel. In an example, the panel ID of the panel may comprise an uplink TCI group index of an uplink TCI group associated with the panel. In an example, the wireless device may determine the panel ID of the panel based on a DCI comprising a field indicating the panel ID. Example embodiments may enable differentiation of HARQ processes for CGs when multiple TRPs and/or panels are supported. Example embodiments may improve uplink throughput, PUSCH decoding probability, and/or downlink signaling overhead.

Figure 31:
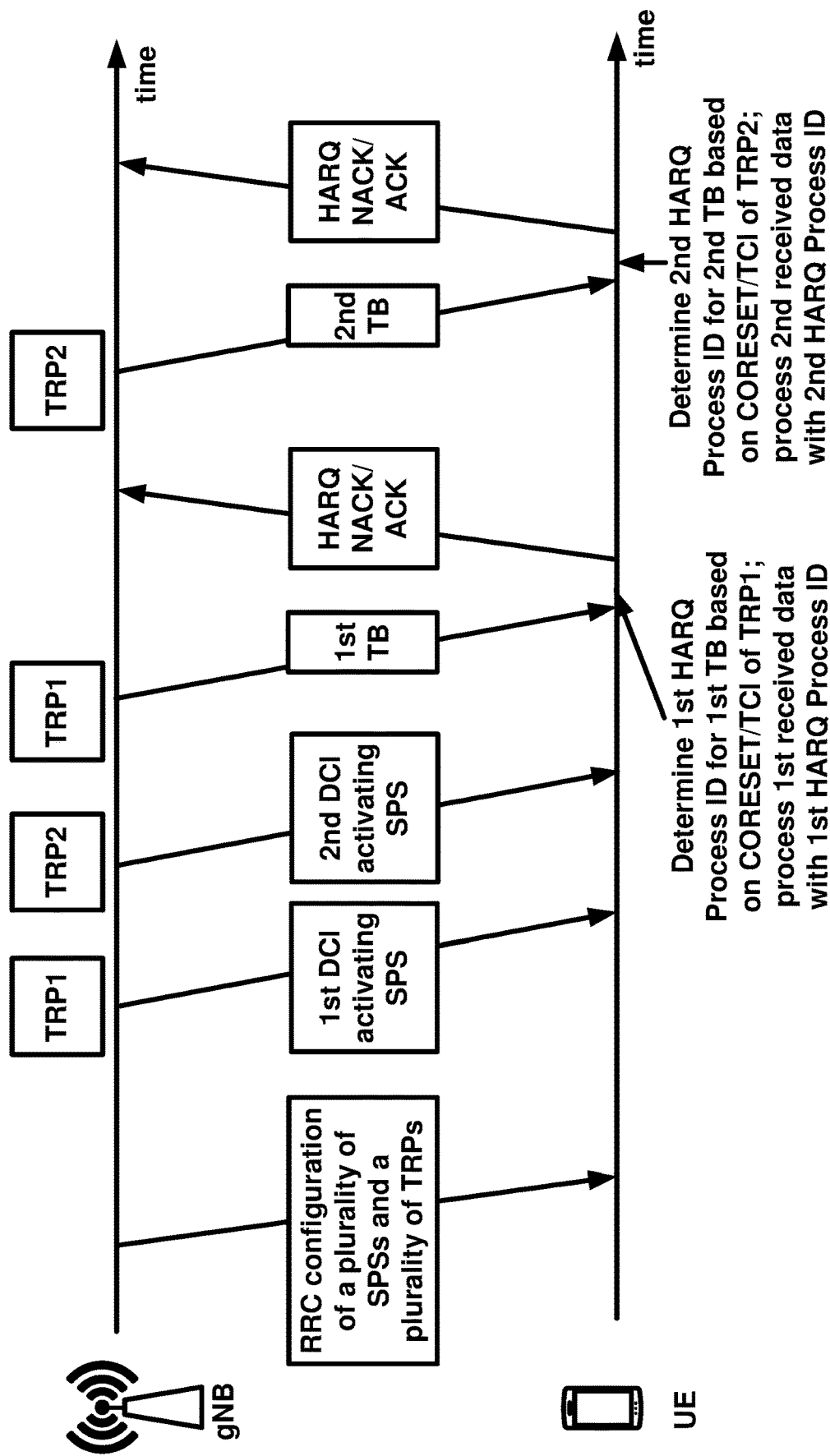
FIG. 31 is an example of HARQ Process ID determination for configured downlink assignment with multiple TRPs and multiple panels as per an aspect of an embodiment of the present disclosure.

FIG. 31 shows an example of HARQ process ID determination for SPS when multiple TRPs are supported. A base station may transmit to a wireless device one or more RRC messages comprising one or more first configuration parameters of a plurality of semi-persistent schedulings (SPSs) or configured downlink assignments on an active BWP of a serving cell (e.g., PCell or SCell). The one or more RRC messages may comprise at least one of: ServingCellConfig IE; CellGroupConfig IE; RRCSetup message; and/or RRCReconfiguration message. The one or more RRC messages may indicate a RNTI value (e.g., CS-RNTI) dedicated for configured downlink assignments or configured uplink grants. The CS-RNTI may be different from a C-RNTI used for dynamic downlink assignment or dynamic uplink grant. The one or more first configuration parameters of each of the plurality of SPSs may comprise at least one of: a value of periodicity (e.g., 0.5 millisecond, 1 millisecond, 10 milliseconds, 20 milliseconds, 32 milliseconds, 40 milliseconds and the like); a maximum number of parallel HARQ processes (e.g., a positive number between 1 and 8, or a positive number between 1 and 16, or a positive number between 1 and 32); a HARQ resource indication for HARQ resource for PUCCH; and/or a MCS table indication. In an example, each of the plurality of SPSs may be identified with a SPS configuration index or SPS ID.

In an example, the one or more RRC messages may comprise one or more second configuration parameters of a plurality of TRPs of the cell. The one or more second configuration parameters may comprise a plurality of control resource set groups, each of the plurality of control resource set groups being associated with a corresponding one of the plurality of TRPs. Different TRP may be identified or associated with a different control resource set group. A control resource set group, identified by a control resource set group index, may comprise a plurality of control resource sets, each of the plurality of control resource sets being identified by a control resource set index. Parameters of a control resource set may comprise at least one of: a number of consecutive OFDM symbols of a duration of the control resource set; a set of frequency resource blocks; a CCE-to-REG mapping type indication; a plurality of transmission configuration indicator (TCI) states; an indicator indicating whether a TCI is present in a DCI; a PDCCH DMRS scrambling ID; and/or a REG bundle size, in case of interleaved CCE-to-REG mapping. Each of the plurality of TCI states may be associated/identified with a TCI state ID. Parameters of a TCI state may comprise at least a type of QCL information. QCL information may comprise at least: a cell index; a BWP index; a reference signal index (e.g., an SSB index or a CSI-RS index); and/or a QCL type indication (e.g., QCL type A, QCL type B, QCL type C and/or QCL type D). When the QCL type indication indicates a QCL type A, the wireless device may determine a reference signal identified by the reference signal index is QCLed with DMRS of a PDSCH with regards to Doppler shift, Doppler spread, average delay, and/or delay spread. When the QCL type indication indicates a QCL type B, the wireless device may determine a reference signal identified by the reference signal index is QCLed with DMRS of a PDSCH with regards to Doppler shift and/or Doppler spread. When the QCL type indication indicates a QCL type C, the wireless device may determine that a reference signal identified by the reference signal index is QCLed with DMRS of a PDSCH with regards to Doppler shift and/or average delay. When the QCL type indication indicates a QCL type D, the wireless device may determine that a reference signal identified by the reference signal index is QCLed with DMRS of a PDSCH with regards to spatial Rx parameter.

In an example, as shown in FIG. 31, the base station may transmit a first DCI (e.g., DCI format 1_0/1_1) via a first search space of a first control resource set to the wireless device. The first search space and the first control resource set may be configured by implementing one or more examples of FIG. 21A and/or FIG. 21B. The first control resource set may belong to a first control resource set group of a plurality of control resource set groups, the first control resource set group being associated with a first TRP based on the one or more RRC messages. The first DCI may comprise a first field indicating a first SPS of the plurality of SPSs. The first DCI may comprise one or more fields being set to predefined values indicating an activation of the first SPS. In an example, the base station may transmit a second DCI via a second search space of a second control resource set to the wireless device. The second control resource set may belong to a second control resource set group of a plurality of control resource set groups, the second control resource set group being associated with a second TRP based on the one or more RRC messages. The second DCI may comprise a second field indicating a second SPS of the plurality of SPSs. The second DCI may comprise one or more fields being set to predefined values indicating an activation of the second SPS. The first SPS may be same as or different from the second SPS. In an example, the base station may skip transmitting the second DCI. The base station may skip transmitting the second DCI in response to the first SPS being the same as the second SPS.

In an example, in response to receiving the first DCI, the wireless device may store a first downlink assignment indicated by the first DCI and HARQ information (e.g., NDI, MCS, RV, and/or a first HARQ Process ID) as a first configured downlink assignment. The wireless device may receive in a first PDSCH duration based on the first configured downlink assignment, a first transport block (TB) via the first TRP of the cell. The wireless device may determine a first HARQ Process ID for the first TB associated with a slot where the transmission of the first TB starts based on a time of the slot, a periodicity of the first SPS, a number of allowed parallel HARQ processes, and the first control resource group index. In an example, the wireless device may determine the first HARQ Process ID as [floor (CURRENT_slot×10/(numberOfSlotsPerFrame×periodicity))+ First control resource set group index*N] modulo nrof-HARQ-Processes, where CURRENT_slot=[(SFN× numberOfSlotsPerFrame)+slot number in the frame]. In an example, First control resource set group index is a control resource set group index of the first control resource set group where the wireless device receives the first DCI. In an example, In an example, N may be a positive number (e.g., 1) or floor (nrofHARQ-Processes/number of TRPs), where number of TRPs may be a number of configured TRPs (or a number of control resource set groups) of the base station based on the one or more RRC messages. In an example, N may be an offset configured by the one or more RRC messages. In an example, the wireless device may determine the first HARQ Process ID as [floor (CURRENT_slot×10/(numberOfSlotsPerFrame×periodicity))] modulo nrof-HARQ-Processes+First control resource set group index.

In an example, the wireless device may attempt to decode the received data for the first TB. In response to decoding of the first TB being unsuccessful, the wireless device may store the received data of the first TB in a first soft buffer for the first TB and/or transmit a NACK to the base station. In response to decoding of the first TB being successful, the wireless device may deliver a decoded data (e.g., a MAC PDU) to a disassembly and demultiplexing entity of the wireless device and/or transmit an ACK to the base station.

In an example, in response to receiving the second DCI, the wireless device may store a second downlink assignment indicated by the second DCI and HARQ information (e.g., NDI, MCS, RV, and/or a second HARQ Process ID) as a second configured downlink assignment. The wireless device may receive in a second PDSCH duration based on the second configured downlink assignment, a second transport block (TB) via the second TRP of the cell. The wireless device may determine a second HARQ Process ID for the second TB associated with a slot where the transmission of the second TB starts based on a time of the slot, a periodicity of the second SPS, a number of allowed parallel HARQ processes, and the second control resource group index. In an example, the wireless device may determine the second HARQ Process ID as [floor (CURRENT_slot×10/(numberOfSlotsPerFrame×periodicity))+Second control resource set group index*N]modulo nrofHARQ-Processes, where CURRENT_slot=[(SFN×numberOfSlotsPerFrame)+slot number in the frame]. Second control resource set group index is a control resource set group index of the second control resource set group where the wireless device receives the second DCI. In an example, N may be a positive number (e.g., 1) or floor (nrofHARQ-Processes/number of TRPs), where number of TRPs may be a number of configured TRPs (or a number of control resource set groups) of the base station based on the one or more RRC messages. In an example, N may be an offset configured by the one or more RRC messages. In an example, the wireless device may determine the second HARQ Process ID as [floor (CURRENT_slot×10/(numberOfSlotsPerFrame×periodicity))] modulo nrofHARQ-Processes+Second control resource set group index.

In an example, the wireless device may attempt to decode the received data for the second TB. In response to decoding of the second TB being unsuccessful, the wireless device may store the received data of the second TB in a second soft buffer for the second TB and/or transmit a NACK to the base station. In response to decoding of the second TB being successful, the wireless device may deliver a decoded data (e.g., a MAC PDU) to a disassembly and demultiplexing entity of the wireless device and/or transmit an ACK to the base station.

In an example, when multiple SPSs are active in a cell, the wireless device may determine a HARQ Process ID based on a slot on which transmission of one of the multiple SPSs starts, a SPS configuration index of the one of the multiple SPSs, and/or a control resource set group index as follows: [floor (CURRENT_slot×10/(numberOfSlotsPerFrame×periodicity))+SPS configuration index+control resource set group index] modulo nrofHARQ-Processes, where CURRENT_slot=[(SFN× numberOfSlotsPerFrame)+slot number in the frame], SPS configuration index may be a SPS configuration index of the one of the multiple SPSs, and control resource set group index is a control resource set group index of a control resource set group where the wireless device receives a DCI indicating activation of the one of the multiple SPSs. In an example, the wireless device may determine a HARQ Process ID based on a slot on which transmission of one of the multiple SPSs starts, a SPS configuration index of the one of the multiple SPSs, and/or a control resource set group index as follows: [floor (CURRENT_slot×10/(numberOfSlotsPerFrame×periodicity))] modulo nrofHARQ-Processes+SPS configuration index+ control resource set group index.

In an example, when multiple SPSs are active in a cell, the wireless device may determine a HARQ Process ID based on current symbol of a slot on which transmission of one of the multiple SPSs starts and/or a control resource set group index as follows: HARQ Process ID=[floor (CURRENT_symbol/periodicity)+control resource set group index] modulo nrofHARQ-Processes, where CURRENT_symbol= (SFN×numberOfSlotsPerFrame× numberOfSymbolsPerSlot+slot number in the frame× numberOfSymbolsPerSlot+symbol number in the slot), and control resource set group index is a control resource set group index of a control resource set group where the wireless device receives a DCI indicating activation of the one of the multiple SPSs. In an example, the wireless device may determine the HARQ Process ID as follows: HARQ Process ID=[floor (CURRENT_symbol/periodicity)] modulo nrofHARQ-Processes+control resource set group index.

FIG. 32 shows an example of HARQ Process ID determination of configured downlink assignments when multiple TRPs/panels are supported. In an example, a base station may transmit a first downlink TB for a first SPS via a first TRP to a first panel of a wireless device. The base station may transmit a second downlink TB for a second SPS via a second TRP to a second panel of the wireless device. The transmission of the first downlink TB may start in a same symbol of a slot as the transmission of the second downlink TB starts. The transmission of the first downlink TB may start in a different symbol of the slot from the transmission of the second downlink TB starts. The wireless device may determine a first HARQ Process ID for the first downlink TB based on a slot on which the transmission of the first downlink TB starts, a periodicity of the first SPS, and an index identifying the first TRP, as shown in one or more of example embodiments of FIG. 31. The wireless device may determine a second HARQ Process ID for the second downlink TB based on a slot on which the transmission of the second downlink TB starts, a periodicity of the second SPS, and an index identifying the second TRP, as shown in one or more of example embodiments of FIG. 31. The index identifying a TRP may comprise: a control resource set group index of a control resource set group from which a DCI activating the SPS is received by the wireless device on a control resource; and/or a TCI state group index of a TCI state group. The TCI state group may comprise a TCI state with which the wireless device receives the downlink TBs (first TB or second TB) for the active SPS. In an example, The wireless device may determine a first HARQ Process ID for the first downlink TB based on a symbol of a slot on which the transmission of the first downlink TB starts, a periodicity of the first SPS, and an index identifying the first TRP, as shown in one or more of example embodiments of FIG. 31. The wireless device may determine a second HARQ Process ID for the second downlink TB based on the symbol of the slot on which the transmission of the second downlink TB starts, a periodicity of the second SPS, and an index identifying the second TRP, as shown in one or more of example embodiments of FIG. 31.

In an example, by one or more embodiments of FIG. 31 and/or FIG. 32, the wireless device may determine a HARQ Process ID of a downlink transmission for a SPS based on a TRP index when multiple TRPs are supported. The wireless device, by implementing the example embodiments, may correctly differentiate HARQ processes of downlink transmissions for SPSs from different TRPs. Correctly differentiating HARQ processes may improve downlink transmission throughput, power consumption, and/or uplink HARQ ACK/NACK transmission overhead.

In an example, a base station may transmit to a wireless device one or more RRC messages comprising one or more first configuration parameters of a plurality of SPSs or configured downlink assignments on an active BWP of a serving cell (e.g., PCell or SCell). The one or more first configuration parameters of each of the plurality of SPSs may comprise at least one of: a value of periodicity; a maximum number of parallel HARQ processes; a HARQ resource indication for HARQ resource for PUCCH; and/or an MCS table indication. In an example, each of the plurality of SPSs may be identified with a SPS configuration index or SPS ID.

In an example, the one or more RRC messages may comprise one or more second configuration parameters of the serving cell. The one or more second configuration parameters may comprise a plurality of control resource set groups, each of the plurality of control resource set groups being associated with a corresponding one of a plurality of TRPs of the serving cell. Different TRP may be identified or associated with a different control resource set group. The base station may configure a control resource set group by implementing one or more of example embodiments as shown in FIG. 31.

In an example, the one or more RRC messages may indicate that the plurality of SPSs are grouped into a plurality of SPS groups, each SPS group comprising one or more SPSs of the plurality of SPSs. Each SPS of a first SPS group may be different from any SPS of a second SPS group. The one or more RRC messages may further indicate that a SPS group is associated with a TRP of a plurality of TRPs of the cell. In an example, when a first SPS group is associated with a first TRP, the base station may transmit any SPS of the first SPS group, if activated, via downlink assignment of the first TRP, to a wireless device. In an example, when a first SPS group is associated with a first TRP, the base station may not transmit any SPS of the first SPS group, if activated, via downlink assignment of a second TRP different from the first TRP, to the wireless device. In an example, when a first SPS group is associated with a first TRP and a second SPS group is associated with a second TRP, the base station may transmit a first TB for a SPS (if activated) of the first SPS group via downlink assignment of the first TRP, and a second TB for a SPS (if activated) of the second SPS group via downlink assignment of the second TRP, to the wireless device. The base station may transmit the first TB and the second TB parallelly or simultaneously, e.g., with a same time/frequency resource and different transmission beam.

In an example, the wireless device may determine a first HARQ Process ID for the first TB as [floor (CURRENT_slot×10/(numberOfSlotsPerFrame×periodicity))]modulo nrofHARQ-Processes+first SPS configuration index or [floor (CURRENT_slot×10/(numberOfSlotsPerFrame×periodicity))+first SPS configuration index] modulo nrofHARQ-Processes. The wireless device may determine a second HARQ Process ID for the second TB as [floor (CURRENT_slot×10/(numberOfSlotsPerFrame×periodicity))]modulo nrofHARQ-Processes+second SPS configuration index or [floor (CURRENT_slot×10/(numberOfSlotsPerFrame×periodicity))+second SPS configuration index] modulo nrofHARQ-Processes. In an example, first SPS configuration index may be a SPS configuration index of the first SPS if active in the first SPS group. second SPS configuration index may be a SPS configuration index of the second SPS if active in the second SPS group.

By the embodiment, the base station may group a plurality of SPSs into a plurality of SPS groups, each SPS group being associated with a TRP of a plurality of TRPs in a cell. Configuration of SPSs per TRP, by grouping the SPSs, may improve HARQ Process ID determination ambiguity when multiple TRPs are supported. Example embodiments may improve downlink transmission throughput, power consumption, and/or uplink HARQ ACK/NACK transmission overhead.

Figure 33:
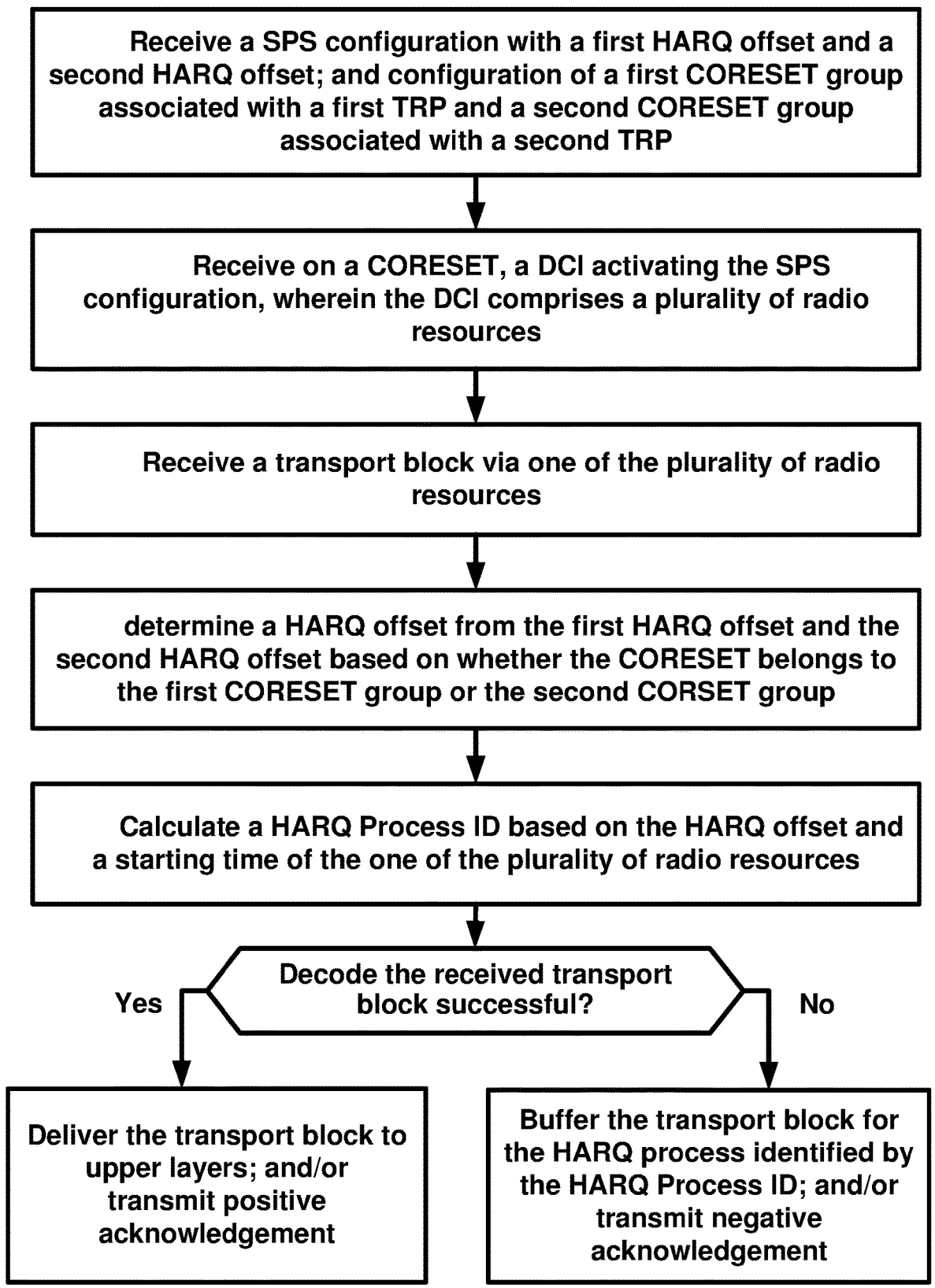
FIG. 33 is an example of HARQ Process ID determination for configured downlink assignment with multiple TRPs and multiple panels as per an aspect of an embodiment of the present disclosure.

FIG. 33 shows an example flowchart of HARQ Process ID determination for a SPS when multiple TRPs/panels are supported. In an example, a base station may transmit one or more RRC messages comprising first configuration parameters of a SPS configuration. The configuration parameters may comprise a plurality of HARQ offset values. The one or more RRC messages may further comprise second configuration parameters of a plurality of control resource set groups and a plurality of TRPs by implementing one or more examples of FIG. 31. In an example, each of the plurality of control resource set groups may be associated with a corresponding TRP of the plurality of TRPs. In an example, one or more RRC messages may further indicate that each of the plurality of HARQ offset values is associated with a corresponding TRP of the plurality of TRPs.

In an example, as shown in FIG. 33, the wireless device may receive on a control resource set, a DCI indicating activation of the SPS configuration, where the DCI may comprise parameters of downlink radio resources. The wireless device may receive a first TB via one of the downlink radio resources. The wireless device may determine a HARQ offset value from the plurality of HARQ offset values, based on a control resource set group index of a control resource group to which the control resource set belongs. In an example, if the control resource set belongs to a first control resource group, the wireless device may determine the HARQ offset value as a HARQ offset value, from the plurality of HARQ offset values, corresponding to the first control resource group. The wireless device may determine a HARQ offset value from the plurality of HARQ offset values, based on a TRP on which the wireless device receives the DCI and/or the first TB. In an example, if the wireless device receives the DCI and/or the first TB via the first TRP, the wireless device may determine the HARQ offset value as a HARQ offset value, from the plurality of HARQ offset values, corresponding to the first TRP.

In an example, based on the determined HARQ offset value, the wireless device may determine a HARQ Process ID for the first TB as [floor (CURRENT_slot×10/(numberOfSlotsPerFrame×periodicity))] modulo nrofHARQ-Processes+HARQ offset or [floor (CURRENT_slot×10/(numberOfSlotsPerFrame×periodicity))+HARQ offset] modulo nrofHARQ-Processes. In an example, HARQ offset may be the determined HARQ offset value from the plurality of HARQ offset values, based on the TRP on which the wireless device receives the DCI or the first TB.

In an example, the wireless device may attempt to decode the first TB. The wireless device may successfully decode the first TB. In response to successfully decode the first TB, the wireless device may deliver a decoded data (e.g., MAC PDU) to the disassembly and demultiplexing entity of the wireless device and/or transmit an ACK to the base station. In an example, the wireless device may unsuccessfully decode the first TB. In response to unsuccessfully decode the first TB, the wireless device may store the received data of the first TB in a soft buffer of a HARQ process identified by the determined HARQ Process ID and/or transmit a NACK to the base station.

In an example, by one or more above embodiments, the base station may configure multiple HARQ offset values, each associated with a TRP of a plurality of TRPs. A wireless device may determine a HARQ offset value from the plurality of HARQ offset values, based on a TRP on which the wireless device receive a TB. Example embodiments may enable the wireless device correctly to differentiate HARQ processes of configured downlink assignments transmitted from different TRPs. Example embodiments may improve downlink transmission throughput, power consumption, and/or uplink HARQ ACK/NACK transmission overhead.

Figure 34:
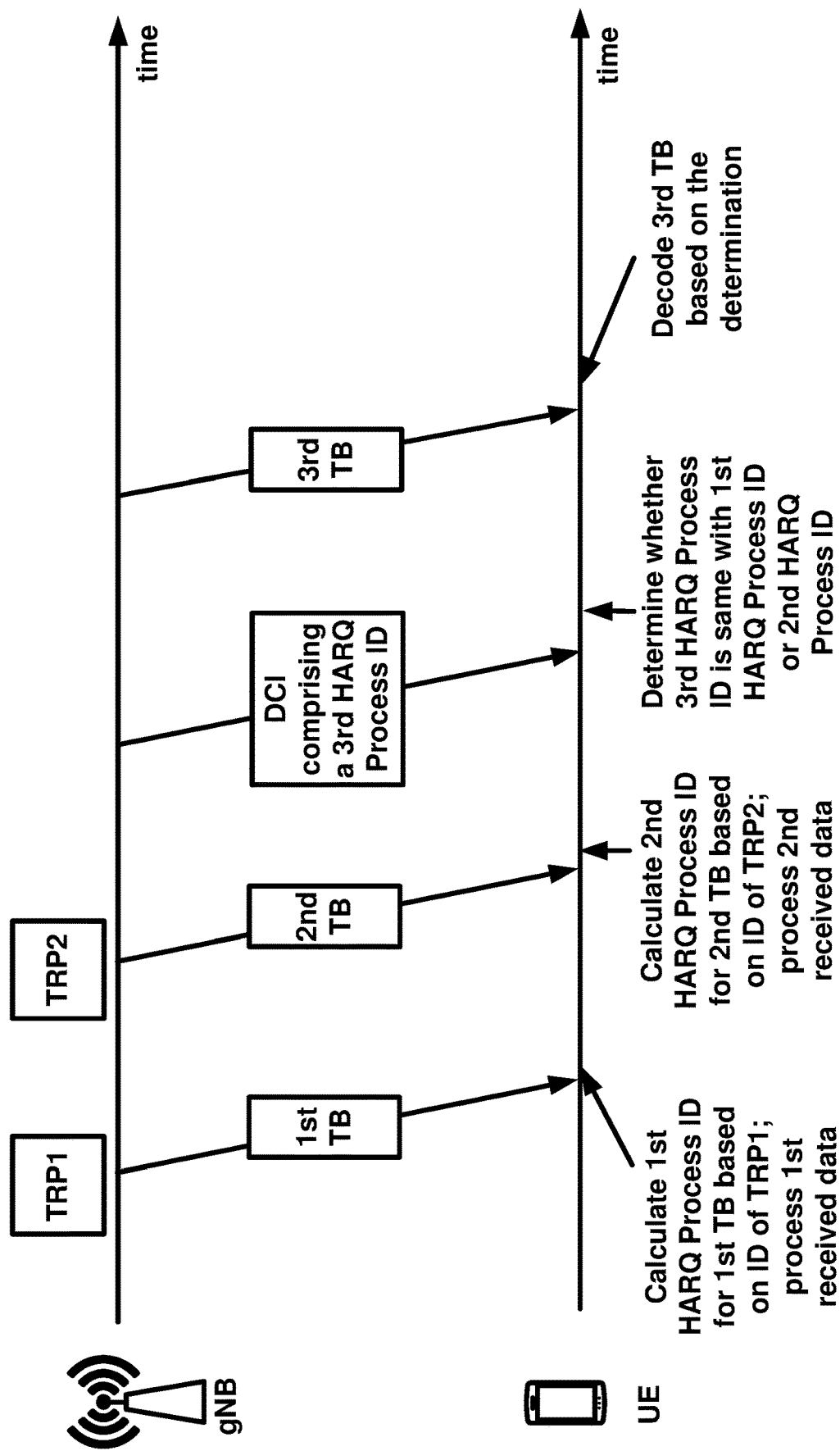
FIG. 34 is an example of HARQ Process ID determination for configured downlink assignment with multiple TRPs and multiple panels as per an aspect of an embodiment of the present disclosure.

FIG. 34 shows an example of downlink TB reception based on HARQ Process ID determination of configured downlink assignments when multiple TRPs/panels are supported. As shown in FIG. 34, a wireless device may receive via a first TRP, a first TB of a configured downlink assignment. The wireless device may, by implementing one or more examples of FIG. 31, determine a first HARQ Process ID for the first TB based on an index of the first TRP. The wireless device may receive via a second TRP, a second TB of the configured downlink assignment. The wireless device may, by implementing one or more examples of FIG. 31, determine a second HARQ Process ID for the second TB based on an index of the second TRP. The wireless device may attempt to decode the first TB and/or the second TB. The wireless device may, based on the decoding the first TB and/or the second TB, transmit one or more HARQ ACK/NACK of the first TB and/or the second TB to the base station.

In an example, the base station may transmit a DCI comprising a third HARQ Process ID and downlink resource assignment, the DCI with CRC being scrambled with C-RNTI. In response to receiving the DCI, the wireless device may compare the third HARQ Process ID with the first HARQ Process ID and/or the second HARQ Process ID. In response to the third HARQ Process ID being same as the first HARQ Process ID, the wireless device may combine a received data transmitted on the downlink resource assignment with a buffered data of the first TB. The wireless device may attempt to decode the combined data for the first TB. The wireless device may successfully decode the combined data for the first TB and deliver the decoded data to a disassembly and demultiplexing entity of the wireless device. In an example, the wireless device may not successfully decode the combined data for the first TB. In response to decoding the combined data not being successful, the wireless device may store the combined data of the first TB in a soft buffer of a HARQ process identified by the first HARQ Process ID. Similarly, In response to the third HARQ Process ID being same as the second HARQ Process ID, the wireless device may combine a received data transmitted on the downlink resource assignment with a buffered data of the second TB. The wireless device may attempt to decode the combined data for the second TB. The wireless device may successfully decode the combined data for the second TB and deliver the decoded data to a disassembly and demultiplexing entity of the wireless device. The wireless device may not successfully decode the combined data for the second TB. In response to decoding the combined data for the second TB not being successful, the wireless device may store the combined data of the second TB in a soft buffer of a HARQ process identified by the second HARQ Process ID.

Figure 35:
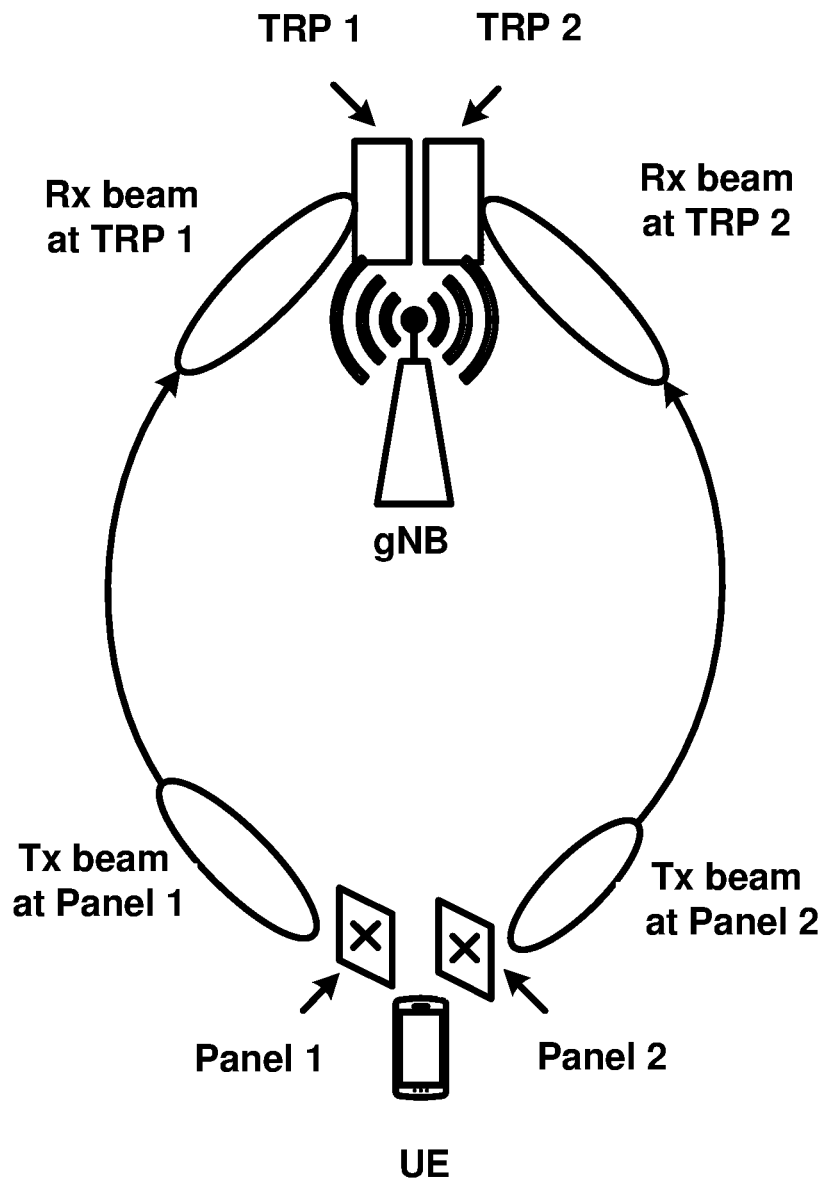
FIG. 35 is an example of transmission and reception with multiple TRPs and multiple panels as per an aspect of an embodiment of the present disclosure.

FIG. 35 shows an example of uplink transmissions from a wireless device equipped with multiple panels. In an example, a base station may be equipped with more than one TRP (e.g., TRP 1 and TRP 2 in FIG. 35). A wireless device may be equipped with more than one panel (e.g., Panel 1 and Panel 2 in FIG. 35). Transmission and reception with multiple TRPs and multiple panels may improve system throughput and/or transmission robustness for a wireless communication in a high frequency (e.g., above 6 GHz). When equipped with multiple panels and/or multiple TRPs, a wireless device may transmit a first uplink signal (e.g., PUCCH, PUSCH, SRS, preamble) with a first transmission beam (e.g., Tx beam at panel 1 in FIG. 35) to a base station using a first Rx beam with a first TRP (e.g., TRP 1 in FIG. 35). The wireless device may transmit a second uplink signal (e.g., PUCCH, PUSCH, SRS, preamble) with a second transmission beam (e.g., Tx beam at panel 2 in FIG. 35) to the base station using a second Rx beam with a second TRP (e.g., TRP 2 in FIG. 35). The base station and the wireless device may determine the first Tx beam and the first Rx beam based one or more beam management procedures. Similarly, the base station and the wireless device may determine the second Tx beam and the second Rx beam based one or more beam management procedures. Different from single TRP and/or single panel case, the wireless device may be allowed to transmit simultaneously or parallelly the first uplink signal via the first panel and the second uplink signal via the second panel with a shared time and/or frequency resource, and different transmission beam. In an example, the first uplink signal may be a first PUSCH transmission of a first configured uplink grant. The second uplink signal may a second PUSCH transmission of a second configured uplink grant. Compared with single TRP/panel case, the wireless device and/or the base station may improve system throughput, transmission latency, or transmission robustness when equipped with multiple TRPs and/or panels.

Figure 36:
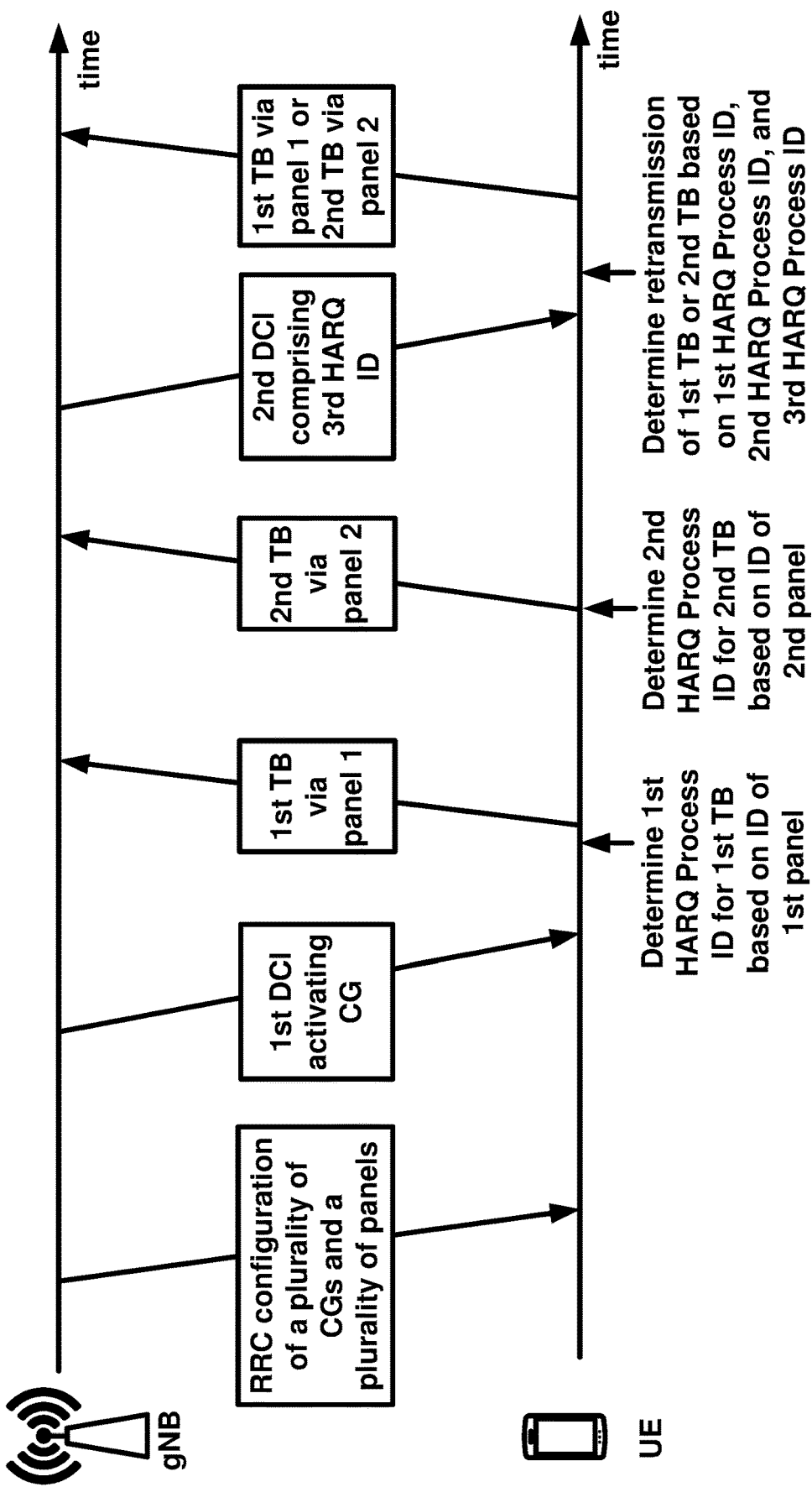
FIG. 36 is an example of HARQ Process ID determination for configured uplink grant with multiple TRPs and multiple panels as per an aspect of an embodiment of the present disclosure.

FIG. 36 shows an example of HARQ Process ID determination for configured grant (CG) when multiple panels are supported. A base station may transmit to a wireless device one or more RRC messages comprising one or more first configuration parameters of a plurality of CGs on an active BWP of a serving cell (e.g., PCell or SCell). The one or more RRC messages may comprise at least one of: ServingCellConfig IE; CellGroupConfig IE; RRCSetup message; and/or RRCReconfiguration message. The one or more RRC messages may indicate a RNTI value (e.g., CS-RNTI) dedicated for CGs. The CS-RNTI may be different from a C-RNTI used for dynamic downlink assignment or dynamic uplink grant. In an example, A CG may be a type 1 CG or type 2 CG, where the type 1 CG may be configured and activated by the RRC message, and the type 2 CG may be configured by the RRC message and activated by a DCI. For type 2 configured grant, the one or more first configuration parameters of each of the plurality of CGs may comprise at least one of: a value of periodicity; a maximum number of parallel HARQ processes (e.g., a positive number between 1 and 8, or a positive number between 1 and 16, or a positive number between 1 and 32); a frequency hopping indicator; one or more DMRS configuration parameters; a MCS table indicator; one or more resource allocation type parameters; a power control loop indicator; one or more power control parameter (e.g., PO and/or alpha); a repetition parameter; a sequence of RVs for repetitions; a configuration grant timer. In an example, each of the plurality of CGs may be identified with a CGs configuration index or CG ID. For type 1 CG, the one or more first configuration parameters of each of the plurality of CGs may further comprise at least one of: a time domain offset value; a time domain resource allocation indicator; a frequency domain resource allocation indicator; an antenna port indicator; a DMRS sequence initialization indicator; a SRS resource indicator; a MCS and TBS indicator; a frequency hopping offset value; and/or a pathloss reference index.

In an example, the one or more RRC messages may comprise one or more second configuration parameters of a plurality of panels and a plurality of SRS sets for the wireless device. The plurality of SRS sets may be grouped into SRS set groups. The one or more RRC messages may indicate that each of the plurality of panels is associated with a corresponding one of the SRS set groups. Different panel may be identified or associated with a different SRS set group. An SRS set group, identified by an SRS set group index, may comprise a plurality of SRS sets, each of the plurality of control resource sets being identified by an SRS set index. Each SRS set may comprise a plurality of SRSs. Parameters of an SRS may comprise at least one of: an SRS resource identifier; a number of SRS antenna port; a PTRS port index; a transmission comb indicator; a resource mapping indicator; one or more frequency domain parameters; a resource type indicator (e.g., aperiodic, periodic, or semi-persistent); and/or a spatial relation information (SRI) configuration. In an example, an SRI configuration may be identified with an SRI configuration index. An SRI configuration may be associated with a cell index, a reference signal index (e.g., an SSB index, CSI-RS index, or an SRS resource index). When an SRI configuration is associated with an SSB index, a wireless device may transmit an uplink channel (e.g., PUCCH/PUSCH) using a same spatial domain filter as for a reception of a SS/PBCH block with the SSB index. When the SRI configuration is associated with a CSI-RS index, a wireless device may transmit an uplink channel (e.g., PUCCH/PUSCH) using a same spatial domain filter as for a reception of a CSI-RS with the CSI-RS index. When the SRI configuration is associated with an SRS index, a wireless device may transmit an uplink channel (e.g., PUCCH/PUSCH) with a same spatial domain filter as for a transmission of an SRS with the SRS resource index. In an example, a first panel may be associated with a first group of SRI configurations, a second panel may be associated with a second group of SRI configurations. Each SRI configuration of the first group of SRI configurations may be different from any SRI configuration of the second group of SRI configurations. When a first group of SRI configurations are associated with a first panel, the wireless device may transmit uplink signals (e.g., PUCCH/PUSCH) with a spatial domain filter determined based on an SRI configuration of the first group of SRI configurations via the first panel. The wireless device may not transmit uplink signals (e.g., PUCCH/PUSCH) with a spatial domain filter determined based on an SRI configuration of the first group of SRI configurations via a second panel different from the first panel. When the second group of SRI configurations are associated with a second panel, the wireless device may transmit uplink signals (e.g., PUCCH/PUSCH) with a spatial domain filter determined based on an SRI configuration of the second group of SRI configurations via the second panel. The wireless device may not transmit uplink signals (e.g., PUCCH/PUSCH) with a spatial domain filter determined based on an SRI configuration of the second group of SRI configurations via the first panel different from the second panel.

In an example, as shown in FIG. 36, the base station may transmit a first DCI (e.g., DCI format 0_0/0_1) to the wireless device. The first DCI may comprise a first field indicating a first CG of the plurality of CGs. The first DCI may comprise one or more fields being set to predefined values indicating an activation of the first CG. The first DCI may comprise an SRI field indicating an SRI configuration for an uplink transmission (e.g., PUSCH). The first DCI may comprise uplink radio resource for an uplink transmission (e.g., PUSCH) of the activated CG.

In an example, in response to receiving the first DCI, wireless device may store an uplink assignment indicated by the first DCI and HARQ information (e.g., NDI, MCS, RV, and/or a first HARQ Process ID) as a first CG. The wireless device may transmit in a first PUSCH duration based on the first CG, a first transport block (TB) via the first panel of the wireless device. The wireless device may determine a first HARQ Process ID for the first TB associated with a symbol where the transmission of the first TB starts based on a time of the symbol, a periodicity of the first CG, a number of allowed parallel HARQ processes, and an ID of the first panel. In an example, the ID of the first panel may comprise an SRI group index of an SRI group associated with the first panel. In an example, the ID of the first panel may be indicated in the first DCI. In an example, the wireless device may determine the first HARQ Process ID as HARQ Process ID=[floor (CURRENT_symbol/periodicity)+Panel ID] modulo nrofHARQ-Processes, where CURRENT_symbol= (SFN×numberOfSlotsPerFrame×numberOfSymbolsPerSlot+slot number in the frame×numberOfSymbolsPerSlot+symbol number in the slot), and Panel ID is a panel ID of the first panel where the wireless device transmit the first TB. In an example, the wireless device may determine the first HARQ Process ID as follows: HARQ Process ID=[floor (CURRENT_symbol/periodicity)] modulo nrofHARQ-Processes+Panel ID.

In an example, the wireless device may transmit in a second PUSCH duration based on the first CG, a second transport block (TB) via the second panel of the wireless device. The wireless device may determine a second HARQ Process ID for the second TB associated with a symbol where the transmission of the second TB starts based on a time of the symbol, a periodicity of the first CG, a number of allowed parallel HARQ processes, and an ID of the second panel. In an example, the wireless device may determine the second HARQ Process ID as HARQ Process ID=[floor (CURRENT_symbol/periodicity)+Panel ID] modulo nrofHARQ-Processes, where CURRENT_symbol= (SFN×numberOfSlotsPerFrame×numberOfSymbolsPerSlot+slot number in the frame×numberOfSymbolsPerSlot+symbol number in the slot), and Panel ID is a panel ID of the second panel where the wireless device transmit the second TB. In an example, the wireless device may determine the second HARQ Process ID as follows: HARQ Process ID=[floor (CURRENT_symbol/periodicity)] modulo nrofHARQ-Processes+Panel ID.

In an example, in response to receiving the first TB and/or the second TB, the base station may attempt to decode the first TB and/or the second TB. The base station may, based on the decoding the first TB and/or the second TB, transmit a second DCI comprising a third HARQ Process ID and a third uplink grant. In an example, when the base station fails the decoding the first TB, the base station may set the third HARQ Process ID same as the first HARQ Process ID. In an example, when the base station fails the decoding the second TB, the base station may set the third HARQ Process ID same as the second HARQ Process ID.

In an example, in response to receiving the second DCI, the wireless device may compare the third HARQ Process ID of the second DCI with the first HARQ Process ID and/or the second HARQ Process ID. In response to the third HARQ process ID being same as the first HARQ Process ID, the wireless may retransmit the first TB via the third uplink grant. In response to the third HARQ process ID being same as the second HARQ Process ID, the wireless may retransmit the second TB via the third uplink grant.

FIG. 37 shows an example of HARQ Process ID determination of configured grants (CGs) when multiple TRPs/panels are supported. In an example, a wireless device may transmit a first uplink TB for one or more CGs via a first panel to a first TRP of a base station. The wireless device may transmit a second uplink TB for one or more CGs via a second panel to a second TRP of the base station. The transmission of the first uplink TB may start in a same symbol of a slot as the transmission of the second uplink TB starts. The transmission of the first uplink TB may start in a different symbol of the slot from the transmission of the second uplink TB starts. The wireless device may determine a first HARQ Process ID for the first uplink TB based on a symbol on which the transmission of the first uplink TB starts, a periodicity of CG, and an index identifying the first panel, as shown in one or more of example embodiments of FIG. 36. The wireless device may determine a second HARQ Process ID for the second uplink TB based on a symbol on which the transmission of the second uplink TB starts, a periodicity of CG, and an index identifying the second panel, as shown in one or more of example embodiments of FIG. 36. The index identifying a panel may comprise an SRI group index of an SRI group from which an SRI configuration is used for determining spatial domain filter for transmission of the first TB. The index identifying a panel may comprise a panel ID indicated in a DCI activating the CG.

In an example, by example embodiments of FIG. 36 and/or FIG. 37, the wireless device may determine a HARQ Process ID of an uplink transmission for a CG based on a panel index when multiple panels are supported. The wireless device, by implementing the example embodiments, may correctly differentiate HARQ processes of uplink transmissions for CGs from different panels. Correctly differentiating HARQ processes may improve uplink transmission throughput, power consumption, and/or retransmission indication overhead.

In an example, similar as FIG. 33, a base station may configure a panel-specific HARQ offset for a CG. In an example, the base station may indicate a plurality of HARQ offset values for a CG. Each of the plurality of HARQ offset values may be associated with a corresponding panel of a plurality of panels of the wireless device. In response to transmitting a TB for the CG via a first panel of the plurality of panels, the wireless device may determine a HARQ Process ID for the TB based on a HARQ offset value associated with the first panel. For example, the wireless device may determine the HARQ Process ID as HARQ Process ID=[floor (CURRENT_symbol/periodicity)] modulo nrofHARQ-Processes+HARQ offset. In an example, HARQ offset may be a HARQ offset value associated with the first panel.

In an example, by one or more above embodiments, the base station may configure multiple HARQ offset values, each associated with a panel of a plurality of panels. A wireless device may determine a HARQ offset value from the plurality of HARQ offset values, based on a panel on which the wireless device transmit a TB. Example embodiment may enable the wireless device correctly to differentiate HARQ processes of configured uplink grants transmitted from different panels. Example embodiments may improve uplink transmission throughput, power consumption, and/or retransmission indication overhead.

In an example, a base station may transmit to a wireless device one or more RRC messages comprising one or more first configuration parameters of a plurality of CGs on an active BWP of a serving cell (e.g., PCell or SCell). In an example, each of the plurality of CGs may be identified with a CG configuration index or CG ID.

In an example, the one or more RRC messages may comprise one or more second configuration parameters of a plurality of panels of the wireless device. The one or more second configuration parameters may comprise a plurality of SRI groups, each of the plurality of SRI groups being associated with a corresponding one of the plurality of panels. Different panel may be identified or associated with a different SRI group. The base station may configure an SRI group by implementing one or more of example embodiments as shown in FIG. 36.

In an example, the one or more RRC messages may further indicate that the plurality of CGs are grouped into a plurality of CG groups, each CG group comprising one or more CG s of the plurality of CG s. Each CG of a first CG group may different from any CG of a second CG group. A CG group may be associated with a panel of a plurality of panels of the wireless device. In an example, when a first CG group is associated with a first panel, the wireless device may transmit any CG of the first CG group, if activated, via uplink grant of the first panel, to a base station. In an example, when a first CG group is associated with a first panel, the wireless device may not transmit any CG of the first CG group, if activated, via uplink grant of a second panel different from the first panel, to the base station. In an example, when a first CG group is associated with a first panel and a second CG group is associated with a second panel, the wireless device may transmit a first TB for a CG (if activated) of the first CG group via uplink grant of the first panel, and a second TB for a CG (if activated) of the second CG group via uplink grant of the second panel, to the base station. The wireless device may transmit the first TB and the second TB parallelly or simultaneously, e.g., with a same time/frequency resource and different transmission beam.

In an example, the wireless device may determine a first HARQ Process ID for the first TB as HARQ Process ID=[floor (CURRENT_symbol/periodicity)+CG index 1]modulo nrofHARQ-Processes. The wireless device may determine a second HARQ Process ID for the second TB as HARQ Process ID=[floor (CURRENT_symbol/periodicity)+CG index 2] modulo nrofHARQ-Processes. In an example, CG index 1 may be a CG configuration index of the first CG in the first CG group. CG index 2 may be a CG configuration index of the second CG in the second CG group. In an example, the wireless device may determine a first HARQ Process ID for the first TB as HARQ Process ID=[floor (CURRENT_symbol/periodicity)] modulo nrofHARQ-Processes+CG index 1. The wireless device may determine a second HARQ Process ID for the second TB as HARQ Process ID=[floor (CURRENT_symbol/periodicity)] modulo nrofHARQ-Processes+CG index 2.

By the embodiment, the base station may group a plurality of CGs into a plurality of CG groups, each CG group being associated with a panel of a plurality of panels. Configuration of CGs per panel, by grouping the CGs, may improve HARQ Process ID determination ambiguity when multiple panels are supported. Example embodiments may improve uplink transmission throughput, power consumption, and/or retransmission indication overhead.

In an example, a wireless device may receive from a base station one or more radio resource control messages comprising configuration parameters of a plurality of control resource set groups, each control resource set group being associated with a corresponding one of a plurality of TRPs. Each control resource set group may comprise a plurality of control resource set. Each control resource set group may be identified with a control resource set group index. The one or more radio resource control messages may further comprise configuration of a plurality of TCI state groups, each TCI state group being associated with a corresponding one of the plurality of TRPs.

In an example, the wireless device may receive on a control resource set, a first DCI indicating an activation of a configured downlink assignment, wherein the configured downlink assignment indicates one or more downlink radio resources and the control resource set belongs to one of the control resource set groups. The wireless device, based on a control resource set group index identifying the one of the plurality of control resource set groups, a HARQ ID associated with a first PDSCH duration of the configured downlink assignment. The wireless device may receive in the first PDSCH duration, a TB associated with a HARQ process identified by the HARQ ID. The wireless device may transmit an acknowledgement for the TB.

In an example, a wireless device may receive, on one of a plurality of control resource set groups, a first DCI indicating an activation of a configured downlink assignment, wherein the DCI comprises a resource indicator indicating a first PDSCH duration. The wireless device may determine a HARQ ID associated with the first PDSCH duration of the configured downlink assignment based on a control resource set group index identifying the one of the plurality of control resource set groups and a starting symbol of the first PDSCH duration. The wireless device may receive in the first PDSCH duration a TB based on the HARQ ID. The wireless device may transmit an acknowledgement for the TB.

In an example, a wireless device may receive one or more messages comprising a first HARQ offset value and a second HARQ offset value of a configured downlink assignment. The wireless device may receive, on one of a plurality of control resource set groups, a first DCI indicating an activation of the configured downlink assignment. The wireless device may determine, based on a control resource set group index identifying the one of the plurality of control resource set groups, an HARQ offset value from the first HARQ offset value and the second HARQ offset value. The wireless device may derive a HARQ ID associated with a first PDSCH duration of the configured downlink assignment based on the HARQ offset value and an index of the configured downlink assignment. The wireless device may receive a TB for a HARQ process identified by the HARQ ID. The wireless device may transmit an acknowledgement for the TB.

Figure 38:
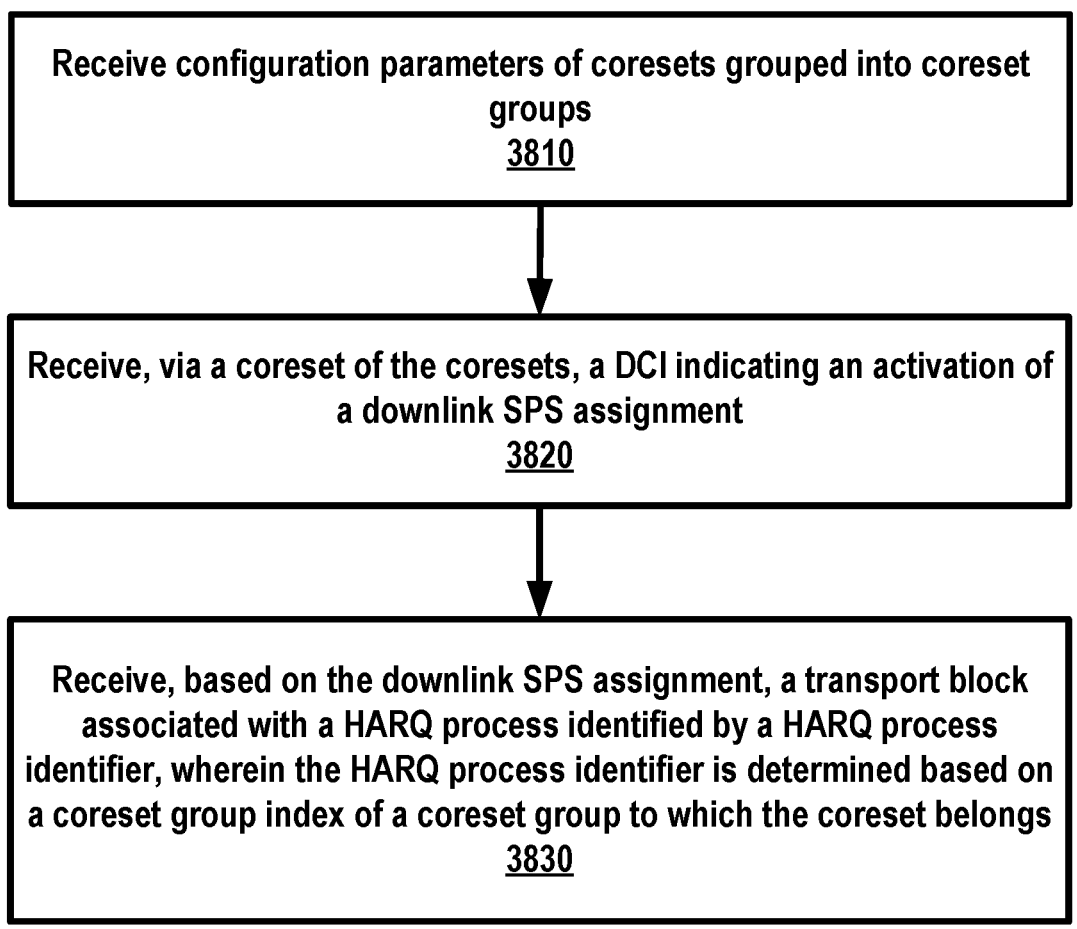
FIG. 38 shows a flow diagram as per an aspect of an example embodiment of the present disclosure.

FIG. 38 shows a flow diagram as per an aspect of an example embodiment of the present disclosure. At 3810, a wireless device may receive configuration parameters of control resource sets (coresets) grouped into coreset groups. At 3820, the wireless device may receive, via a coreset of the coresets, a downlink control information indicating an activation of a downlink semi-persistent scheduling (SPS) assignment. At 3830, the wireless device may receive, based on the downlink SPS assignment, a transport block associated with a hybrid automatic repeat request (HARQ) process identified by a HARQ process identifier, wherein the HARQ process identifier is determined based on a coreset group index of a coreset group to which the coreset belongs.

According to an example embodiment, the wireless device may allocate the transport block to the HARQ process identified by the HARQ process identifier. The wireless device may determine the HARQ process identifier based on a slot index of a slot of the downlink SPS assignment, wherein the slot is a slot in which the wireless device receives the transport block. The wireless device may determine the HARQ process identifier based on a symbol index of a symbol of the downlink SPS assignment, wherein the symbol is a starting symbol in which the wireless device receives the transport block. The wireless device may determine the HARQ process identifier based on a periodicity of the downlink SPS assignment, wherein the periodicity is comprised in configuration parameters of the SPS assignment. The wireless device may receive a plurality of transport blocks comprising the transport block via periodical radio resources of the downlink SPS assignment.

According to an example embodiment, the configuration parameters of the coreset may comprise at least one of: a coreset identifier identifying the coreset, a number of symbols indicating duration of the coreset and a set of frequency resource blocks indicating frequency domain resources of the coreset. The coreset may be associated with the coreset group index of the coreset group in response to the coreset belonging to the coreset group.

According to an example embodiment, the downlink control information may indicate downlink radio resources of the downlink SPS assignment, the downlink radio resources comprising a number of slots and a number of frequency resource blocks.

According to an example embodiment, the wireless device may determine the HARQ process identifier based on a HARQ process identifier offset of the downlink SPS assignment, wherein the HARQ process identifier offset may be comprised in configuration parameters of the downlink SPS assignment. The configuration parameters may be received in a radio resource control message from a base station.

According to an example embodiment, the wireless device may determine the HARQ process identifier based on a maximum number of parallel HARQ processes, wherein the maximum number may be comprised in configuration parameters of the SPS assignment. The configuration parameters may be received in a radio resource control message from a base station.

According to an example embodiment, the wireless device may determine the HARQ process identifier based on the coreset group index in response to a value of a HARQ process identifier field, of the downlink control information, being set to a first predefined value. The first predefined value may be zero.

According to an example embodiment, the wireless device may determine the downlink control information indicating the activation of the downlink SPS assignment based on at least one of: a value of a HARQ process identifier field, of the downlink control information, being set to a first predefined value, and a value of a redundancy version field, of the downlink control information, being set to a second predefined value. The wireless device may determine the HARQ process identifier based on the coreset group index in response to the value of the HARQ process identifier field being set to the first predefined value.

According to an example embodiment, the wireless device may receive the downlink control information with cyclic redundancy check bits scrambled with a configured scheduling radio network temporary identifier (CS-RNTI) for the activation of the downlink SPS assignment. The CS-RNTI, for the activation of the downlink SPS assignment, may be separately and independently configured from a cell radio network temporary identifier (C-RNTI) for a downlink dynamic assignment.

According to an example embodiment, the wireless device may transmit an acknowledgement for the transport block of the HARQ process identified by the HARQ process identifier. The acknowledgement may comprise a positive acknowledgement in response to the transport block being successfully decoded. The acknowledgement may comprise a negative acknowledgement in response to the transport block being unsuccessfully decoded.

According to an example embodiment, the wireless device may receive one or more radio resource control messages comprising configuration parameters of the downlink SPS assignment. The configuration parameters of the downlink SPS assignment may comprise at least one of: a value of periodicity of downlink resource occasions, a maximum number of parallel HARQ processes and a HARQ resource indication of HARQ resource for physical uplink control channel. The configuration parameters of the downlink SPS assignment may comprise a downlink SPS assignment index identifying the downlink SPS assignment and a HARQ process identifier offset value. The downlink control information may comprise a downlink SPS assignment index indicating the downlink SPS assignment. The wireless device may determine the HARQ process identifier based on the HARQ process offset value associated with the downlink SPS assignment.

Figure 39:
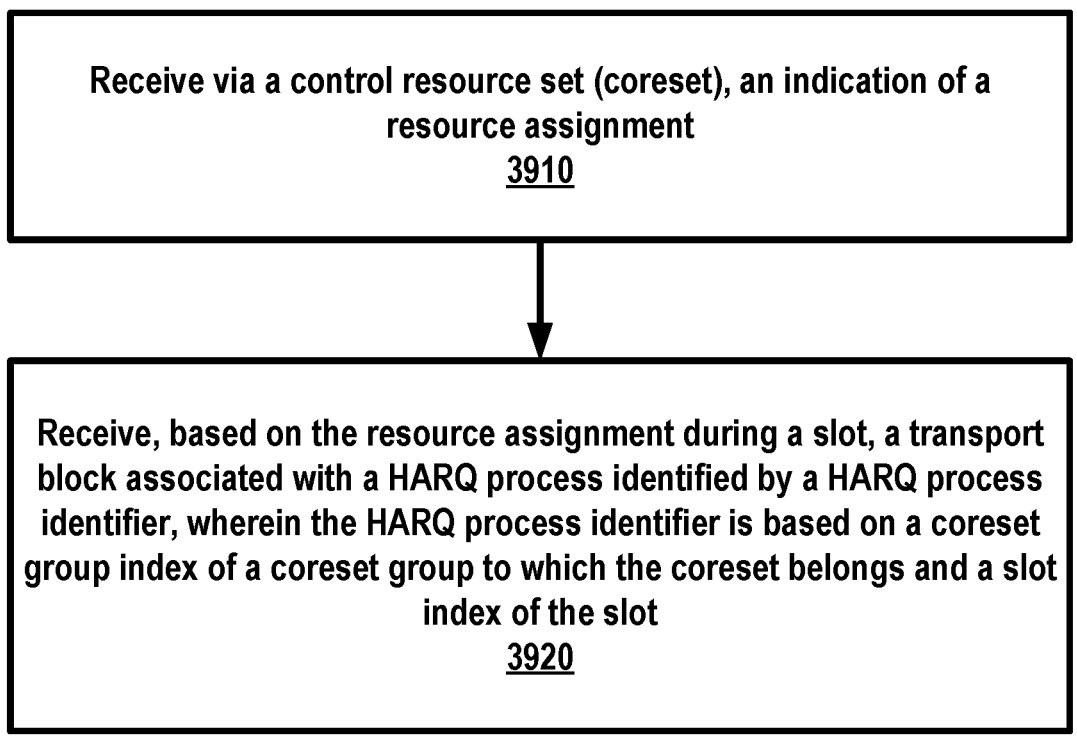
FIG. 39 shows a flow diagram as per an aspect of an example embodiment of the present disclosure.

FIG. 39 shows a flow diagram as per an aspect of an example embodiment of the present disclosure. At 3910, a wireless device may receive via a control resource set (coreset), an indication of a resource assignment. At 3920, the wireless device may receive, based on the resource assignment during a slot, a transport block associated with a hybrid automatic repeat request (HARQ) process identified by a HARQ process identifier, wherein the HARQ process identifier is based on a coreset group index of a coreset group to which the coreset belongs and a slot index of the slot.

Figure 40:
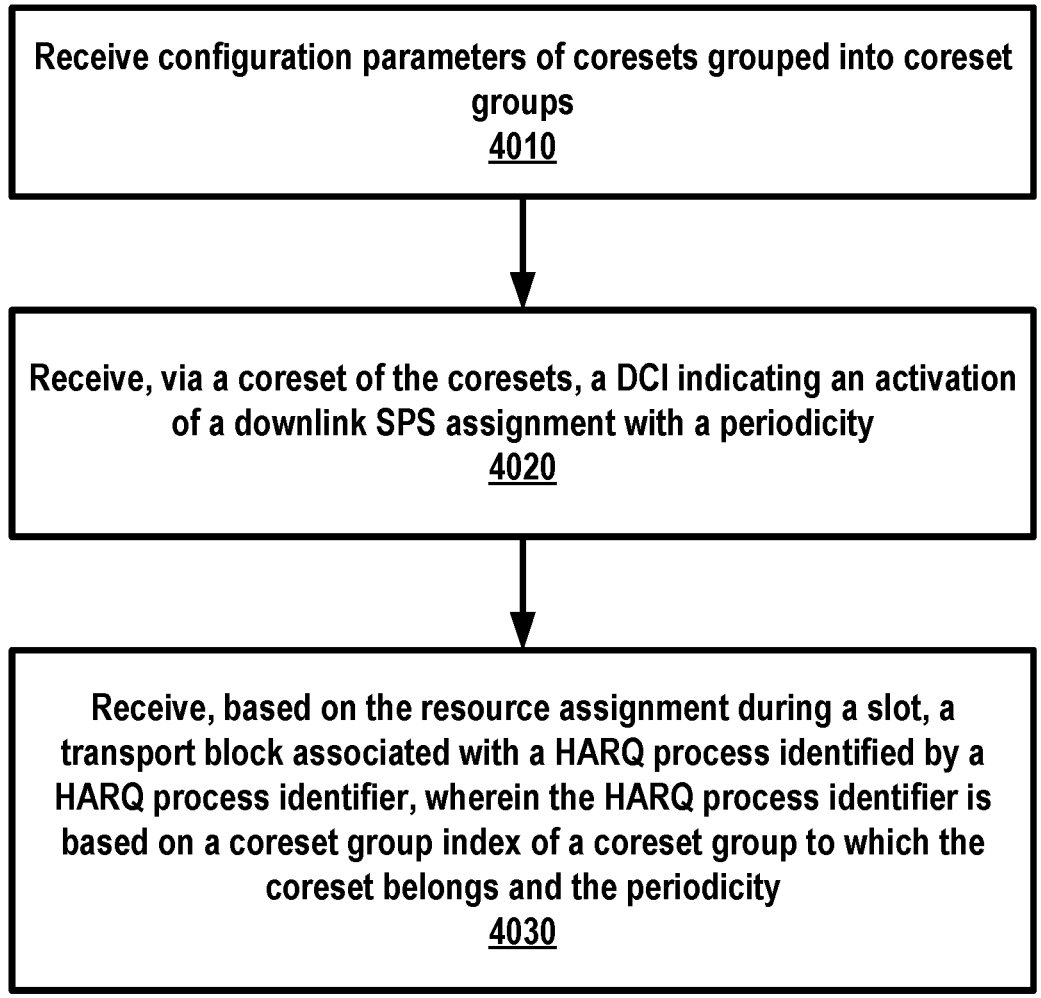
FIG. 40 shows a flow diagram as per an aspect of an example embodiment of the present disclosure.

FIG. 40 shows a flow diagram as per an aspect of an example embodiment of the present disclosure. At 4010, a wireless device may receive configuration parameters of control resource sets (coresets) grouped into coreset groups. At 4020, the wireless device may receive, via a coreset of the coresets, a downlink control information indicating an activation of a downlink semi-persistent scheduling (SPS) assignment with a periodicity. At 4030, the wireless device may receive, based on the downlink SPS assignment, a transport block associated with a hybrid automatic repeat request (HARQ) process identified by a HARQ process identifier, wherein the HARQ process identifier is based on a coreset group index of a coreset group to which the coreset belongs and the periodicity.

Figure 41:
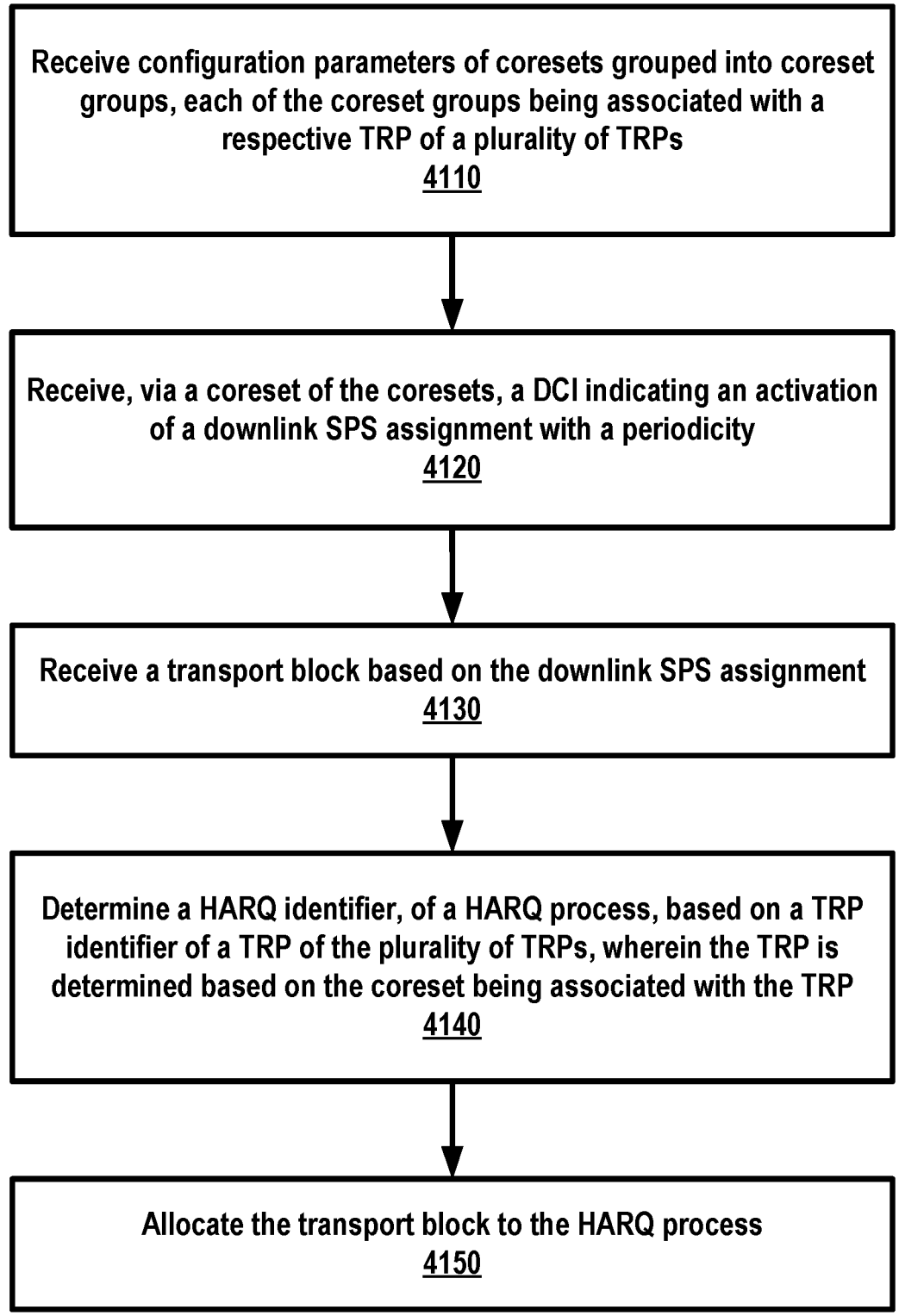
FIG. 41 shows a flow diagram as per an aspect of an example embodiment of the present disclosure.

FIG. 41 shows a flow diagram as per an aspect of an example embodiment of the present disclosure. At 4110, a wireless device may receive configuration parameters of control resource sets (coresets) grouped into coreset groups, each of the coreset groups being associated with a respective transmission reception point (TRP) of a plurality of TRPs. At 4120, the wireless device may receive via a coreset of the coresets, a downlink control information indicating an activation of a downlink semi-persistent scheduling (SPS) assignment. At 4130, the wireless device may receive a transport block based on the downlink SPS assignment. At 4140, the wireless device may determine a hybrid automatic repeat request (HARQ) identifier, of a HARQ process, based on a TRP identifier of a TRP of the plurality of TRPs, wherein the TRP is determined based on the coreset being associated with the TRP. At 4150, the wireless device may allocate the transport block to the HARQ process.

Figure 42:
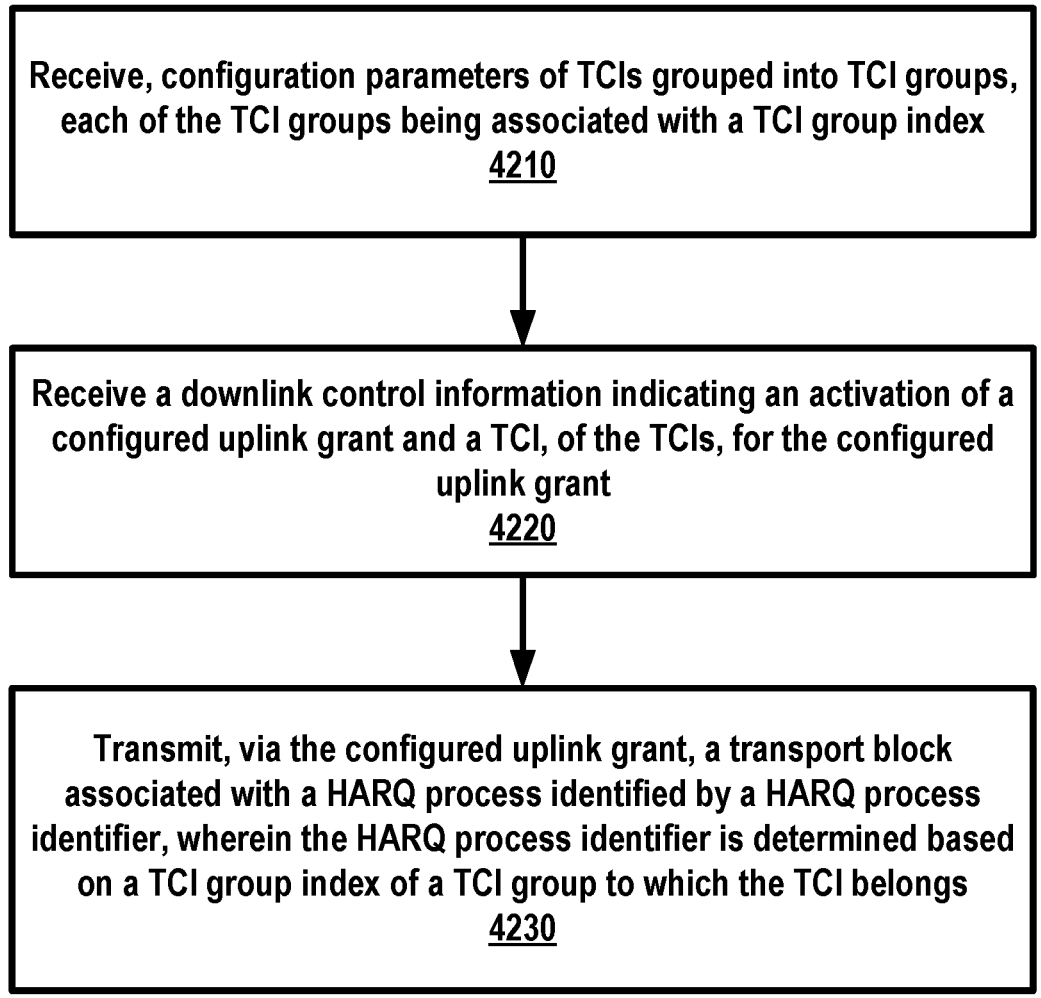
FIG. 42 shows a flow diagram as per an aspect of an example embodiment of the present disclosure.

FIG. 42 shows a flow diagram as per an aspect of an example embodiment of the present disclosure. At 4210, a wireless device may receive configuration parameters of transmission configuration indications (TCIs) grouped into TCI groups, each of the TCI groups being associated with a TCI group index. At 4220, the wireless device may receive a downlink control information indicating an activation of a configured uplink grant and a TCI, of the TCIs, for the configured uplink grant. At 4230, the wireless device may transmit, via the configured uplink grant, a transport block associated with a HARQ process identified by a HARQ process identifier, wherein the HARQ process identifier is determined based on a TCI group index of a TCI group to which the TCI belongs.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, configuration parameters of control resource sets (coresets) grouped into coreset groups;
   receiving, via a coreset of the coresets, a downlink control information indicating an activation of a downlink semi-persistent scheduling (SPS) assignment; and
   receiving, based on the downlink SPS assignment, a transport block associated with a hybrid automatic repeat request (HARQ) process identified by a HARQ process identifier, wherein the HARQ process identifier is determined based on:

a coreset group index of a coreset group to which the coreset belongs, and a slot index of a slot of the downlink SPS assignment, wherein the wireless device receives the transport block during the slot.

2. The method of claim 1, further comprising allocating the transport block to the HARQ process identified by the HARQ process identifier.

3. The method of claim 2, further comprising transmitting an acknowledgement for the transport block of the HARQ process identified by the HARQ process identifier.

4. The method of claim 1, wherein the HARQ process identifier is determined further based on a symbol index of a symbol of the downlink SPS assignment, wherein the symbol is a starting symbol in which the wireless device receives the transport block.

5. The method of claim 1, wherein the HARQ process identifier is determined further based on a periodicity of the downlink SPS assignment, wherein the periodicity is comprised in configuration parameters of the downlink SPS assignment.

6. The method of claim 1, wherein the HARQ process identifier is determined further based on a HARQ process identifier offset of the downlink SPS assignment, wherein the HARQ process identifier offset is comprised in configuration parameters of the downlink SPS assignment.

7. The method of claim 1, wherein the transport block is received in a plurality of transport blocks received via periodical radio resources of the downlink SPS assignment.

8. The method of claim 1, wherein the HARQ process identifier is determined based on the coreset group index in response to a value of a HARQ process identifier field, of the downlink control information, being set to a first predefined value.

9. The method of claim 8, wherein the first predefined value is zero.

10. A wireless device comprising:
one or more processors; and
memory storing instructions that, when executed by the one or more processors, cause the wireless device to:
receive configuration parameters of control resource sets (coresets) grouped into coreset groups;
receive, via a coreset of the coresets, a downlink control information indicating an activation of a downlink semi-persistent scheduling (SPS) assignment; and
receive, based on the downlink SPS assignment, a transport block associated with a hybrid automatic repeat request (HARQ) process identified by a HARQ process identifier, wherein the HARQ process identifier is determined based on:
a coreset group index of a coreset group to which the coreset belongs, and
a slot index of a slot of the downlink SPS assignment, wherein the wireless device receives the transport block during the slot.

11. The wireless device of claim 10, wherein the instructions further cause the wireless device to allocate the transport block to the HARQ process identified by the HARQ process identifier.

12. The wireless device of claim 11, wherein the instructions further cause the wireless device to transmit an acknowledgement for the transport block of the HARQ process identified by the HARQ process identifier.

13. The wireless device of claim 10, wherein the HARQ process identifier is determined further based on a symbol index of a symbol of the downlink SPS assignment, wherein the symbol is a starting symbol in which the wireless device receives the transport block.

14. The wireless device of claim 10, wherein the HARQ process identifier is determined further based on a periodicity of the downlink SPS assignment, wherein the periodicity is comprised in configuration parameters of the downlink SPS assignment.

15. The wireless device of claim 10, wherein the HARQ process identifier is determined further based on a HARQ process identifier offset of the downlink SPS assignment, wherein the HARQ process identifier offset is comprised in configuration parameters of the downlink SPS assignment.

16. The wireless device of claim 10, wherein the transport block is received in a plurality of transport blocks received via periodical radio resources of the downlink SPS assignment.

17. The wireless device of claim 10, wherein the HARQ process identifier is determined based on the coreset group index in response to a value of a HARQ process identifier field, of the downlink control information, being set to a first predefined value.

18. A system comprising:
a base station comprising:
one or more first processors; and
first memory storing first instructions that, when executed by the one or more first processors, cause the base station to:
transmit configuration parameters of control resource sets (coresets) grouped into coreset groups;
transmit, via a coreset of the coresets, a downlink control information indicating an activation of a downlink semi-persistent scheduling (SPS) assignment; and
transmit, based on the downlink SPS assignment, a transport block associated with a hybrid automatic repeat request (HARQ) process identified by a HARQ process identifier, wherein the HARQ process identifier is determined based on a coreset group index of a coreset group to which the coreset belongs; and
a wireless device comprising:
one or more second processors; and
second memory storing second instructions that, when executed by the one or more second processors, cause the wireless device to:
receive the configuration parameters;
receive, via a coreset of the coresets, the downlink control information indicating the activation of the SPS assignment; and
receive, based on the downlink SPS assignment, the transport block associated with the HARQ process identified by a HARQ process identifier, wherein the HARQ process identifier is determined based on the coreset group index of the coreset group to which the coreset belongs.

* * * * *